Jan. 26, 1960 J. J. LENTZ ET AL 2,922,332
ELECTRONIC DEVICES FOR LOCATING AND MEASURING INDICIA
Filed May 16, 1955 66 Sheets-Sheet 1

INVENTORS
J. J. LENTZ
R. L. BENNETT
W. J. ECKERT
BY
J. W. Armbruster
ATTORNEY

Jan. 26, 1960   J. J. LENTZ ET AL   2,922,332
ELECTRONIC DEVICES FOR LOCATING AND MEASURING INDICIA
Filed May 16, 1955   66 Sheets-Sheet 9

DISK POSITIONS OF ROTATION RELATIVE TO A
HORIZONTALLY DISPLACED STAR IMAGE

INVENTORS
J. J. LENTZ
R. L. BENNETT
W. J. ECKERT
BY
ATTORNEY

INVENTORS
J.J. LENTZ
R.L. BENNETT
W.J. ECKERT

INVENTORS
J.J. LENTZ
R.L. BENNETT
W.J. ECKERT

BY J W Armbruster
ATTORNEY

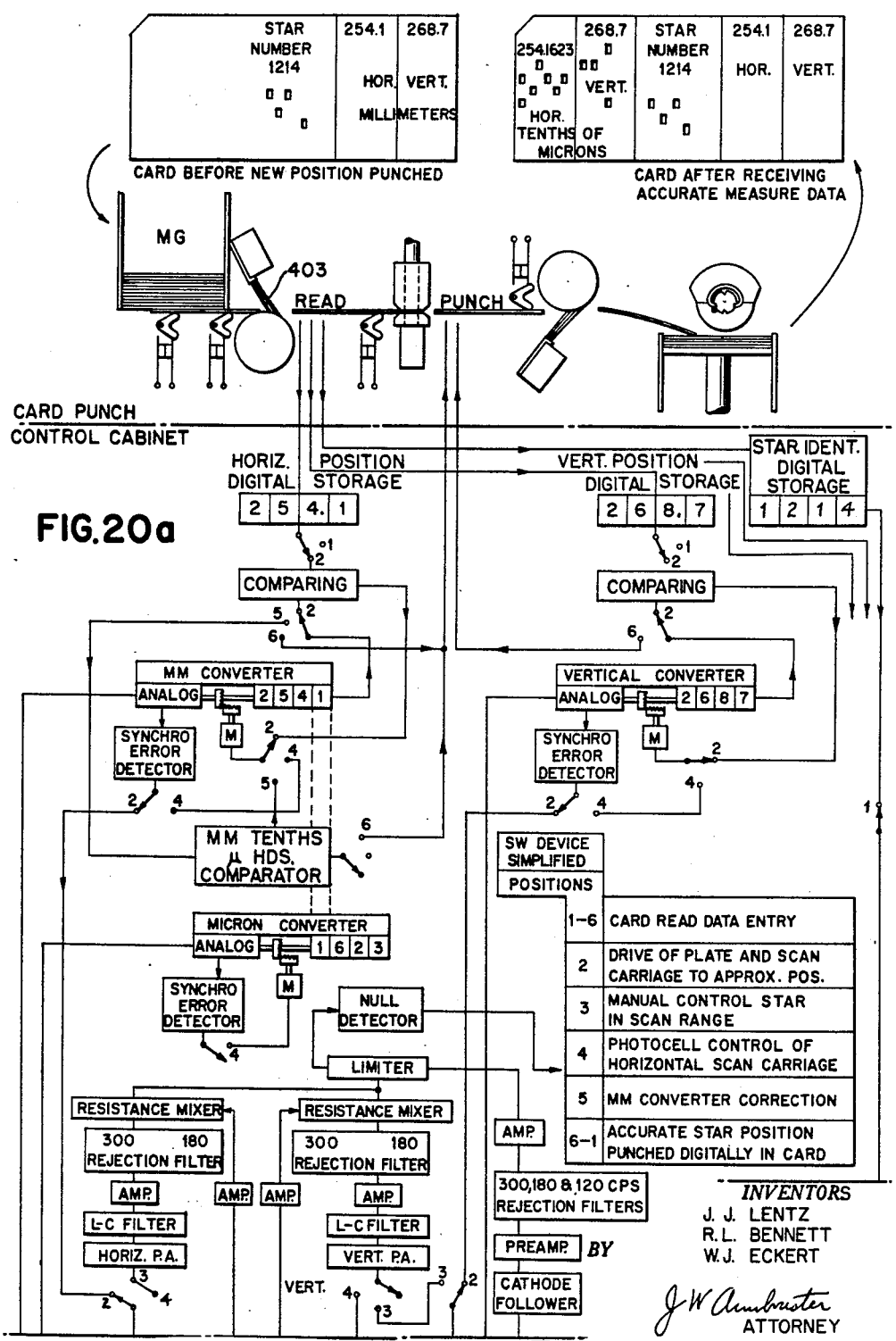

Jan. 26, 1960     J. J. LENTZ ET AL     2,922,332
ELECTRONIC DEVICES FOR LOCATING AND MEASURING INDICIA
Filed May 16, 1955     66 Sheets-Sheet 17

| FIG. 22 | FIG. 23 | FIG. 24 | FIG. 25 | FIG. 26 | FIG. 27 | FIG. 28 | FIG. 29 | FIG. 30 | FIG. 31 | FIG. 32 | FIG. 33 | FIG. 34 | FIG. 35 | FIG. 36 | FIG. 37 | FIG. 38 |
|---|---|---|---|---|---|---|---|---|---|---|---|---|---|---|---|---|
| FIG. 39 | FIG. 40 | FIG. 41 | FIG. 42 | FIG. 43 | FIG. 44 | FIG. 45 | FIG. 46 | FIG. 47 | FIG. 48 | FIG. 49 | FIG. 50 | FIG. 51 | FIG. 52 | FIG. 53 | FIG. 54 | FIG. 55 | FIG. 56 | FIG. 57 |
| | | | | | FIG. 58 | FIG. 59 | FIG. 60 | FIG. 61 | FIG. 62 | FIG. 63 | FIG. 64 | FIG. 65 | FIG. 66 | FIG. 67 | FIG. 68 | FIG. 69 | FIG. 70 | FIG. 71 |

INVENTORS
J. J. LENTZ
R. L. BENNETT
W. J. ECKERT
BY
*J W Armbruster*
ATTORNEY

Jan. 26, 1960   J. J. LENTZ ET AL   2,922,332
ELECTRONIC DEVICES FOR LOCATING AND MEASURING INDICIA
Filed May 16, 1955   66 Sheets-Sheet 23

INVENTORS
J. J. LENTZ
R. L. BENNETT
W. J. ECKERT
BY
J W Armbruster
ATTORNEY

United States Patent Office 2,922,332
Patented Jan. 26, 1960

2,922,332
ELECTRONIC DEVICES FOR LOCATING AND MEASURING INDICIA

John J. Lentz, Chappaqua, and Richard L. Bennett, New Hyde Park, N.Y., and Wallace J. Eckert, Leonia, N.J., assignors to International Business Machines Corporation, New York, N.Y., a corporation of New York Application May 16, 1955, Serial No. 508,481

40 Claims. (Cl. 88—14)

This invention relates generally to precise measuring and recording devices and more particularly to record controlled photoelectric means for scanning star distribution on a photographic plate and automatically punching a card with star position digital values in tenths of microns.

Heretofore, star spacing measurements were made manually by an observer carefully adjusting mechanical devices to measure by eye the distance between star representations on a negative plate as found in millimeters and parts of millimeters and expressed in seven digits, the last of which were probably in error. Such observations could be used to operate a punched card key punch with settings of four figures representing plate distance in hundreds of millimeters and accurate to tenths of a millimeter. Two such numbers were put in the card as representative of the up and over or ordinate and abscissa dimensions of the location of the star indications as spaced from the axis of the X and Y line intersection at the lower right-hand corner of the photographic plate. A complete astronomical record includes a series of such plates which when taken together provide a picture of the appearance of the sky taken from one position. Along with such plates are sets of cards each bearing punchings representing the zone of the star, the number of the star and the distances of that particular star from the point of reference on the photographic plate, which is the common X and Y axis at the lower right-hand corner of the photographic plate.

Having such sets of plates and cards, the proposition is presented to provide more precise measurements of distances between stars than that afforded by dependence upon eyesight and manual adjustment. Therefore, it is the object of the present invention to provide automatic means for shifting photoelectric scanning means relative to a photographic plate and to seek out and pinpoint accurately the centralized position of each star representation and at the same time to calibrate the movements of the device as a locator of final position and thereby set up electrical controls which may be read out to exercise control over digital card punching instrumentalities which will record the star distances in tenths of microns. The difference in definition will be noted when it is pointed out that the original position card recordings were in tenths of millimeters, while the automatic recordings are to be made in tenths of microns, while a micron is one-millionth of a meter. Other relationships may be noted by recalling that 39.37 inches are equal to one meter and therefore one micron is about equal to 40 millionths of an inch and one-thousandth of an inch is equal to about 25 microns.

The main object of the invention is to provide improved means for measuring very accurately and recording the positions of stars as they appear on photographic plates.

The star images appear on large negative films or glass plates about 17 inches square. When these pictures are taken there is a large amount of overlapping of the areas recorded on adjacent plates to insure complete coverage of the sky area. On each plate the stars appear as small round or elliptical darkened spots. Near the lower right-hand corner of each plate is a reference point or axis of vertical and horizontal lines, and it is from this point that the horizontal or abscissa measurement is taken and from the same point the vertical or ordinal distance is also measured.

In the past these star positions were measured and recorded in star position catalogues. However, the figures were arrived at more or less in a manual fashion although some mechanism was provided in the form of a heavy measuring frame whereon the photographic plate was secured while vertical and horizontal measuring carriages were moved relative thereto. These measurements and the final determination were arrived at by manipulation and visual observation. The old readings of the horizontal and vertical positions of each star were relatively coarse and presented in millimeters and parts of millimeters in the star catalogues. Now it is proposed to add three more accurate decimal places to the position readings and arrive at a positional figure in tenths of a micron.

In the present instance the old form of machine for holding the photographic plate and the shifting and observing means movable relative thereto is preserved; i.e., the measuring is done mainly by large horizontal screws for shifting a carriage which holds the sighting means for measuring distance between the axis and the star position. The heavy screw also has a graduated wheel which heretofore provided the graduations to be sighted for manual observation. However, to achieve the higher degree of accuracy there is now added to the machine, automatic controls for positioning the plate vertically as it is scanned horizontally by movable photoelectric means for centering the star image in the exact optical center of an optical scanning device. The old and new star position measurements are recorded in punched cards. At first a card bears only the old measurements as derived from the previous manual measurements, and these digital values in tenths of millimeters are used automatically from a card reader to set the optical scanning device and vertical plate moving means in such a fashion as to provide a rough coincidence of the particular star image with the optical scanner. After the coarse setting is made there is manual intervention to provide a further preliminary adjustment of the plate and scanner to bring the star image within a confined area that is swept by a hemispheric opening to generate photoelectrically a sine wave form of electrical indication which, when corrected by positioning to provide a steady output free of amplitude or phase relationships, then guarantees that the star image is centered with respect to the optical scanner. As the optical centering operation takes place in the three operations; that is, under card control, under manual control and under optical control, there are operated vertical and horizontal movement control synchros, the latter being made in a finer degree by the provision of two synchros, one for a coarse measurement in tenths of millimeters and the other for a finer measurement in tenths of microns. The three synchros are coordinated with analogue to digital converters each of four digits and settable by the card reading, one converter provided for the vertical star measurement and the other two for the horizontal measurement. Of the two provided for the horizontal measurement, there is an overlap of the lowest order millimeter digit position and the highest order micron digit position. So it is between the two horizontal converters that a 7 digit measurement output is provided. These readings of four digits for the vertical and seven digits for the horizontal measurements are automatically read out at the end of the optical measuring operation and caused to effect punching back into the same card, the accurate measurements corresponding to the same star of which the less accurate measurements were derived in the first place.

Another object of the invention is to provide improved forms of digit storage and comparing means. The digit storage in a counter is made to represent steps of voltage and these 10 degrees of potential are compared with progressively varied potential through commutators in digit representing devices of analogue to digital converters. As a synchro drives a converter to a digital match, it also sets the star measuring devices.

Another object of the invention is the provision of improved forms of sequencing or programming controls in association with position measuring devices operated under record control. A number of measuring devices are not only stepped to take up positions under control of the card but are arranged also to be sequentially operated under electronic controls to take a reading of such derived positions and make a punched record thereof.

Another object of the invention is to provide an improved form of optical scanning device and measuring controls wherein the scanner generates an alternating current, the amplitude and phase of which are indications of relative measurements. Cooperating with the optical scanner are pairs of coordinated synchros and measuring devices for seeking to center the optical system very accurately on a particular indicium. A novel feature of the optical scanner is a regulated hunting control for limiting the number of swings of the measuring device on both sides of the indicium as the measuring devices swing back and forth under control of the optical scanner. A counter is provided for this last-mentioned purpose and limits the number of swings and regulates the direction of the swings so that the last one always comes from the same direction and thus eliminates errors due to backlash in the measuring parts. The hunting action generates pulses for operating the counter to detect and limit the number of swings.

Anothehr object of the invention is the provision of an improved form of null detector which cooperates with the scanner output in the form of a photoelectrically generated A.C. to detect the point at which the star image is centralized with respect to the optical scanner and thus creative of a steady potential rather than an A.C. variation.

Another object of the invention is the provision of means for automatically cataloguing the relative positions of various object representations. In the illustrative embodiment, the positions of stars on photographic plates are automatically measured accurately and then automatically punched to the fifth position of a metric decimal in record cards. Not only is the automatic measuring device far more accurate than a process by visual and manual operation, but it is also so much faster, that about four times the volume of work may be performed than that accomplished heretofore in a given time.

Another object of the invention is the provision of digital to analog converting devices wherein the conversion is reversible within the same device; i.e., a digital to analog value is immediately changed back from an analog to a digital value again. The input is a comparatively coarse digital value in tenths of millimeters and the output digital value is finely divided and expressed in tenths of microns.

A further object of the invention is the provision of optical devices for a scanning system involving a photocell and wherein the light through the scanner opening is so diffused that the opening acts more like a diaphragm than a mask. The advantage is that a large common surface of the cell is controlling rather than different small sensitive areas.

An object of the invention is to provide photoelectric means whereby an object or indicium is so scanned as to generate a sine wave potential, the amplitude and phase of which are influenced by the indicium position. When the indicium is truly centralized or located with respect to a predetermined reference point, then the current is steady. In the present embodiment the indicium is held steady and projected against a rotating hemispheric opening. The latter is mounted on a movable photoelectric holder with an accurate lead screw shift which is calibrated and measurable in microns of photoelectric shift. When the indicium is first sensed relatively remote from centralized in the hemispheric opening, it creates a sine wave with amplitude high on the side opposite that side of the center of the opening occupied by the indicium. This causes a corrective movement which is overcompensated with a shift in amplitude to the opposite side. The side to side motion of the photoelectric scanner is allowed to take place for five oscillations, and then finally always brought over from the one side to centralize the indicium, i.e., to shift the scanner so that the indicium is centralized therein.

An object of the invention is to provide devices for measuring very accurately the distances between indicia on records.

Another object of the invention is the provision of photoelectric scanning devices for locating and measuring the position of a spot on a photographic negative.

A further object of this invention is the provision of sensitive carriage adjusting devices for moving photoelectric devices accurately with respect to an object to be scanned and to take readings of such movement and record such readings representative of measurements to a fine degree.

A feature of the invention is the provision of photoelectric controls for adjustment of a lead screw position to be truly representative of distances scanned by the photoelectric scanner carried by said lead screw.

Another feature of the invention is the provision of a scanning disk or light chopping arrangement in the photoelectric controls whereby the light through the scanner is influenced by the presence of a dark mark such as the representation of a star which influences the amount of light directed through the scanner so that it fluctuates in a manner generally similar to the sine wave fluctuations of an A.C. current. The scanner disc is cut with a semi-circular opening for the projection of light therethrough and it is in this area swept by the semi-circular opening that the star marking intercepts light at a certain position according to its position off the truly centralized location. As the star image is swung back and forth in an area of the scanner opening due to the hunting efforts of the synchro controls to effect the centralized position, the star image causes the photoelectric light response to fluctuate as a sine wave effect in synchronism with an invariable sine wave projection and between the two there is a difference in phase produced by the movement of the star image to the left and to the right of the center of the hemispheric opening. The output of these two current sources, i.e., the invariable sine wave generator and the variable photoelectric sine wave projector, are communicated to the motor for adjusting the lead screw which vibrates the photoelectric carriage in the hunting motions back and forth across the star position. After a predetermined number of such oscillations (the count is usually five) the hunting action is terminated and the motor is actuated at low speed to reduce the drive signal to zero. It is at such a position that the star image will be truly centralized with respect to the axis of the semicircular opening of the scanner and it is at this axis where the star image is truly centered and the lead screw position, since it always approaches the centralization from the same side, takes up all backlash and gives an accurate reading of the position of the image. The lead screw has associated therewith accurately geared coarse and fine reader controls which are synchronized with other electrical reader devices for controlling the card punching mechanism to represent digitally in tenths of microns the position of the lead screw which in turn reflects the final position of the photoelectric carriage after it has accurately scanned and located the star image.

Another feature of the device is the provision within the photoelectric scanning devices of a corrective means for varying vertically the image of the star as it is shown against the opening in the scanner. At this point it may be well to explain that precise measuring is done along only one axis at a time. The machine is arranged so that the precise machined lead screw is arranged horizontally and it is along this axis where the precise measurements are made in one operation. In order to get the other component, the photographic plate is swung around 90° for another operation and then the Y axis is treated as though it were a horizontal axis.

As to consideration of why corrective measures must be taken in the vertical direction, it will be pointed out later that the star image is brought over into the sphere of activity of the scanner manually and in doing so, the position vertically is seldom initially centralized. Therefore, while the photoelectric scanner is operated primarily to get the true position horizontally, it is also necessary to bring the image down to the center of the scanning opening and this is done by directing the image through a pivoted sheet of glass. Of course the image is refracted or offset in passing through the glass and by varying the angular positon of the sheet of glass, it is possible to in effect change the thickness of the glass presented in the path of the light ray. A scanner controlled motor drive is connected to the pivoted sheet of glass and it is driven to oscillate either one way or the other depending on which direction the star image is off center. By swinging the glass, the projected image of the star is offset from its true position and brought to the central position while hunting continues in the horizontal direction.

Another feature of this invention is the provision of an extra carriage within which the photoelectric scanner carriage is suspended. The extra outer carriage is mounted on three wheels rolling on fixed horizontal rails of the machine and provides a hollow outer frame within which the inner effective carriage is geared to the lead screw and slidable upon accurately machined ways. A series of counter balancing weights are arranged to suspend the inner carriage on the outer frame so that the full weight of the precisely moving inner carriage is not pressed upon the accurate driving and moving parts of the machine.

Other objects of the invention will be pointed out in the following description and claims and illustrated in the accompanying drawings, which disclose by way of example the principle of the invention and the best mode which has been contemplated of applying that principle.

In the drawings, Fig. 1 is a sectional plan view of the star measuring device showing the drive screws for the horizontal carriages.

Fig. 3a is a detail view showing the horizontal driving motor as it is assembled on the outside of the cabinet for enclosing the measuring device.

Fig. 6a is a detail view showing the arrangement of guide marks on a transparent plate, said marks furnishing a gage for manually locating the star image in an approximately centralized position to come within the scope of the automatic scanning devices.

Fig. 6b is a detailed view showing the two hemispheric plates which are so assembled that the centralized beveled notches therein form a hermispheric opening with knife edges to be free of reflection when passing light therethrough surrounding the star image. These two plates are brought together and held in the rotating means for scanning the star image.

Figure 20B:
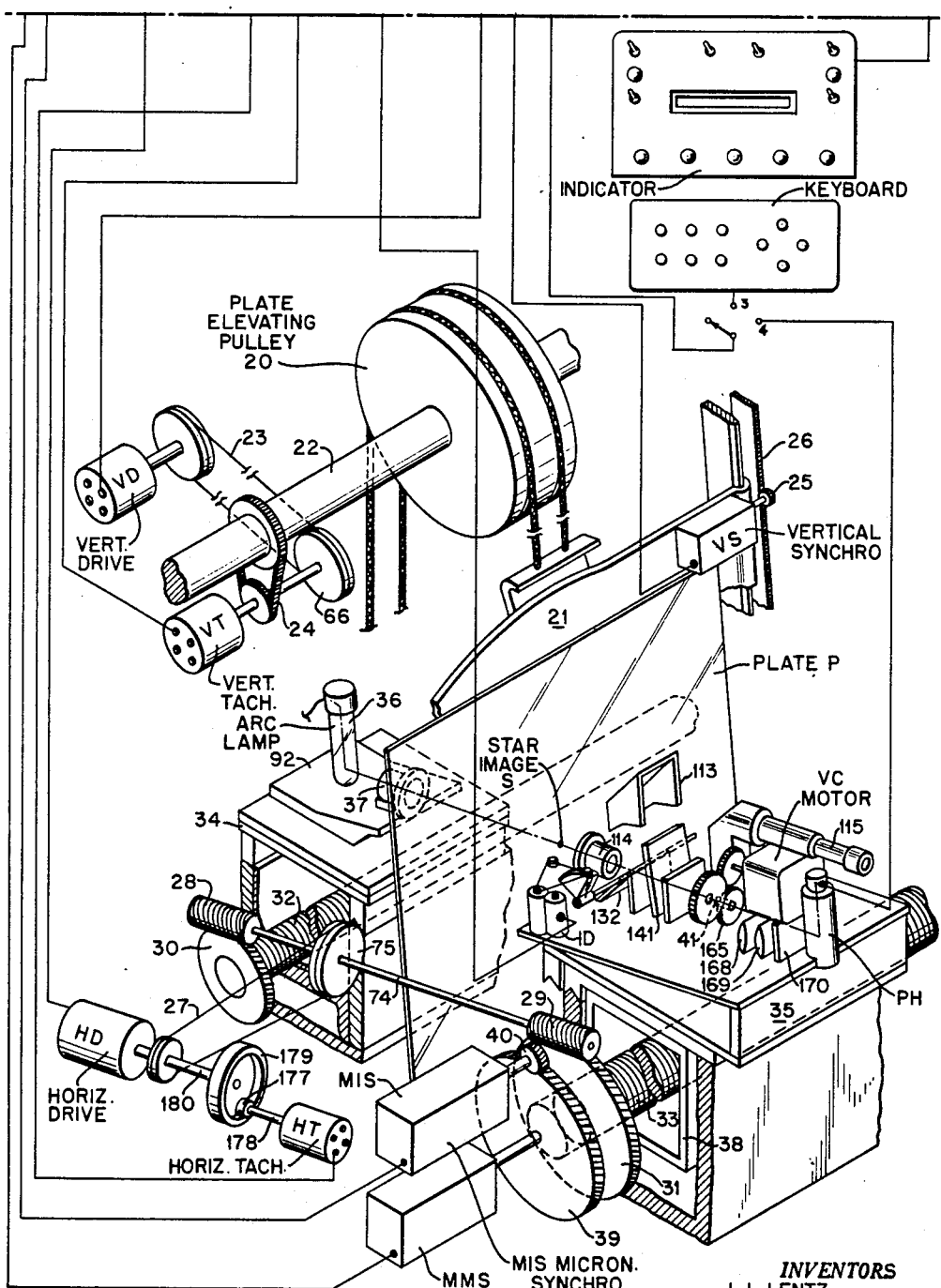

Figs. 20a and 20b when taken together, one above the other, provide a diagrammatic showing of all the mechanical, electrical and electronic controls of the star measuring device.

Figures 21, 22:
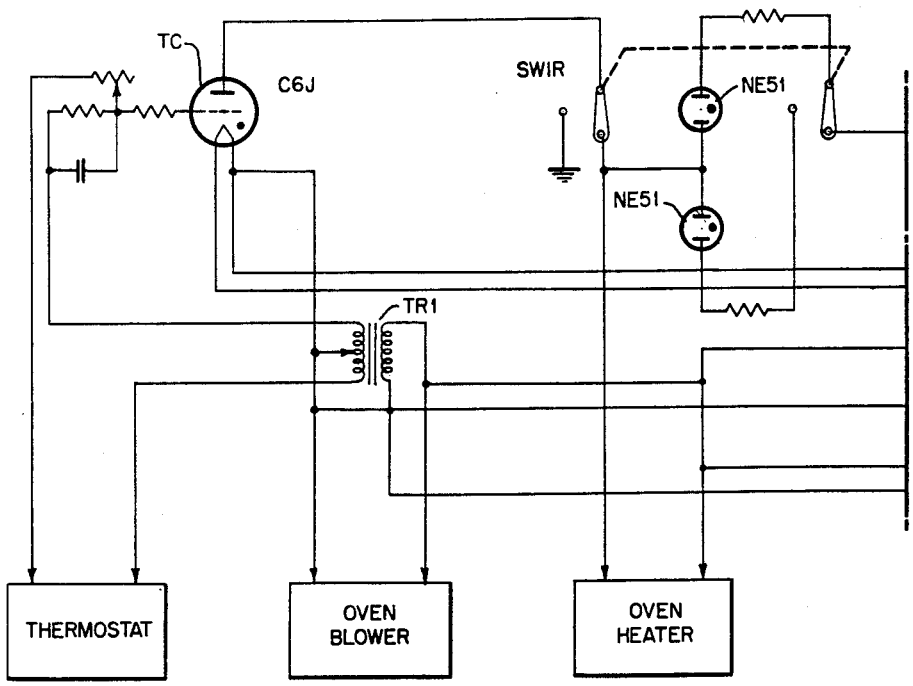

Fig. 21 is a diagrammatic view showing how the many sheets of the wiring diagram are to be assembled to form a unitary showing of the electrical and electronic controls of the star measuring device.

Figs. 22 to 71 when assembled as shown in Fig. 21 provide a wiring diagram of the machine.

It is noted in Figs. 20a and 20b that the system involves three main components, the card reader and punch, the control unit holding the electrical position storage and read out devices and the measuring frame for holding the photographic plate and the photoelectric controls cooperating therewith. These various units are connected by cables so that the card reader controls the position storage counters and also has a cable for bringing back to the punch those readings representing the final stopping position of the follow-up counters in the control unit. And then there are further cable connections between the control unit and the plate holder whereby the position set up in storage by the card is controlling over the initial operation of the plate holder to bring the star image into an approximate centralized position. Controls pass back and forth from the cables between the control unit and the plate holder so that not only is the latter controlled by the former for initial settings, but the former is finally controlled by the plate holder so that the end result is productive of a reading showing accurately the positioning of the lead screw. The effect of one unit on the other is in a sense reversible in that the card first sets up the control unit to represent a position, which position is communicated to the plate holder and then after the plate holder is brought to a definite final setting, such a setting is communicated back to the control unit and from the control unit back to the punch to effect a new set of punchings in the card which was the original control.

Before going into details regarding the nature of the mechanism, it is believed well to first point out the manner of operation and the way in which the machine is controlled by an operator. When it is desired to acquire more definite readings of the stars on a certain negative plate, the negative plate is assembled fast in the plate holder. Then the punched cards corresponding to that certain plate are put into the magazine of the card reader and punch. As part of the orientation procedure the operator controls manually the motors for the plate holder shifting mechanism, that is to lift vertically or lower the plate holder and also operate the lead screw so that the photoelectric devices are brought into a position central with reference to the X and Y axis of the plate. After these initial series of operations have been performed, the operator switches the controls over the automatic control under control of the follow-up devices in the control unit. This starts the card reader operation and the first card passes under sensing brushes in the card reader and the position representing numbers in the card are transferred to the control unit and set up in storage counters. At the same time, a cooperating pair of converters which contain the follow-up counters controlling the horizontal and vertical drive motors of the plate unit are called into operation and they operate to match their settings with the settings of the numbers derived from the card and in so doing control the plate holder so that it is shifted to bring a certain star image into an approximately centralized position. It is this position which was the result of a manual reading taken at some previous time. Now the operator is ready to intercede and provide further adjustment. She has before her in the optical system, a viewing screen upon which is a vertical hairline and a pair of horizontal lines drawn rather closely together and representative of a space of about 80 microns. The star which it is desired to measure is usually found to the right and elevated above the intersection of the horizontal and vertical lines. She then has at her disposal four keys for controlling the up and down vertical movement and the side to side horizontal movement of the motors for shifting the scanner and the photographic plate relative to each other. She then presses any of these four keys for bringing the star image within the area of the two horizontal lines and over to the left to be near the vertical line. The next step in the operation is the operation of starting control keys for selecting mechanical operation for automatic scanning while the photoelectric scanning disc is rotating and the control therefrom is imparted to a vertical correcting motor and a horizontal drive motor, the latter serving for twisting the lead screw which thereupon oscillates to carry the photoelectric frame back and forth in a hunting operation to try to centralize the star image within the circle of the light projecting through the rotating semi-circular scanning opening. It is at this time that the obstruction afforded by the star mark on the plate cuts out light at certain operations of the cycling of the scanner and thereby effects the phase relationship of the scanner's sine wave output to the photocell as contrasted with the invariable sine wave carried directly to the horizontal motor in synchronism with the scanning wave. In the motor the field coil windings are of a dual nature and arranged at right angles to be influenced by differences in phase between the controlling currents directed through from the two sources. It is through the variations by the scanning source as influenced by the star image position which causes the horizontal motor to drive the lead screw back and forth in a search for true centralization. However, even when true centralization is found it is not initially made determining, but the mechanism is allowed to hunt for a predetermined number of times and for a predetermined number of swings and it is only after the final swing in a certain direction that the hunting is caused to stop and stopping always comes when the swing is from a predetermined direction so that the lead screw always takes up the photoelectric frame and drives it towards final registration in that one direction. Upon the attainment of perfect registration from that certain direction, the drive motor is neutralized by a zero drive signal relationship through the dual winding and thereupon the operation of the lead screw is terminated and the final accurate reading is available. Extending from the lead screw is a large gear to which are attached a coarse registering synchro motor arrangement and geared with a great reduction to the teeth on the outer rim of the large gear is another finely adjusted synchro control, both of which operate to convey back to the control unit counters the final setting of the plate reader. When the follow-up counters come to rest, there is automatically initiated a read out operation which is connected to the card punch and the punch is reactivated so the card passes beyond the interval between the reading brushes and the punches and goes under the punches row by row and they are operated to perforate the card with the reading in tenths of microns representative of the position of the star image as revealed accurately by the positioning of the lead screw.

Figures 1, 1A:
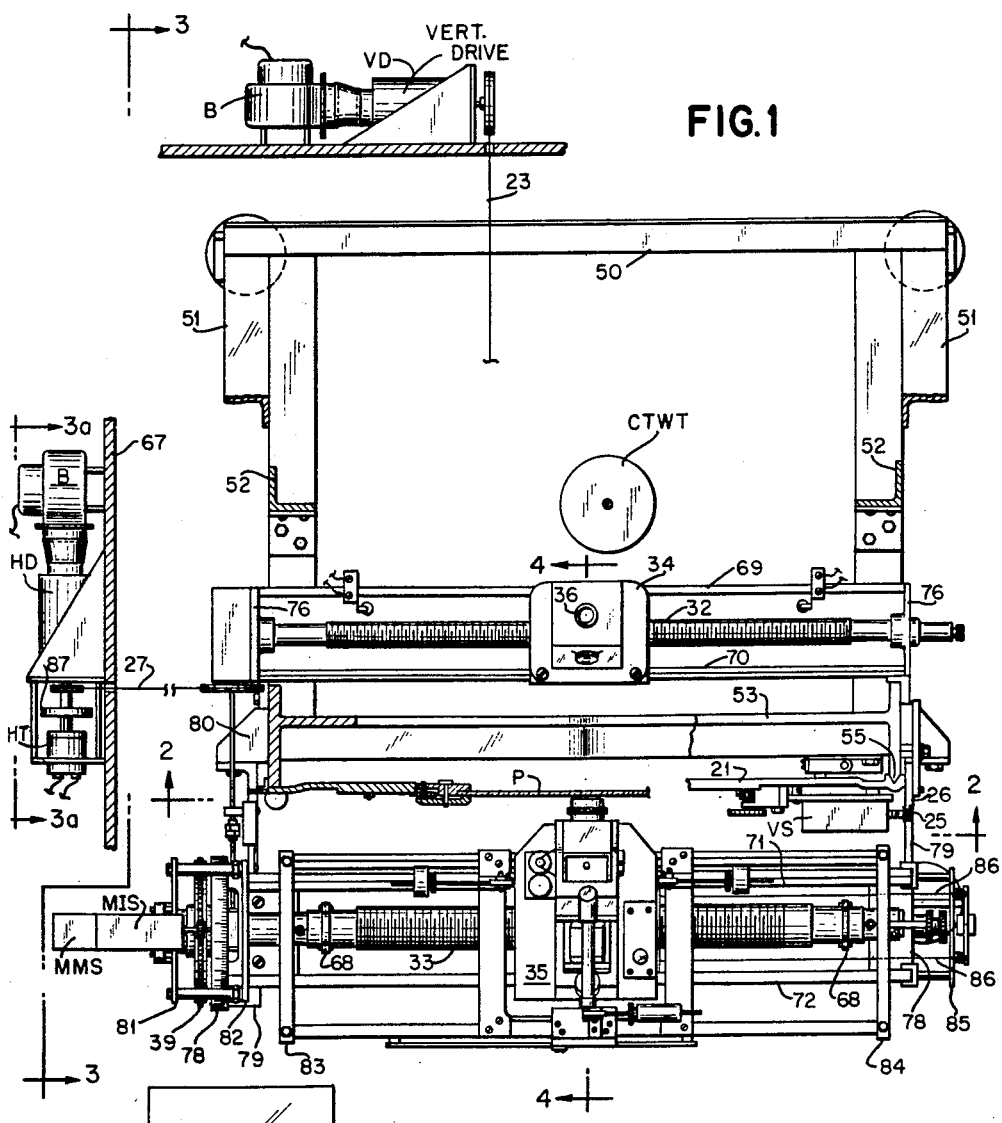
Fig. 1a is a detailed view showing several of the photographic star image plates as they are taken in overlapping positions to insure complete coverage of a sky area.

The photographic negatives or plates P, Fig. 1a, are shown to illustrate how several adjacent ones are taken in an overlapping formation so as to be sure to cover an entire sky area. The plates are clear glass squares about 17 inches by 17 inches, and the star images appear thereon as tiny black dots which are magnified about 20 times when being scanned. Magnification shows that each star image is composed of a group of isolated silver grains distributed over a roughly circular or elliptical area.

The positions of the fixed stars, as distinguished from the planets, are recorded in star catalogs. Positions from early catalogs can be compared with those from later ones for a study of the tiny motions that are revealing the history and arrangement of the stellar systems. In order to compile a star catalog, it is necessary to measure the coordinates of these star images relative to each other. From these many rectangular coordinates, there can be computed the celestial coordinates of ascension and declination of each star.

The plate P is aligned in the measuring machine by ganging a centralized and truly vertical position according to the known positions of three star marks, one at the top, one at the middle and one near the bottom of a line running vertically through the center of the plate. This is done carefully with the manual controls before the automatic measurements are initiated.

Before going into detail regarding the measuring devices, it is believed well to give a general explanation with reference to the diagrammatic showing.

It is already noted that the device includes three large main components and these with their auxiliaries are shown diagrammatically in Figs. 20a and 20b. At the top of Fig. 20a are shown a sample card and the presensing or reading punch which both reads it and perforates it. Below the punch on Fig. 20a are the contents of the control cabinet including the digit storage, comparing and converting devices, the switch or sequencing controls, and the photoelectric and electronic scanning, driving and synchro controls extending onto the top of Fig. 20b. The plate holder and measuring device with its main features are shown in perspective in Fig. 20b, and there are also illustrated the keyboard and the indicator console for the operator.

At the upper left of Fig. 20a a card is shown as it appears initially with perforations therein representing a star identification 1214, a horizontal or abscissa measurement of 254.1 mm. from the plate axis and a vertical or ordinate distance of 268.7 up from the axis. These figures are taken from a star catalog or crude measurements off the plate and perforated in the card. The cards in a deck such as those in magazine MG contain the approximate coordinates of the stars to be measured on a related plate P, Fig. 20b, which is scanned at the same time as the cards. The cards are arranged in order, there being one card per star in the order of an increasing X or horizontal measurement.

The sequence or program controls have several steps other than the six switch positions named at the right in Fig. 20a. There is, for example, a resetting step before the first card read and data entry step. However, in connection with the schematic showing, a simplified explanation is believed in order. Therefore, early in the first measuring operation the first card is advanced out of magazine MG and past the card reading brushes of the reading station of the punch. Thereafter the cards are fed into the punch one by one, a single card for each star measuring operation. Since the cards are read while in motion, digital storage is provided for all data for inspection and guidance of the operator, as well as for mm. digit storage of the two measured components for comparison with the digital output of the horizontal and vertical converters.

The presensing gang punch shown is of the IBM type 521 variety disclosed in greater detail in Reissue Patent 21,133 except that an extra reading brush station is put before the punch station. After passing under the reading brushes, the card is brought to rest before entering into the punching station. Several program or sequence steps take place to shift the plate relative to the scanning point under control of digit storage, manual control and photoelectric control before the card is again moved, this time under the punch. The data punched is that of the accurately determined horizontal or abscissa measurement which appears ni the card labeled "card after receiving accurate measured data." The punching is a seven place figure of 254.1623 mm. which is put in the same card bearing the coarse horizontal measurement of 254.1 mm. It is also usual to punch the automatic four place vertical measurement for contrast with the old manual four place figure, but it is possible also to make a second run of the same cards, after first turning the plate through 90° so that the vertical or ordinate distances can be measured by the dual horizontal converters and yield a seven place figure for the vertical coordinate. Digital storage is performed by devices such as those of Fig. 12 and as described hereinafter and in Patent 2,690,549.

Directly below the showing of the punch in Fig. 20a is the block illustration of the devices wherein the card readings are compared with the analog action of two converters which in turn control horizontal and vertical synchros to shift the optical scanner relative to the plate and thereby achieve true centering of the star image while taking the accurate measurements thereof. The three card readings of star identification, coarse horizontal digital position and coarse vertical digital position are put into storage as both observable information and comparing controls. The horizontal measuring controls at the left are seen to be more involved because it is along this axis that two pairs of converters and synchros are to be governed as contrasted with the single set of controls for the vertical plane.

Comparing is involved in the second step of operation. The stored vertical position digits of four places are compared with the four digital commutator elements of a converter such as that disclosed in the Roth et al. Patents 2,690,549 and 2,506,470 and shown in detail in Figs. 12–15. The digits from the punched card are stored in stepping switches from which a comparison is made with the analog-digital converters for their positioning. The electrical output from the digital storage and the converters represents the ten digits, 0 to 9, by voltages at 5 volt intervals from 5 to 50. During the step of setting the converter to agree with the number in digital storage, a comparing unit interprets these voltages, sensing first the highest order position, then the next lower in succession, etc., and so directs the converter motor to drive the converter in the proper direction to bring the two devices into agreement. The horizontal mm. and micron converters are similar in construction and operation to the vertical converter.

Each analog-digital converter, Fig. 20a, consists of two parts. The digital part operates similarly to an item counter with geared denominational orders and four 10 position commutators driven by a universal motor whose direction of rotation is controllable. The analogue part consists of two synchros, coarse and fine, geared to and driven in synchronism with the digital gearing and electrically connected to synchros geared to a movable measuring part of the plate holder. As the converter is driven to agree with the mm. value in digital storage, the plate holder shifting means is also driven as controlled by a synchro error detector to agree with the converter and in that way the initial setting of the plate holder both vertically and horizontally is made to agree with the two, four place mm. numbers sensed from and stored by the card.

Although four digit numbers (down to tenths of a millimeter) are used in the initial positioning of the vertical and horizontal components of shifting of the plate holder, it is necessary to provide a higher degree of accuracy for the horizontal measurement which is to be punched out. This finer degree of measurement is arrived at by means of photocell scanning and it is somewhat out of order to consider it at this point. However, there is a mechanical and electrical form of coupling between the millimeter converter and the micron converter which may be very well considered together at this point in the description. It is desired to attain a seven order digit reading of the horizontal screw position for shifting the plate holders. The additional three orders of digits are furnished from an auxiliary four digit or micron converter which is linked to a synchro unit geared to the periphery of a large gear on the lead screw to repeat in operation for each revolution of the screw. Near the lower part of Fig. 20a the micron converter is shown with its highest order position aligned with and connected for comparison with the lowest order position of the mm. horizontal converter. The difference between the two converters is that the micron converter is exact in the tenths of millimeters position, where the other unit may be off by one or two-tenths of a millimeter.

The necessity for a comparison and forced agreement in the overlapping position or denominational order of the two horizontal converters is shown in the following example. Assume that the millimeter converter is positioned at 247.9 mm. and the micron converter is at .0015. The 9 and 0 are in the same denominational position but the 0 is the correct digit. It is not sufficient merely to punch out the 0 since in this case the 9 must be corrected to read 0 to force a carry into the next column and give the correct reading of 248.0015. The comparing and correcting device is so designed that regardless whether the lowest order position of the millimeter counter is to be increased or decreased, the change is made in the shortest direction.

The main features of the plate shifting and measuring devices are shown in Fig. 20b. There it is noted that the plate holder is lifted and lowered vertically by means of a large pulley 20 over which steel ropes are drawn between the plate frame 21 and counterweights. The vertical drive motor VD is connected to the pulley shaft 22 through belting 23 and 24. A vertical drive tachometer VT is driven also off belting 23. A vertical synchro VS is coordinated with the vertical displacement by being fastened as a unit on the plate holder 21 and having an extending shaft and pinion 25 which meshes with a stationary rack 26 fixed to the main frame.

The horizontal measurement is taken not by movement of the plate but instead by movement of the optical devices relative to the plate. The horizontal drive motor HD is seen to have a belt drive 27 to a pair of connected worm gears 28 and 29 meshing with worm wheels 30 and 31 on the rear or auxiliary horizontal lead screw 32 and the main front control lead screw 33. Thus the light projecting carriage 34 on the rear screw is coordinated with image sensing or scanning device 35 carried by the front screw. On the rear carriage is an arc lamp 36 and a condenser lens 37 for directing light through the plate P and around the star image S. On the front carriage 35 there is an array or column of image handling devices which may merely be named here as they appear from left to right along the optical center; the objective lens, beam splitter, light stop, image vertical displacement glass, a light stop opening, the scanner, condenser lenses, a diffuser and the phototube. Hovering over these is the hooded observation screen and the sighting scope. This front carriage is delicately balanced on ways but firmly threaded on the lead screw 33 by many wooden sections (not shown) in the large nut 38 fixed to the bottom of the carriage. The large front lead screw 33 has a pitch of 1 mm. and is connected to the mm. synchro MMS. On screw 33 is a large gear 39 with which there is meshed the pinion 40 of the micron synchro MIS. Thus there is a 1000 to 1 ratio between the two synchros and they are connected to the related micron and mm. converters as shown.

After the first three steps of card entry, coarse drive and manual adjustment to scanning range, the star image is scanned automatically and the resulting light fluctuations caused by off-center positioning are directed against the phototube. The rotating scanning device contains a thin disk 42 through which a semicircular hole 41 (Figs. 6 and 6b) is cut. As the disk rotates in the path of the magnified image of the star, the amount of light transmitted to the phototube varies as a sine wave signal, the amplitude and phase of which are measures of the off-center position of the star representation on the plate. This signal is directed into electronic controls which distinguish components and amplify the signals for the phase sensitive motors and there supply power for the horizontal and vertical drive motors to work them until a non-fluctuating light condition initiates a null detector which calls for a change from the fourth to the fifth step or sequence interval of operation.

The fifth stage involves the correction of the mm. converter to make it agree with the highest order position of the micron converter; both of said converters having been driven under control of the horizontal synchros during scanning.

Finaly the adjusted settings of the converters are read out and into the punch station of the card punch. These final punchings will be of a four place value for the vertical measurement and of a seven order exact measurement of 254.1623 for the horizontal measurement as noted in the card at the upper right corner of Fig. 20a. A similar seven order control may be later exercised relative to the vertical measurement and also punched in the card.

It wil be noted that the measuring control as viewed in Figs. 20a and 20b starts with the digital representation in the card at the upper left and descends as analogue controls which operate the mechanical measuring means at the bottom. Then the scanning controls on the measuring means at the bottom send out analogue signals which go back up to the converters and there result in digital settings which control perforation of the card at the top right. So, in effect, the control describes a U-shaped path in coming out of the card and back to the card in a digital, analogue, analogue, digital procession.

At this point it is well to point out briefly some specific information concerning the mode of operation of the machine with reference to the schematic views, Figs. 20a and 20b. As already noted, the deck of cards shown in the magazine at the upper left, Fig. 20a, contains the approximate measurements of the stars to be measured on a given photographic plate. There is one card per star in the order of an increasing measurement in the horizontal direction. These cards are inserted in the magazine of the gang punch by the operator. There the cards are advanced one by one in response to signals from the sequence unit indicating that punching has been performed to record the position of one star and controls are in readiness to consider the measurements of another star. The mm. measurements are shown as holes punched in the card which is read by sensing brushes at the read station making contact through the holes and this information in the form of electrical impluses is transmitted to the digital storage counters. After the two approximate measurements for vertical and horizontal position have been stored in the counters, the card passes to a position just short of the punching station where is comes to rest temporarily while the exact star measurement is being made.

The next step of operation is initiated automatically and serves to move the photographic plate P relative to the optical devices in accondance with the crude measurements derived from the card. The numbers derived from the card are compared with the motions of analogue-digital converters. The comparison device emits a directional error indication which is applied to the drive motors of the converters causing them to operate until the converters agree with the counter storage relays. Having achieved agreement between the storage counter and the converter, the next step is to cause agreement with the plate positioning devices. This is done through the appearance of an error signal and the electrical synchro connection between the drive shafts of the plate measuring devices and the converters and causes devices to operate to drive the horizontal and vertical carriages of the plate holder to positions that agree with the converters. These preliminary movements should bring the star into the area of the viewing screen containing the reference lines, Fig. 6a, and then the machine comes to rest and readiness for manual operation under control of the keyboard.

Figure 17:
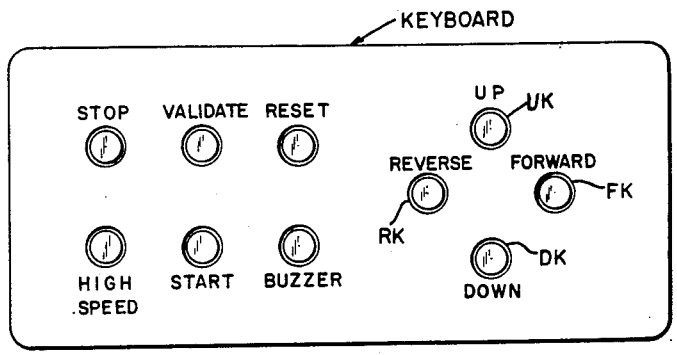
Fig. 17 is a plan view of the keyboard used by the operator of the measuring device.

The machine pauses in programming to allow the operator to inspect visually the star image to determine whether it appears too high or too low or to one side with reference to three lines on the viewing screen, Fig. 6a, which help to bring the image to the optically centered position. The operator selectively presses the systems control keys on the keyboard, Fig. 17, and causes the carriage drive motors to operate to shift the photographic plate up or down, and the optical carriage back and forth until the star image is clearly within the range of the rotating optical scanner. When the operator is satisfied the location is as accurate as can be determined visually, she then initiates further automatic control.

After control has been returned to the automatic sequencing devices, the error signal derived from optical scanning head causes the horizontal drive motor HD and the motor VC for the vertical correction image displacement to operate to position the plate scanning carriage very accurately in the horizontal direction and to deflect the image slightly in the vertical direction. Until the optical axis of the hemispherical scanner passes through the center of gravity of the star image, the electrical synchro connections between the horizontal and vertical measuring means and the converters furnish error signals to drive the converters to the new positions corresponding to the precisely measured coordinates of the star image.

Finally, the sequence devices cause the final measurements in the converters to be transmitted to the punch and there perforated in the pre-selected columns of the card which is waiting at the punching station. As the first card is punched, the second card is read and the whole cycle is repeated until the last card of the deck has been read and punched. Except for the stop for manual control just before final positioning, the complete process of measurement of the star position is carried out automatically.

Figure 2:
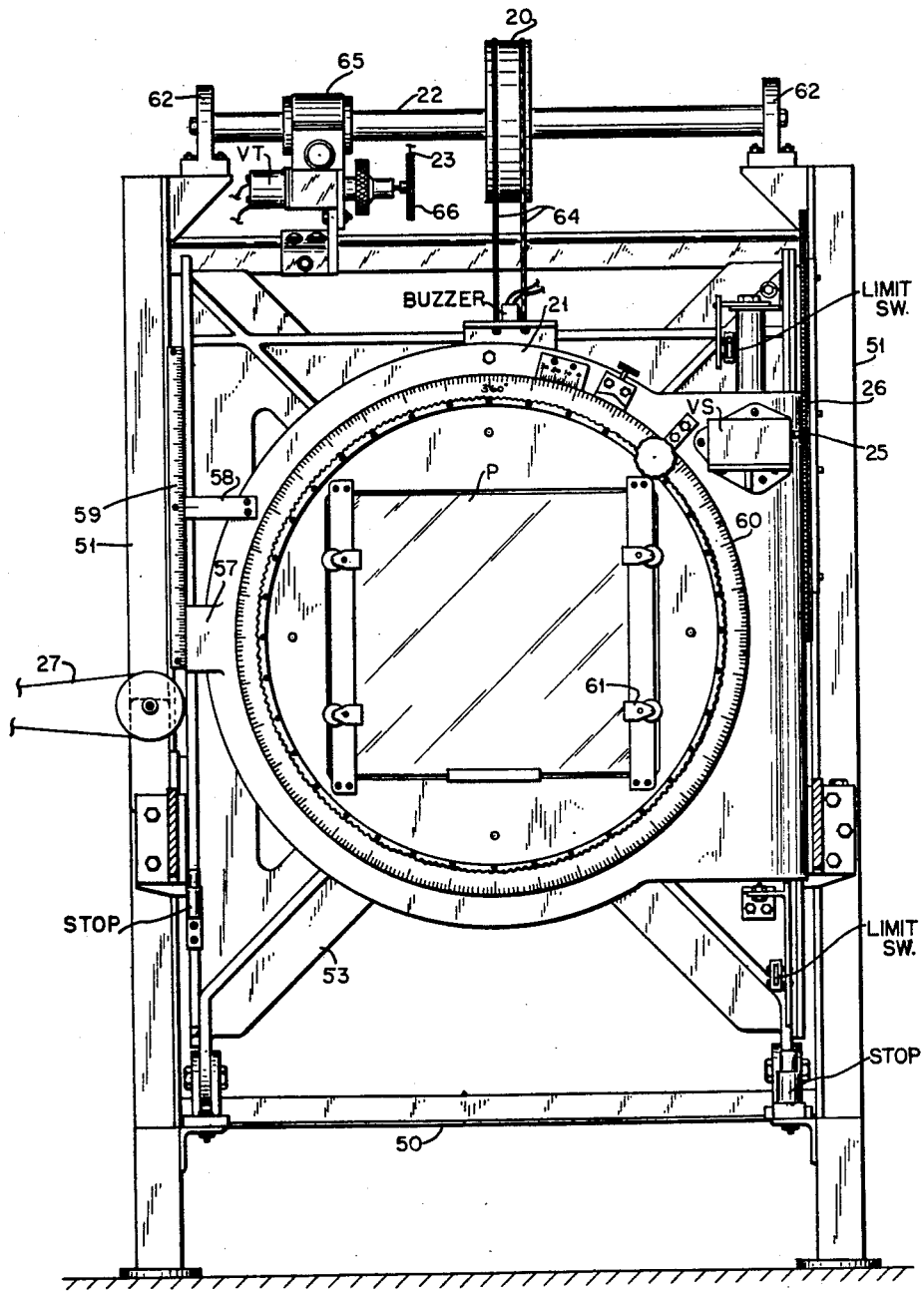
Fig. 2 is a front elevation view of the measuring device partly in section with the horizontal carriages removed to show the large assembly disk whereon the photographic plates are assembled to be measured.
Figure 3:
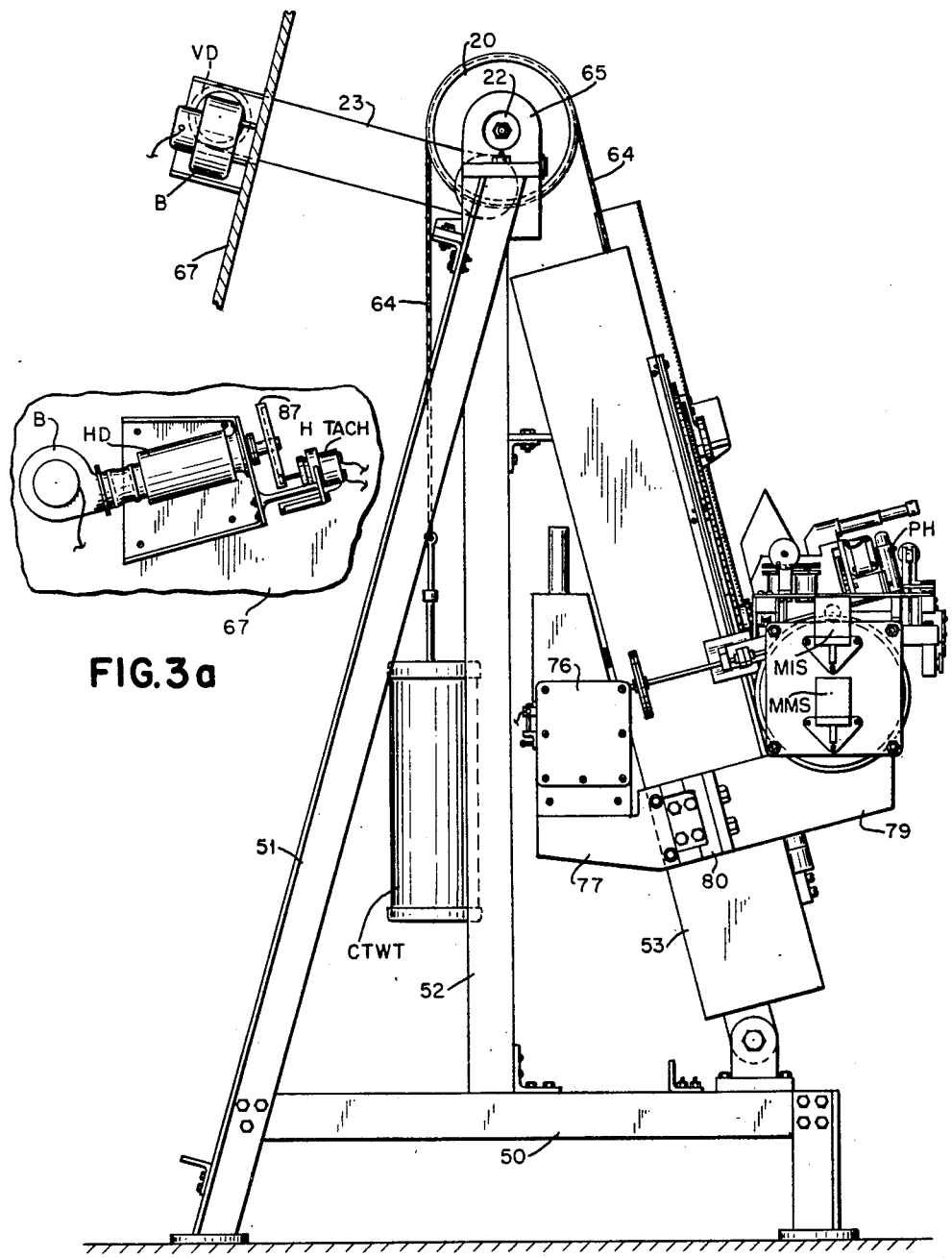
Fig. 3 is a side elevation view of the measuring device shown with the air conditioning cover removed.

The plate holder or measuring device is shown in Figs. 1, 2 and 3. The device is composed of a heavy frame made with riveted angle irons comprising a base portion 50 and three pairs of vertical support members tapering (Fig. 3) toward the shaft 22 at the top. There is a pair of rear members 51, a pair of central vertical uprights 52 and a pair of pivots for a heavy front easel frame 53. In the sectional view Fig. 1, it is seen that the easel frame is made with a T-shaped cross section and has a pair of cross braces, the whole being connected at the bottom by a pair of bolts (Fig. 2) secured to the base section. The easel frame 53 is slanted inwardly at the top and secured near the top to the vertical members 52.

Slidably mounted on the front of the frame 53 is the easel frame or plate 21, Fig. 2, the right side of which, Fig. 1, is formed with a V-shaped notch in engagement with a track or way 55 projecting along the edge of the frame 53. At the left side of easel plate 55, Fig. 2, there is simple sliding contact between the frame and the projection 57 and a carrier 58 for an indicating mark cooperating with the scale 59 secured to the main frame.

In Fig. 2 it is seen that the shape of the easel plate 21 is mainly circular and within the outer periphery there is secure a movable circular disc 60 provided with graduated scale for indications of angular movement. This central member is formed with a central opening bordered by plate holding means including four clips 61 which may be manipulated to hold the photographic plate P whereon the star images appear as black dots on clear glass.

Attached to the upper right hand corner of easel plate 21 is the vertical synchro VS with the projecting shaft and pinion 25, the latter meshing with a rack 26 secured to the inside of one of the flanges of the fixed supports of the main frame.

The vertical adjustment of the plate P is performed by sliding the disc and easel plate 21 up or down along the slanted surface of the easel frame. The adjusting means includes a heavy horizontal shaft 22 arranged across the top of the frame and supported in bearing blocks 62 resting on the top of the frame. This shaft carries the large pulley 20 over which there is drawn a pair of heavy wire ropes 64, one end of which is attached to the top of the easel plate 21 and the other end reaching down the back, Fig. 3, to carry a heavy counter weight CTWT. The arrangement of balancing is such that very little effort is required to shift the plate holder vertically.

Vertical drive movement is conveyed through a gear box 65 from one end of which there projects a small pulley 66 around which is drawn the belt 23 extending to another pulley connected to the vertical drive motor VD. It is noted in Fig. 3 that this motor VD is spaced outside the main frame and is secured to a panel board 67. The latter is part of a cabinet which is erected around the machine so that the interior may be air conditioned and temperature controlled so that whenever the measuring machine is in operation the parts are always operated under uniform conditions. By placing the drive motors on the outside of cabinet it is possible to dissipate the heat of the motors by blowers B and at the same time provide a system to supply heat in the cabinet to replace that lost by leakage through the walls. There is some heat generated inside the cabinet which is rapidly circulated to avoid hot spots around motor VC and the arc light 36 which is provided to control the photoelectrical scanner of the star images.

The foregoing section dealing with the vertical displacement of the star image is relatively simple and minute measurements are not taken in the vertical direction. The horizontal measurements are taken in a more complicated fashion which does not involve movement of the plate P but instead are controlled by the movement of photoelectric devices relative to the plate. These scanning devices are arranged in two parts on carriages on opposite sides of the photographic plate. On the one side we have the source of light which is projected against the plate and on the other side we have the photocell light receiving means for detecting the light as it passes through the plate and is influenced by the star image thereon.

The two parts as noted are arranged to slide along horizontally from left to right, Fig. 1, along pairs of parallel rails secured to the main frame. The rear rails 69 and 70 are spaced alongside the small horizontal lead screw 32 which controls the movement of the light source 36 which is an Ediswan arc light held on the frame 34. The front carriage supports 71 and 72 are arranged equally spaced from the heavy lead screw 33 with a pitch of one mm. to convey the large carriage 35 which supports a plurality of light handling facilities.

The pair of lead screws 32 and 33 (Fig. 20b) are geared together by the shaft 74 which carries the pair of worm gears 28 and 29 meshing with respective worm wheels 30 and 31 and carrying a pulley 75 around which is drawn the belt 27 also drawn around a pulley connected to the horizontal drive motor HD.

The main lead screw 33, Fig. 1, has riding thereunder a pair of ball bearing wheels 68 with terminals for attaching vertical wires which lift the screw to relieve pressure from its end bearings.

A pair of tension wires 86 are attached to the right side of main carriage 35 and maintain a steady pressure of the carriage to the right to prevent backlash in the nut and screw connection.

The rear horizontal screw 32 and rails 69, 70 are supported on bearing blocks 76 fastened to rearwardly extending brackets 77 (Fig. 3), fastened to the sides of the easel frame 53.

The front horizontal lead screw 33 and the rails or ways 71, 72 associated therewith are carried by side plates 79 fastened to large brackets 80 on the easel frame 53. Several end plates 81–85 not only tie together the long horizontal parts but also provide securing places for various control units.

It is already noted that the common drive for rotating the two horizontal screws 32 and 33 is derived from motor HD shown at the left in Fig. 1. There it is seen that the motor is also mounted on the wall 67 of the air conditioning cabinet similarly to the arrangement for the vertical motor. Here again there is provided a blower connection and a tachometer HT which is selectively brought into frictional cooperation with a flanged disk 87 on the shaft of the horizontal motor HD. When the horizontal carriage is given a long sliding movement, the tachometer HT is held out of operation and it is only engaged after the optical scanner has hunted and is making its final approach.

Figure 4:
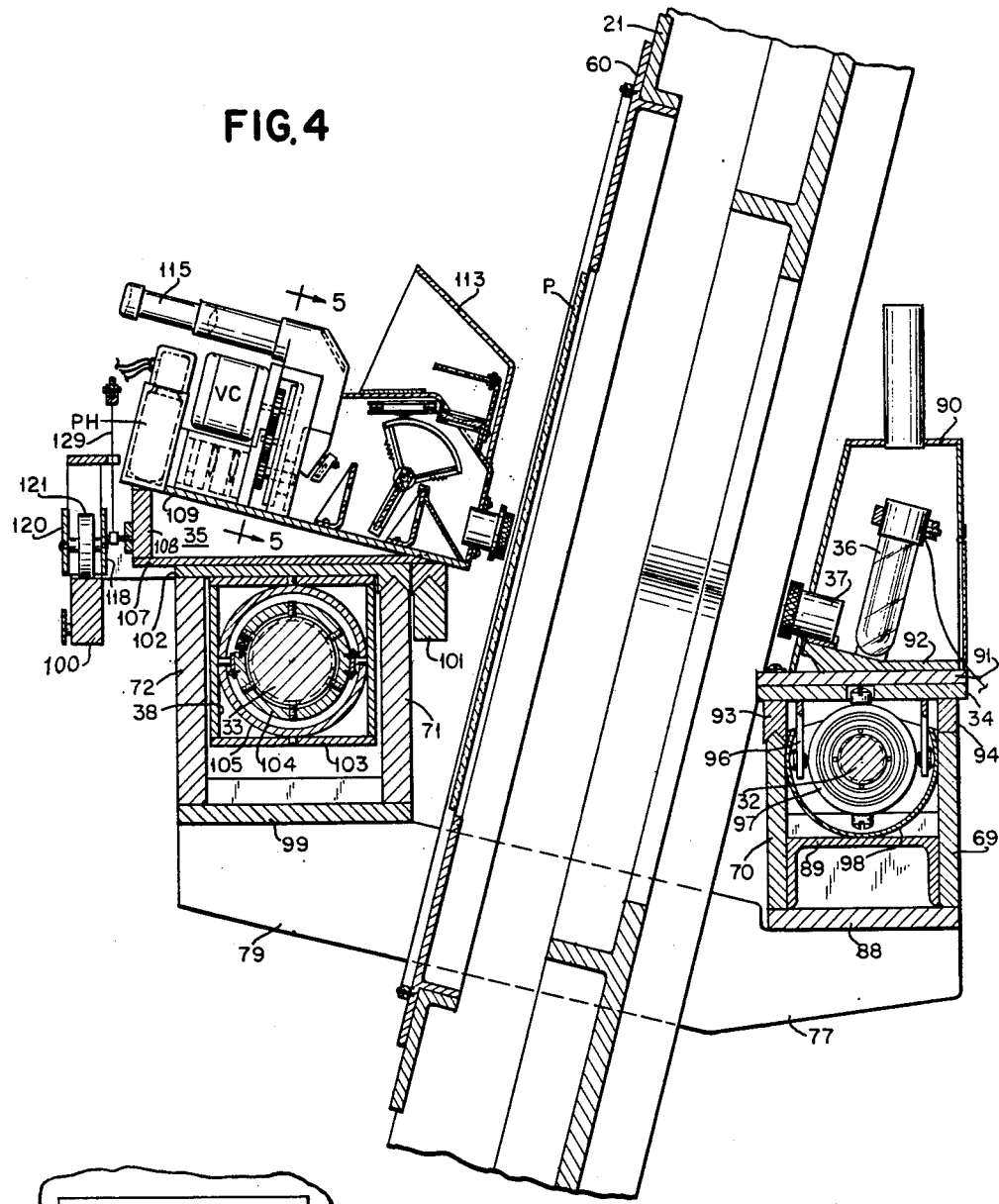
Fig. 4 is a sectional elevation view taken along the line 4—4 in Fig. 1 and showing the two horizontal lead screws, the larger of which is at the left and serves to position the photoelectric scanning and light receiving devices. The smaller lead screw at the right is seen to have a carriage which supports the light source and a focusing lens assembly.
Figure 5:
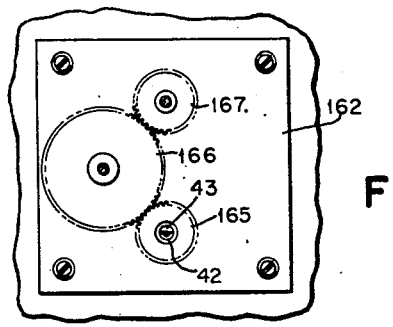
Fig. 5 is a sectional detailed elevation view taken along the line 5—5 in Fig. 4 and showing the gearing for driving the light scanning disk.

Turning now to consideration of the manner in which the rear carriage 34 is connected to the small lead screw 32, the best showing is in the sectional view (Fig. 4). The two vertical ways 69, 70 are supported on a base plate 88 and held separated by a channel 89. The carriage is composed of a completely enclosed light box 90 which is mounted on the top one of three plates 34, 91 and 92. The top plate 92 carries the light 36 and the condenser lens 37 for projecting the source light through the photographic plate P and around each star image. Fixed to the bottom of the other two plates 34 and 90 are rails 93 and 94, the former shaped with a V-shaped groove fitting over the guiding shape of the front way 70. Also projecting downwardly from the bottom plate 34 is a series of fingers 96 engaging a cylinder 97 which is fitted around the lead screw 32 and contains arcuate threaded members for engaging the thread of the screw. A large hemispheric spring 98 is arranged around the extending fingers and tends to urge them inwardly to hold the threaded members in engagement with the lead screw. It is apparent that when the screw 32 is turned, the rear carriage is shifted laterally to carry the light along therewith in synchronism with the objective light receiving facilities on the other carriage 35 cooperating with the main lead screw 33 which is about to be described.

The front horizontal lead screw 33 is much heavier than the rear screw 32 and the supports connected therewith are also made more sturdy because of the necessity for greater accuracy and the holding of many more parts. The front supports include a base plate 99 and four longitudinal rails or ways 71, 72, 100 and 101. The front pair 100 and 72 have a plain upper surface while the rear two are shaped with a ridge to guide and accurately locate the pair of carriages assembled thereon. Attached to the lower plate 102 of the primary carriage 35 is an elaborate form of nut which is contained within the supports 71, 72 and 99 already mentioned. This nut is a bronze cylinder 104 with approximately fifty radial wooden plugs providing contact and connection with the threads of the lead screw 33. This cylinder and plug arrangement is a form of gimbals with a ring 105 held within the box-like outer frame 103 which is attached to the bottom of the carriage.

Figure 6:
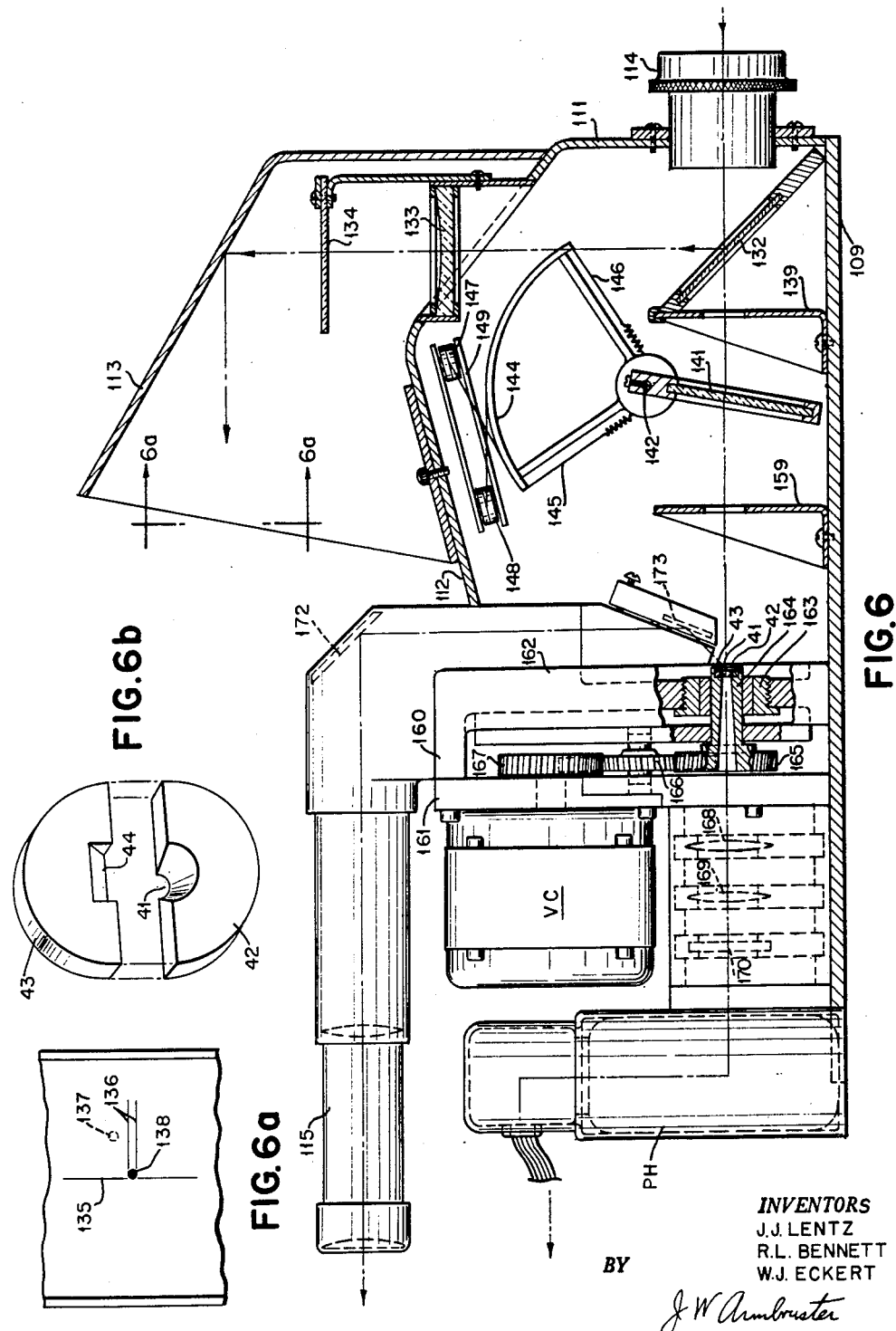
Fig. 6 is a side sectional elevation view of the star image light reflecting and scanning mechanism.
Figure 7:
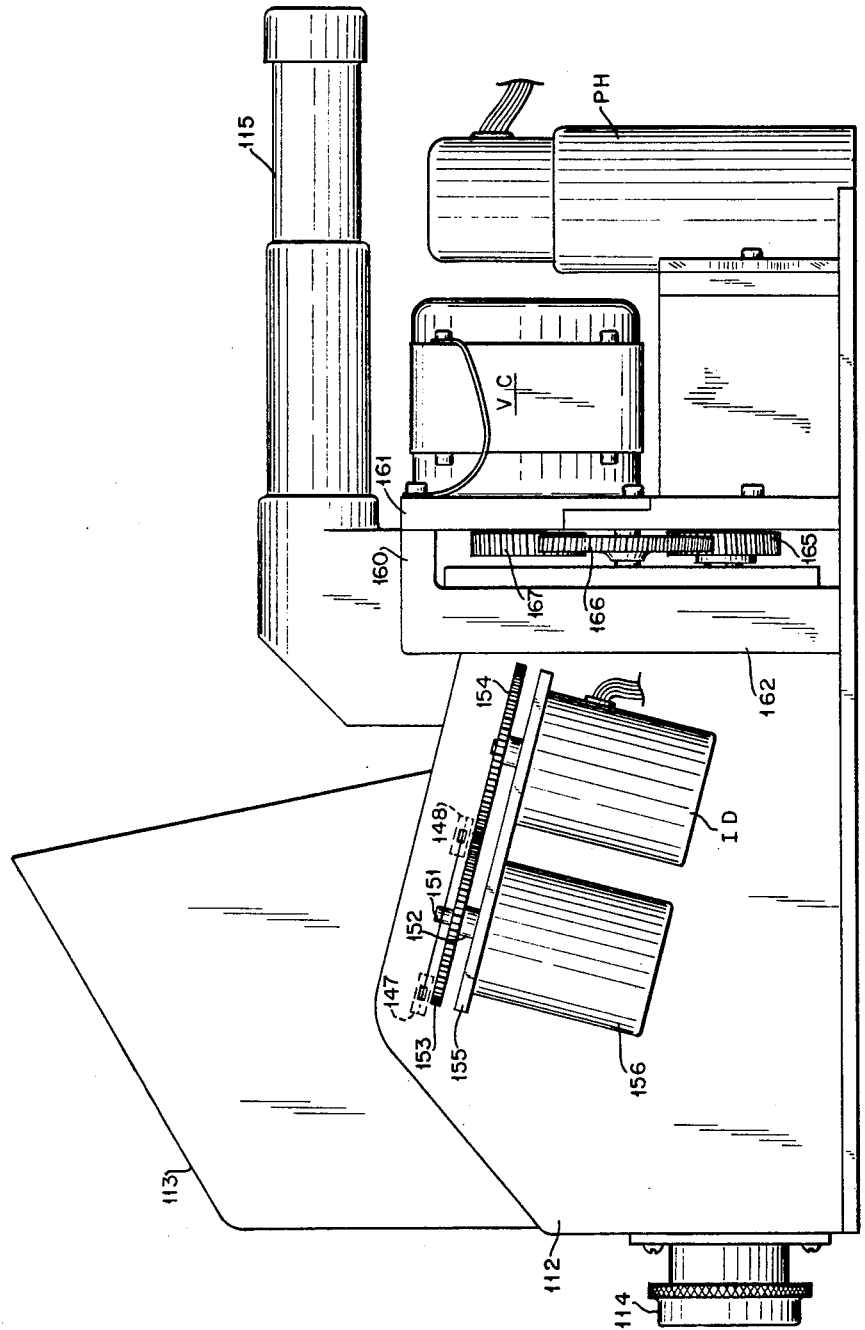
Fig. 7 is a side elevation view of the light reflecting and image scanning devices shown in section in Fig. 6.
Figure 8:
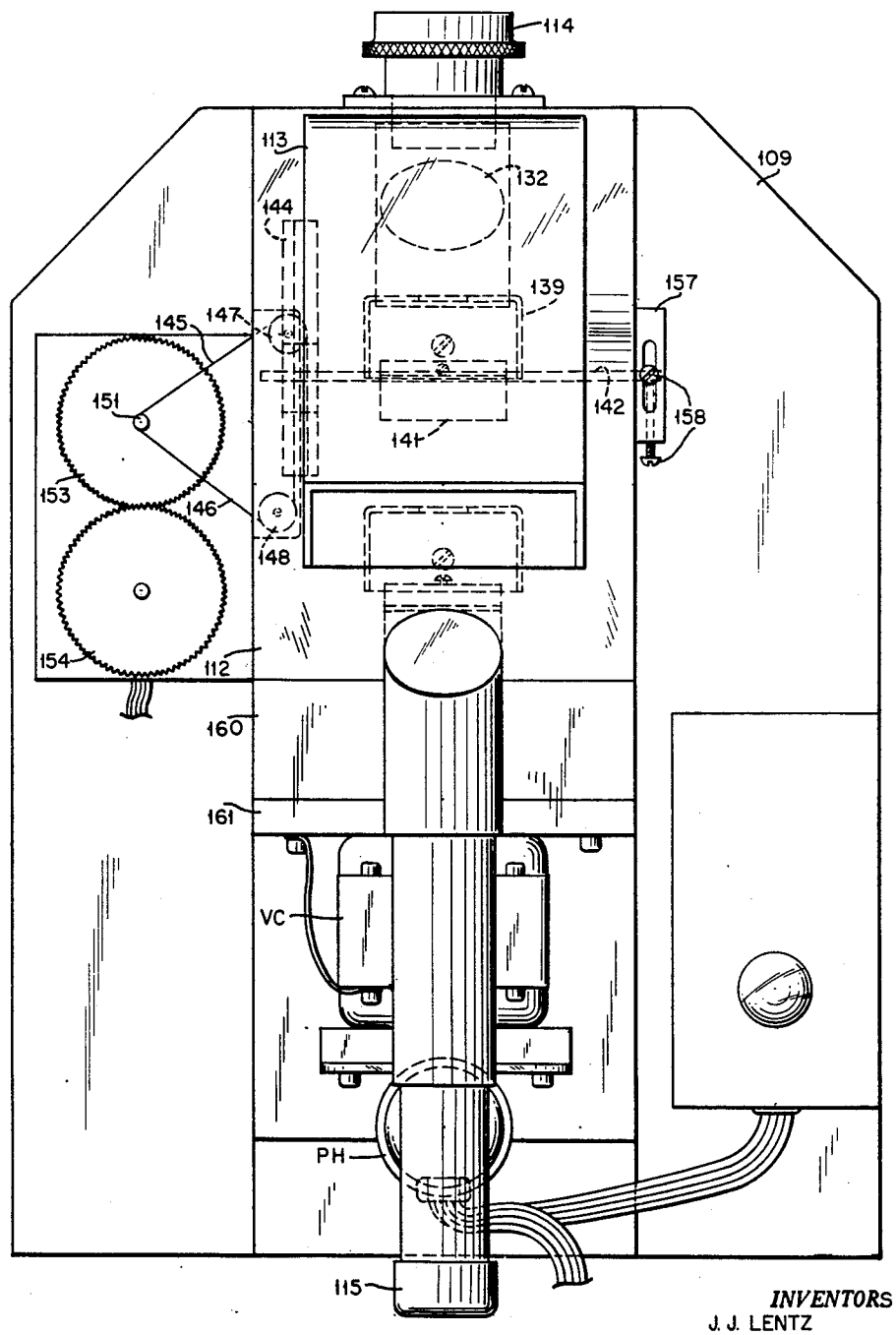
Fig. 8 is a plan view of the light reflecting and scanning mechanism shown in Figs. 6 and 7.
Figure 9:
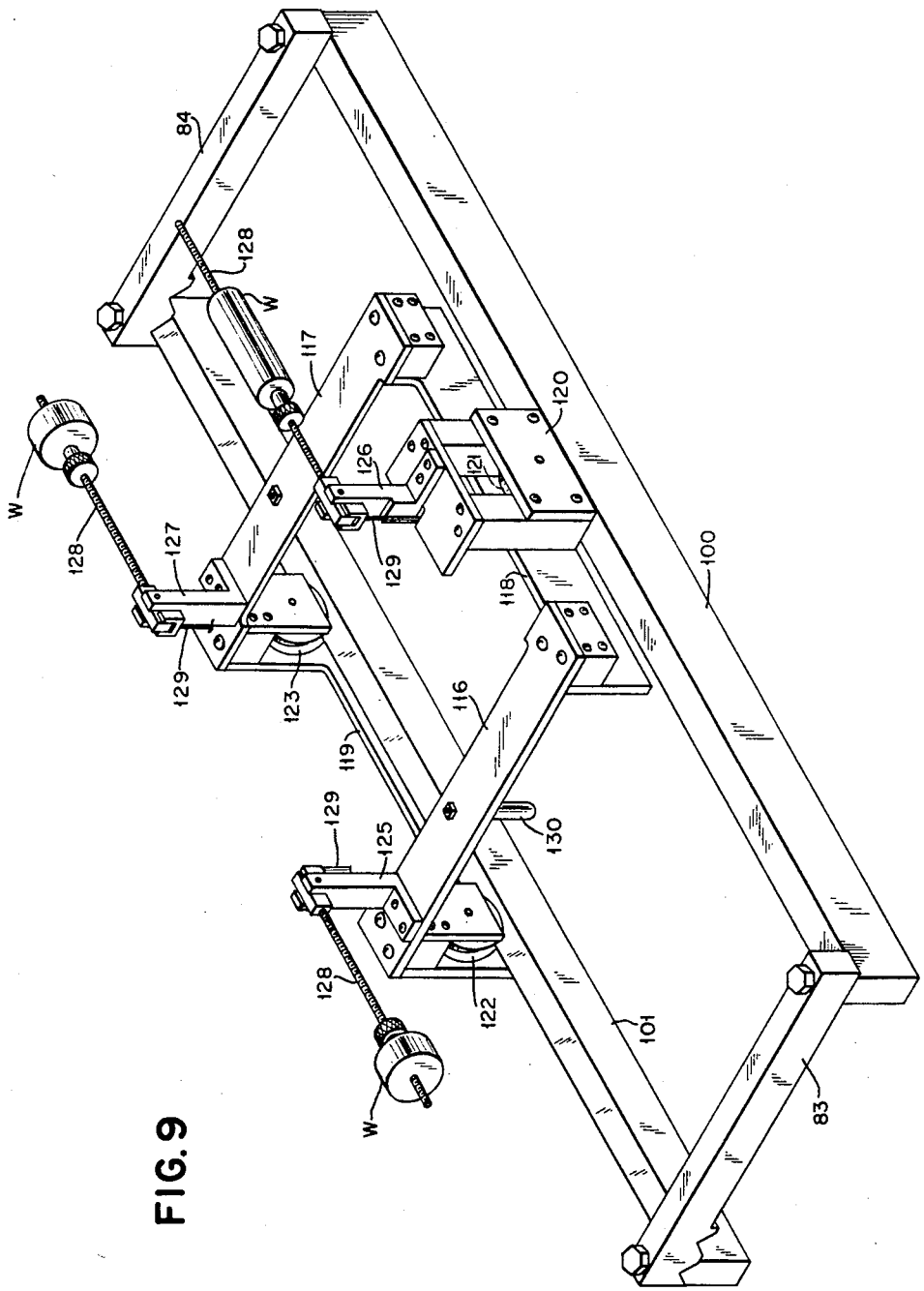
Fig. 9 is a perspective of the extra carriage which is provided with three counter weights and assembled over the horizontal carriage with the scanning devices so that the last mentioned carriage is partly supported and lifted by the counter weights to relieve pressure from the main lead screw.

The front carriage for holding the optical scanning parts is composed of two parts. The inner section as shown in Fig. 8 contains most of the working parts while the other outer carriage, which is shown in Fig. 9, is provided merely to hold counterbalancing weights for lifting the inner carriage and taking some of the weight off the lead screw 33 and transferring it to the widely spread rails 100, 101 upon which the counterbalancing carriage is supported. Turning back to Fig. 4, it is seen in the sectional view that the primary carriage 35 includes not only the base plates 102 and 107 but also a front horizontal bar 108 upon which is supported a slanted inner base plate 109 comprising part of a box for shielding all the working parts of the optical scanner. In Figs. 6–8 inclusive, there is shown in greater detail the construction and arrangement of the parts of the optical scanner box and the control instrumentalities contained therein. Described generally, Fig. 6, the box is formed with a rear wall 111 and a cover section 112 upon which is mounted a reflecting indicator and shield 113. Fastened to the rear wall is the objective lens holder 114 centralized with respect to the axis of the light ray directed from the arc light through the condenser lens on the other carriage. The light passing through the objective lens also passes through a number of optical controls before impinging upon the photoelectric tube PH mounted at the opposite end of the carriage and at the front side of the carriage. Projected forwardly above the photocell and extending down with reflectors for sighting the star image is a microscopic viewing scope 115 which is provided for visual inspection. Before going further into the details of the optical scanning devices on the primary carriage it is believed well to consider at this point how the carriage is supported and guided by the cooperating counterbalancing carriage frame shown in Fig. 9.

The counterbalancing carriage of Fig. 9 is seen to be composed of a pair of longitudinal strips 116 and 117 attached to a pair of crossbars 118 and 119 which together form a square open frame. Attached to the front of this frame is a U-shaped bearing block 120 for carrying one of three rollers, the other two being the rollers 122 and 123 formed with a V-shaped notched periphery and riding on the rail 101. Extending upwardly from the frame are three brackets 125, 126 and 127, each of which has a pivoting arrangement on the top for carrying a long thin screw 128 threaded to carry a movable weight W which may be adjusted outwardly to compensate for the weight of the inner primary carriage. Connections are made to the inner carriage from the counterweights by means of wires 129; three of which are drawn taut from an upper point on the inner sides of all three counterbalancing screws and attached at the bottom to the front 108 (Fig. 4) and the sides of the inner primary carriage.

Extending downwardly from the side bars of the counterbalancing carriage are a pair of elongated studs 130 between which the primary carriage moves and in moving imparts movement to the secondary carriage so that it is carried along to perform the counterbalancing function in all the horizontal positions of the primary carriage.

Turning now to Fig. 6, a more detailed account may be given of all the optical instrumentalities encountered by the light ray and star image projected from the photographic plate and through the objective lens 114 from right to left as viewed in the figure.

After the light ray and star image pass through the objective lens 114, the first element encountered is the beam splitter 132 which reflects the image upward through a concave lens 133 and through an adjustable marked glass 134 which are mounted within a hood 113. One vertical 135 and two horizontal lines 136, Fig. 6a, are marked on glass 134. The inside of the hood appears as shown in Fig. 6a where the image when initially projected is off-center as at 137, and is caused to be shifted over to 138, i.e., between the two horizontal lines and over against the vertical line 135 by manipulation of the keyboard and which has connections to shift the plate P vertically and also operate the lead screws to shift the optical means horizontally. A restricted aperture bracket 139 serves to limit the passing light and also support the frame for the beam splitter 132.

The image displacement glass 141 is pivotally mounted at 142 and swung to minutely adjusted angles to vary the angle of refraction vertically and thus shift the scanned image to the center of the scanned area. Glass 141 is adjusted during the scanning operation in lieu of shifting the whole plate holder vertically. The position 138 (Fig. 6a) of the image is so close to the centered position that the slight changes in vertical positioning effected by the change in the angle of glass 141 are enough to make the image appear centralized and allow the precise horizontal measurements to be effected without shifting the bulky plate frame minute distances.

For the purpose of adjusting glass 141 there is fastened to the frame 143 an arcuate extension 144, over which two wires 145 and 146 are drawn to rock it in opposite directions. These wires are drawn around related pulleys 147 and 148 pivoted in a frame 149 held inside the left side of the box 112. Outside the box, Figs. 7 and 8, the wires are seen to join and be wrapped around and driven by the spindle 151 of a drag governor shaft 152 carrying a gear 153. In mesh with gear 153 is a gear 154 on the shaft of a small motor ID which is mounted under a plate 155 secured to the box 112. Shaft 152 projects downward into the drag element 156 of the displacement motor drive. In Fig. 8 it is seen that a bearing block 157 is provided with a pair of adjustment screws 158 for setting the pivot end of rod 142.

During the scanning operation, the circuit connection which ordinarily goes to the vertical drive motor VD, Fig. 20b, is switched to the image displacement motor ID to get a fine degree of vertical control by refraction of the star image.

Figure 11:
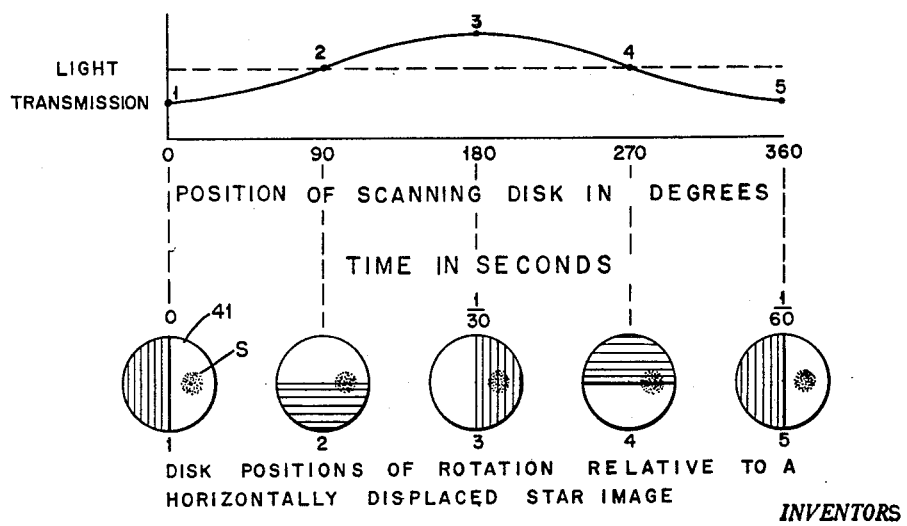
Fig. 11 is a diagrammatic view showing the relationship between the hemispheric scanning opening, the star image position relative thereto and the corresponding generator A.C. sine wave current generated photoelectrically.

After the image passes through the beam splitter and image displacement devices, Fig. 6, it next passes through another aperture bracket 159 and over through an optical scanning mechanism involving devices for rotating the semicircular opening 41 in the path of the image. Before pointing out the mechanical details of the construction for scanning or light chopping in connection with the star image, it is believed well to refer to the diagrammatic showing (Fig. 11) wherein several positions of the semicircular opening 41 are shown in various relationships with respect to the dark spots representing the star image. The purpose of these positional views in Fig. 11 is to show how the light is varied before striking the photocell to generate a sine wave current for an A.C. electrical output, the amplitude and phase of which is varied according to the off-center position of the star image. As shown in the first positional view at the left, the star images are wholly within the hemispheric light opening 41 and therefore projected above this view it is shown that the amount of light transmission at that particular point is at the minimum level. This light projected against the photocell is detected and amplified to provide a variable current strong enough to operate part of the induction winding of the drive control motors for exercising control over the vertical and horizontal movements which serve to shift the plate and carriage relatively to bring the image to a centralized position in the scanner. The second positional view of the scanning opening shows that the image has only a partial obscuring effect and therefore a greater amount of light passes through and the control current is increased. The third positional viewing shows the opening in a position wherein the image has no effect and therefore the light is at its maximum level and the peak of A.C. current wave is reached at this point. The fourth and fifth positions show steps of decay in light output due to partial and full obscurity exercised by the star image.

From the foregoing it is apparent that from the position of the star image off-center within the scanning range there is generated an A.C. current with peculiar shifts of amplitude and phase derived from the particular momentary position of the star image. When this particular form of A.C. output is coupled to a variable form of motorized position control, then between the two there is sought an image position wherein the output of the scanner is a steady current without periodic variations. In order to achieve such a stable light output, the star image must be brought to a centralized position with respect to the scanning disk so that as the disk revolves the light is projected through as an annular semicircular shape which does not vary in any of the radial positions. In other words, when the center of the star image is at the center of the axis of rotation of the light opening, then the current generated by the scanning light is a steady invariable electrical output. When the image is off-center either horizontally or vertically, it generates the kind of alternating current necessary to drive the carriage shifting motor and the image displacement device so that the star image is centralized with respect to the optical system. Of course, as this centralizing action takes place in a horizontal direction, the lead screws are being adjusted and thereby put in a position to give a very accurate reading of the final positioning. However, before going into the process by which the accurate reading of the horizontal screw may be taken, it is believed best to return to Fig. 6 and an explanation of the mechanism for rotating the semicircular scanning disks.

Attached to the base 109 of the primary carriage there is a frame comprising an inverted U-shaped member 160, the left leg 161 of which carries the scanning drive motor VC. The right leg 162 of the frame has an opening which is threaded to receive a bearing ring 163 through which there projects a cylindrical gear bearing 164, the gear 165 of which is in mesh with an idler 166 which in turn meshes with the gear 167 on the shaft extending from the scanning motor VC. The cylindrical driven scanning element is formed with a tapered cylindrical opening and at the right end has a stepped formation within which is assembled the pair of disks 42 and 43, Fig. 6b. The top disk 43 is formed with a beveled portion 44 defining a straight sharp axial line and the lower disk 42 is formed with a conical bevel and the semicircular opening 41 referred to previously.

After the image passes through this central scanning opening, it next passes through a pair of condenser lenses 168 and 169, Fig. 6, and then through a diffusion plate 170 which serves to distribute the light uniformly before it impinges upon the light-sensitive element of the photoelectric tube PH which is attached on the left end of the carriage base.

For the operator to have an enlarged view of the scene of action at the semicircular opening 41 in disc 42 and the placement of the star image relative thereto, the scope 115 may be used. This sighting device is seen to have periscopic features in the two reflecting surfaces 172 and 173, the latter being adjustable to bring the scene of the critical scan area to the eyepiece.

At this point it is well to reiterate the various features of the optical scanning system to point out other details regarding the mode of operation. It is already noted that upon the rear carriage 34, Fig. 20b, is mounted the light source which is an Ediswan Pointolite arc lamp 36 and with it is a lens system that forms a real image of the incandescent sphere of the lamp upon the photographic plate P. Thus, a substantially uniform illumination of the plate is furnished in the immediate vicinity of the images of the star, the position of which is being measured. The light from this area is collected by the objective lens and brought to a focus to form a real image of the star magnified about twenty times on the rotating, scanning disk. In the path of the light on its way from the objective lens to the scanner, it passes through the thin film beam splitter 132 which diverts part of the light to the external viewing screen and also through the vertical image displacement glass 141.

The semicircular scanner opening assembly rotates at 3,600 r.p.m. about an axis perpendicular to the plane at the disk and passing through the center of the diametral edge of the hole 41. As the disk rotates under the magnified image of the star, the amount of light transmitted through the shutter varies periodically with the fundamental frequency of 60 c.p.s. as shown in Fig. 11. Analysis of this periodic variation of light shows that the amplitude and phase of the fundamental component are measures of the radial and angular coordinates of the center of gravity of the star image with respect to the axis of rotation and are arbitrary angular reference axis.

To obtain an electrical signal suitable for use as an error signal in a synchro following-up system, the light transmitted through the rotating scanner is picked up by the phototube. If the light were to go directly through the scanner to the phototube, the illuminated spot on the cathode of the phototube would move around as the scanner rotated, and variations in sensitivity of different areas on the cathode would give rise to a spurious signal superimposed on the desired error signal. However, with a lens and diffusion plate in front of the phototube, light is imaged from a point just ahead of the condenser lens on the diffuser and a stationary spot of light is obtained on the cathode.

The output of the phototube is passed through filtering and limiting electronic controls which deliver to the measuring unit drive motors a 60 c.p.s. electrical signal as shown in the schematic view (Fig. 20a) and the wiring diagram. For small displacements the amplitude of the signal is proportional to the radial distance in the shutter from the axis of rotation to the center of gravity of the star image. For large displacements the amplitude of the signal is constant and independent of the radial error. The phase is at all times proportional to the angular coordinate of the star image.

The error signal, after being limited, is supplied as input to each of two mixer amplifier channels that terminate in hard tube power amplifiers supplying power for the horizontal and vertical drive motors of the measuring device. The series of electronic units through which the error signal passes before effecting control of the measuring motors may be seen in the schematic showing (Fig. 20a) There they may be recited in order as they follow from the photomultiplier through a cathode follower stage, a pre-amplifying stage, a filtering stage for rejection of 300, 180 and 120 c.p.s. signals, next another amplifying stage, then a series diode limiter stage. After this last mentioned stage, the controls branch out in two similar vertical and horizontal controls, each of which includes a resistance mixer stage where the tachometer control signals bear influence and next through another filtering stage for rejection of 300 and 100 c.p.s. signals, next through another amplifying stage followed by an L-C filter stage and finally a power amplifier stage before being directed into either the horizontal or vertical drive motor.

Figure 10:
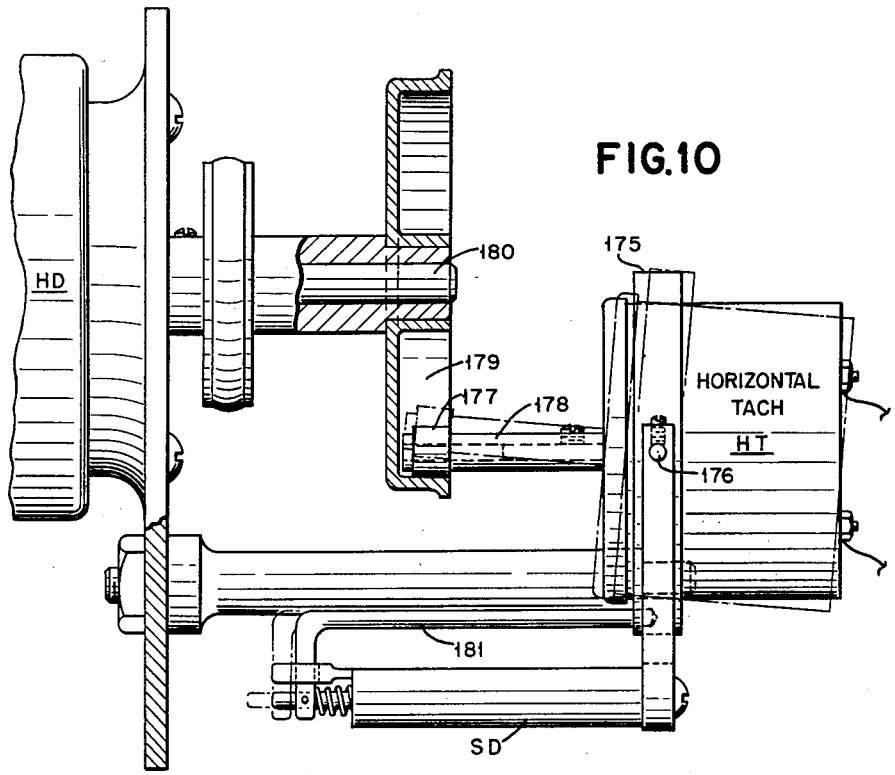
Fig. 10 is an enlarged side elevation view of the horizontal tachometer and the means for rocking and disabling the tachometer connections.

In the horizontal channel the error signal is mixed with a voltage derived from an induction tachometer HT, Fig. 10, driven by the horizontal drive motor HD. This tachometer is mounted inside a ring 175 on a pair of pivot bearings 176 in such a manner that the rubber tired friction roller 177 on its shaft 178 does not normally make contact with the driving wheel 179 on the motor shaft 180. However, by energizing the coil of an actuating solenoid SD and shifting the plunger link 181, the tachometer assembly is tilted so that the shaft 178 is driven, and thus causes the armature of the tachometer to rotate. For high speed shifting of the horizontal carriage, the system operates without the tachometer feed-back. During the final approach in positioning the star image, solenoid SD is energized and the electronic system is stabilized by the feed-back from the tachometer.

The output of each power amplifier PA (bottom of Fig. 20a) is applied to one winding of the respective drive motor. These motors VD and HD, Fig. 20b, are two-phase induction motors whose second windings are excited from independent phasable sources of 60 cycle voltage. The torque developed by such a motor is proportional to the sine of the electrical phase angle between the voltages applied to the two excited windings.

Assuming the error voltage to be resolved into two components, one in phase with the error voltage that would be produced by a purely horizontal error in image position and the second in phase with the error voltage that would be produced by a purely vertical error in image position. It is possible to phase the exciting voltages applied to the second windings of the motors so that the horizontal motor will ignore signals produced by vertical error in each position, but will develop torque tending to drive the lead screw in such a direction as to reduce the horizontal component of error of the image position. Conversely, the vertical correction motor can be made to drive in such a direction as to reduce vertical errors and ignore horizontal errors.

Figure 71:
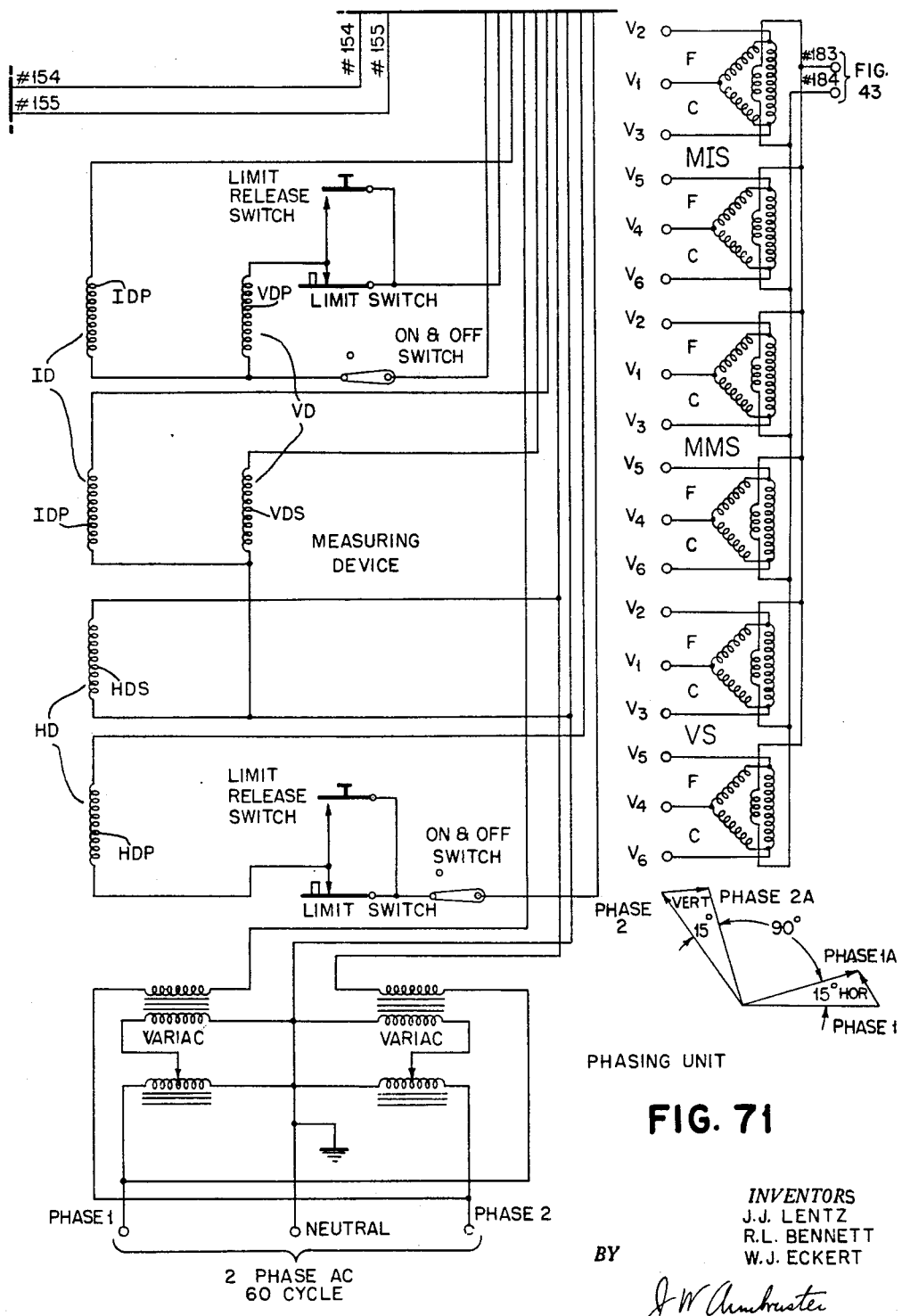

Since the vertical and horizontal components of the driving signal are 90° apart, the exciting voltages for the drive motors must be 90° apart. However, to correct for amplifier phase shifts and scanner synchronization, the exciter voltages are made adjustable in phase. The circuit for the variable phase exciter with Variac devices is shown in Fig. 71. The two legs of the three phase power lines are added to each other by means of variable inductors and 1—1 isolation transformers. From $L_1$ a portion of phase 1 is added in the isolation transformer to all of phase 2, to result in phase 2A. The same operation performed in the other half of the circuit produces phase 1A.

The image displacement device 141, Fig. 6, makes it possible to reduce the vertical error signal to zero. The piece of plan parallel glass 141, Fig. 20b, mounted to swing in the optical path is rocked about an axis parallel to the horizontal rails by the correction motor ID which is powered by the signal initially directed to the vertical drive motor VD. As this image displacement glass rocks, it causes the star images on the scanning shutter to move slightly plus or minus 40 microns in the vertical direction and causes a fine control of vertical image positioning. The device is used solely to achieve a null at the final balance point; during the initial rough positioning in response to the card, and in response to keyboard control, the regular vertical drive motor VD operates to perform initial vertical adjustment of the measuring devices.

The effect of static friction when driving the heavy plate holder under keyboard control is minimized by attaching a mechanical vibrator to the vertical carriage and causing it to buzz whenever a vertical direction button is depressed.

Figure 24:
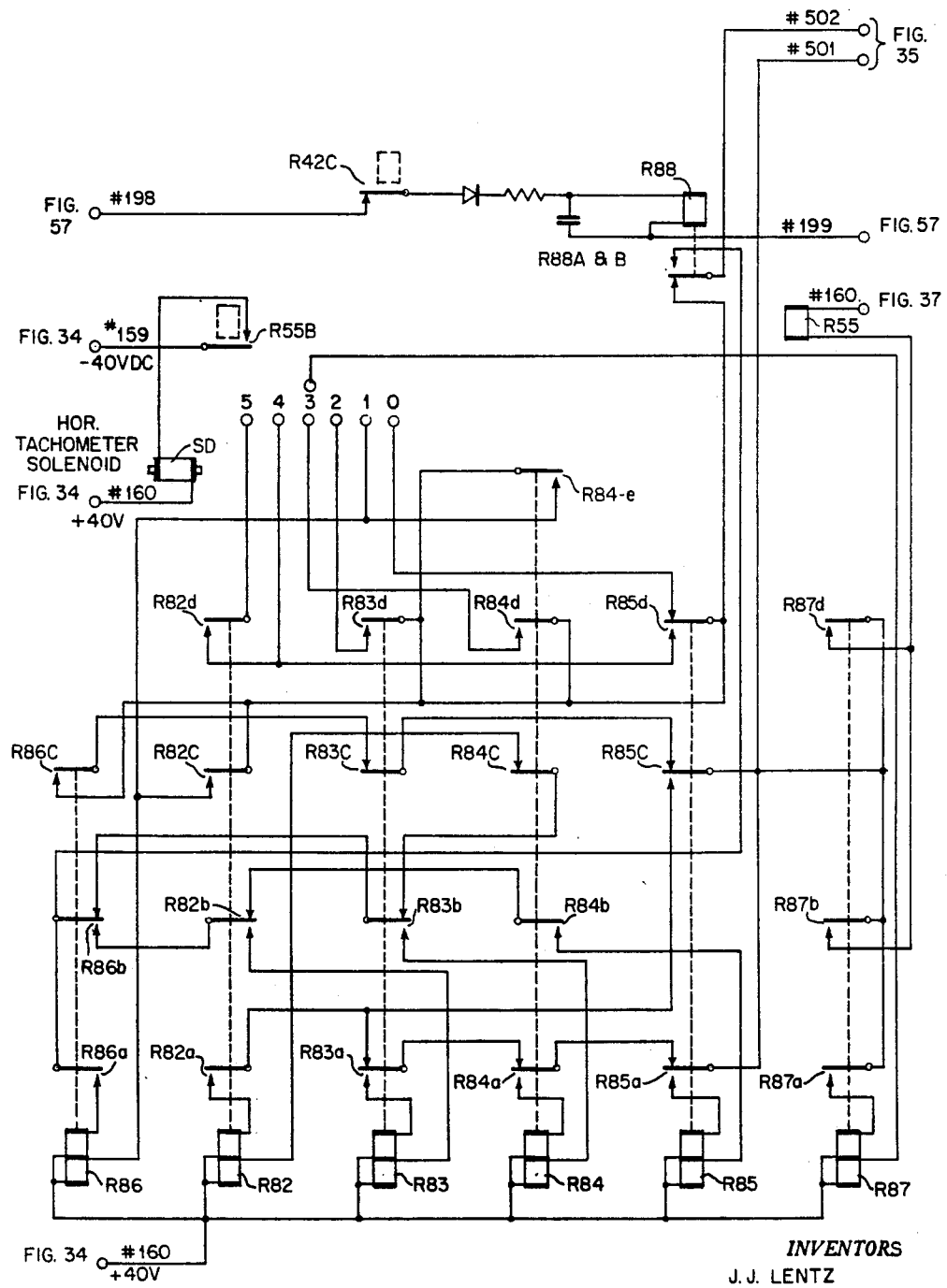
Figure 25:
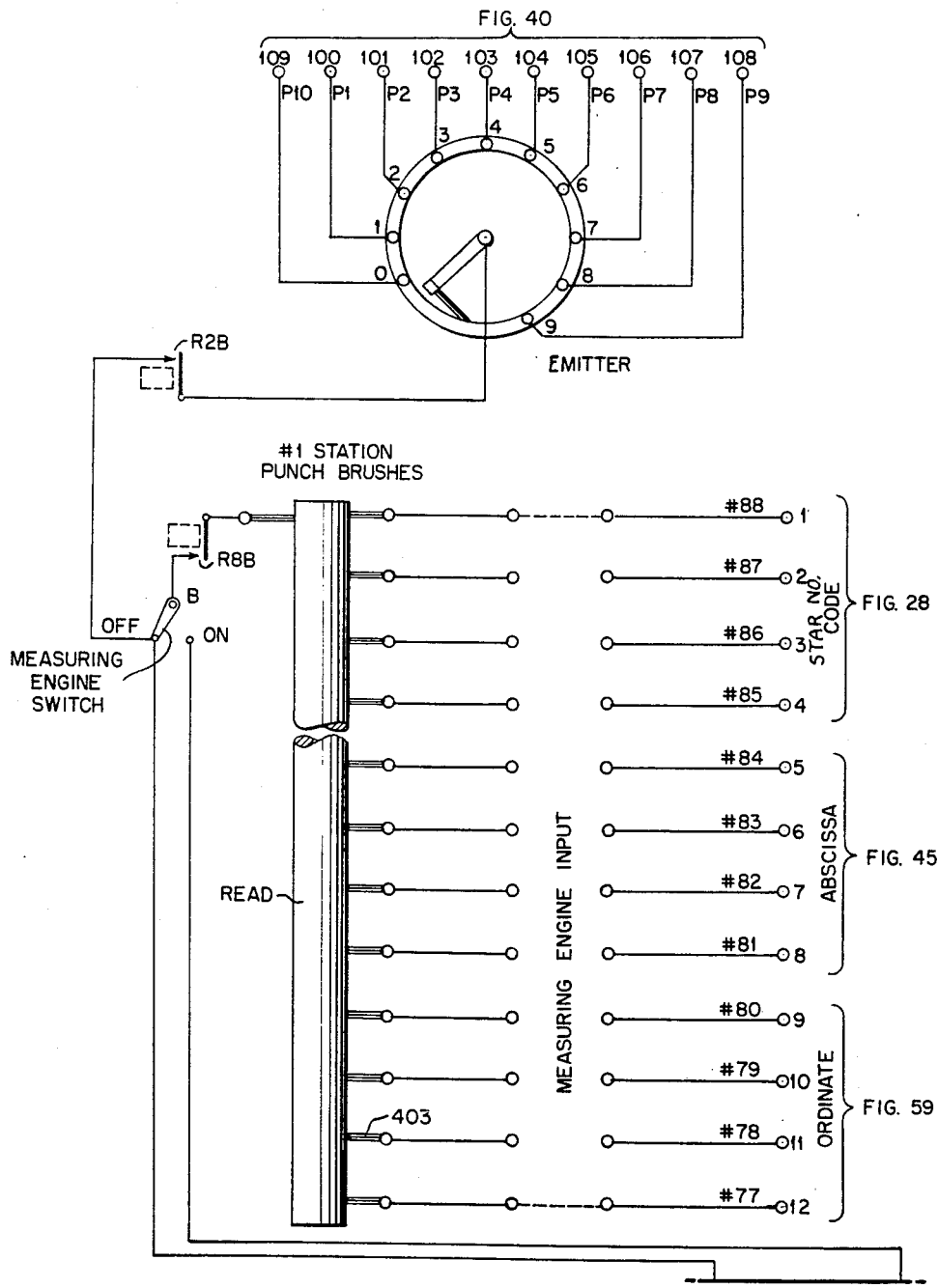

The lubricant which is on the rails and ways of the horizontal carriage tends to form a wedge under the carriage when it has been driven an appreciable distance. This wedge of oil film tends to tilt the optical system, thereby causing errors in measurement. In order to correct for this there is provided a mode of operation to distribute the oil film in the vicinity of the final settling point of the carriage. To do this the horizontal motor of the measuring device is allowed to run undamped so that it hunts back and forth plus or minus 50 microns for five oscillations. On the fifth count the tachometer HT is clutched in, signaling the final approach to the star center. Fig. 24 shows the circuit used to generate counter control impulses for regulation of the horizontal tachometer control. When signals of forward drive phase are applied to the network, No. 198—No. 199, the total voltage across the terminals will be 230 volts, which provides sufficient current to pick up the impulsing relay. A reverse drive signal presents an in-phase input to the circuit, and then no voltage appears across the terminals and the relay drops. Forward and reverse signals continue until enough impulses are delivered to the counter for it to cause the operation of the tachometer tilting means.

When the star image is truly centralized it is a sign that the devices are ready for the accurate measurement to be read out and used to control perforation of the card. In order to do this the sequencing controls should be stepped along to go beyond the stage wherein photoelectric scanning is performed. In order to initiate this change in program for this sequence step there is provided the null detector which comes into operation when the scanning output voltage maintains a stable condition. The output from a 60-cycle pass filter is rectified and used to bias a thyratron TH9, Fig 65. When a null is reached, no bias is obtained and the thyratron picks up its plate relay. The R-C network of the 2D21 plate supply prevents firing of the tube before bias is developed.

As the horizontal carriage is positioned to the accurate point by the scanning mechanism for giving the exact horizontal position of the star image on the plate, the main lead screw has connections for driving the two synchros which are used for coarse and fine measurements. As noted in Fig. 20b the coarse synchro is connected directly to the lead screw and thus for each revolution of the screw there is actuation corresponding to one millimeter of horizontal measurement. The other synchro is provided with a pinion in mesh with the large gear on the main lead screw and is geared to respond to movements extending to tenths of microns of horizontal movement of the carriage. In other words, there is a 1000 to 1 ratio of operation between the two horizontal synchros. In the diagrammatic showing (Figs. 20a and 20b) it is seen that the control from the horizontal synchros goes back to the two converters: one for millimeter measurements and the other for micron measurements to control the digital settings of the converters which may then be read out to control card punching in tenths of microns.

The three converters shown in Fig. 20a are illustrated in greater detail in Figs. 12–15 and in the Patent 2,506,470, issued May 2, 1950, to R. I. Roth et al.; and Patent 2,690,549, issued Sept. 28, 1954, to R. I. Roth. The part of the converter to be conisdered first is that of Figs. 12 and 13 which show the setting devices for the four commutator devices set digitally to represent a four ordered number. In the sectional view, Fig. 12, reveals the gearing with 10–1 ratios between orders.

Secured to the bottom of the base plate 210 is a block 213 to which are bolted brackets for mounting the drive motor M, Fig. 20a. The shaft of motor M is connected by a coupling to a shaft 217 (Fig. 12) on which is a worm 218 for driving a worm wheel 219 on a sleeve shaft 220. Shaft 217 is mounted in the same manner and functions in the same way as shaft 17 shown in the Roth patents just mentioned.

Fixed to the upper end of sleeve shaft 220 is a grooved wheel 222 to the top of which is fixed a notched wheel 230 and a pinion 223. Pinion 223 meshes with a gear 224 to which is attached a long pinion 225.

Figure 12:
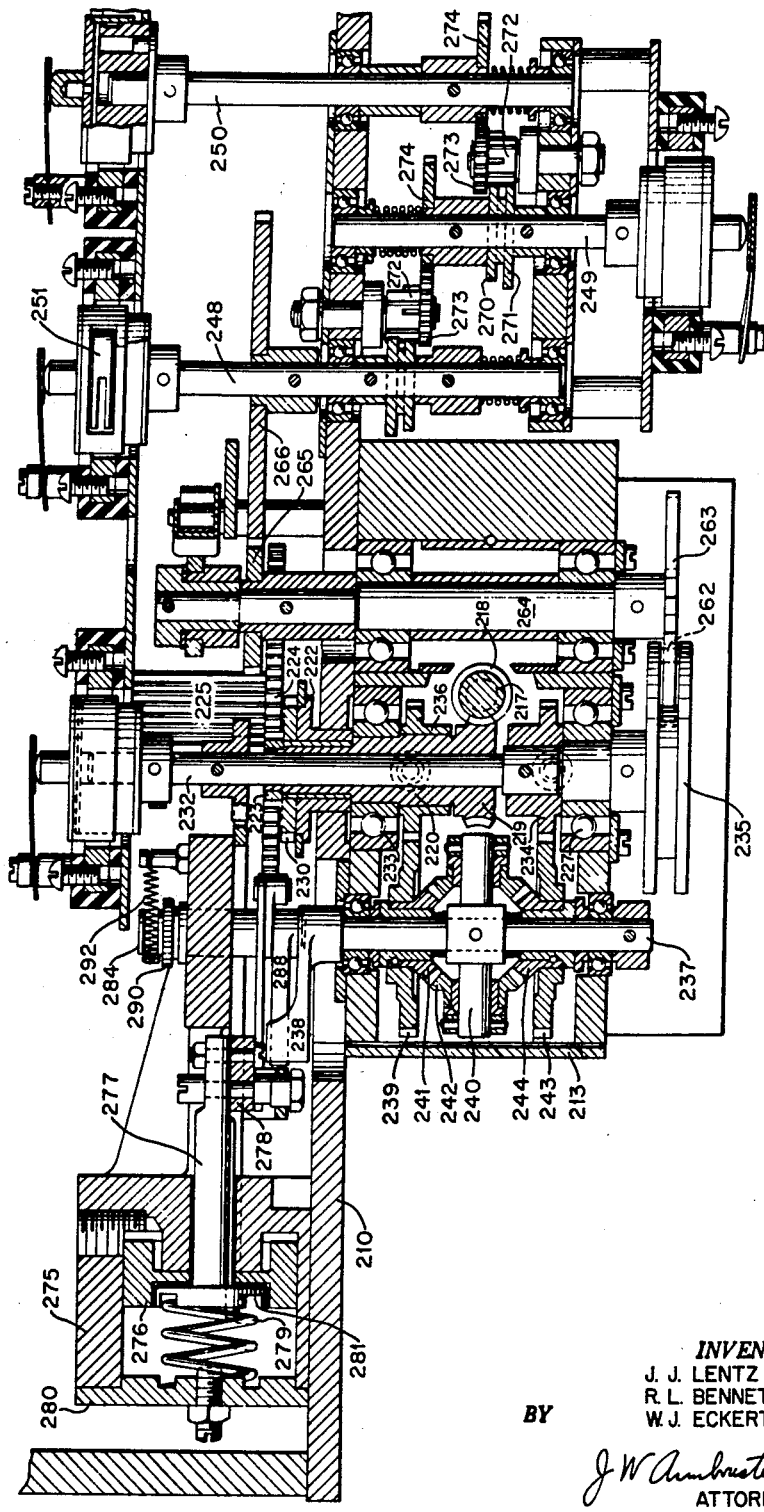
Fig. 12 is a sectional elevation view taken through the converter and showing the four commutators for digital representations of a position.
Figure 13:
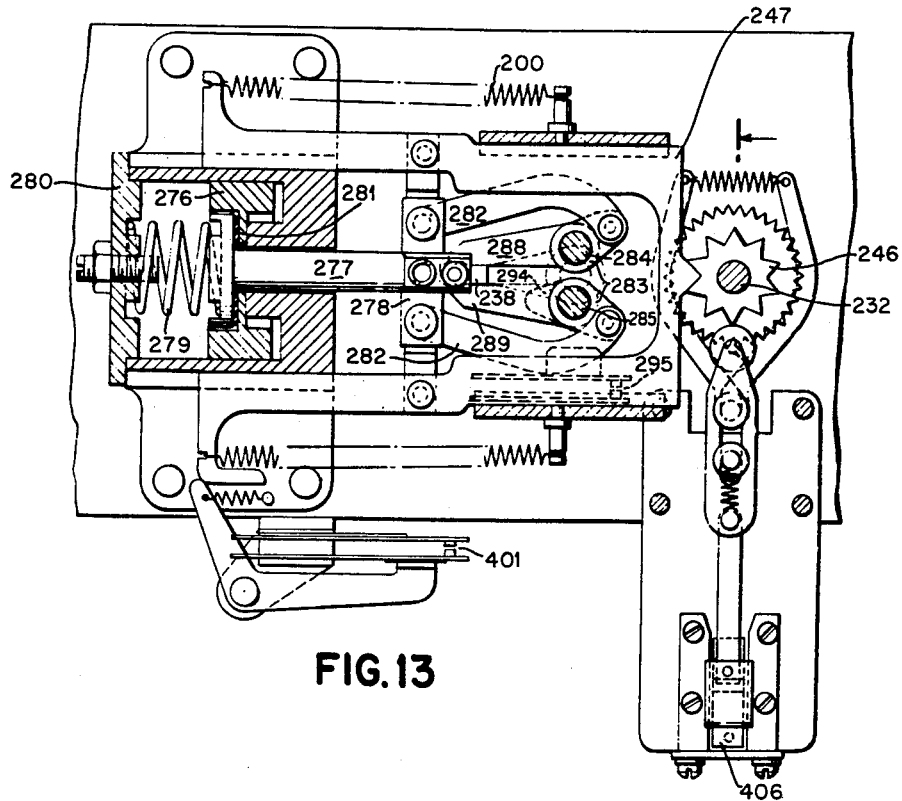
Fig. 13 is a sectional plan view of a pneumatically controlled detent device cooperating with the positioning means of the converter shown in Fig. 12.
Figure 14:
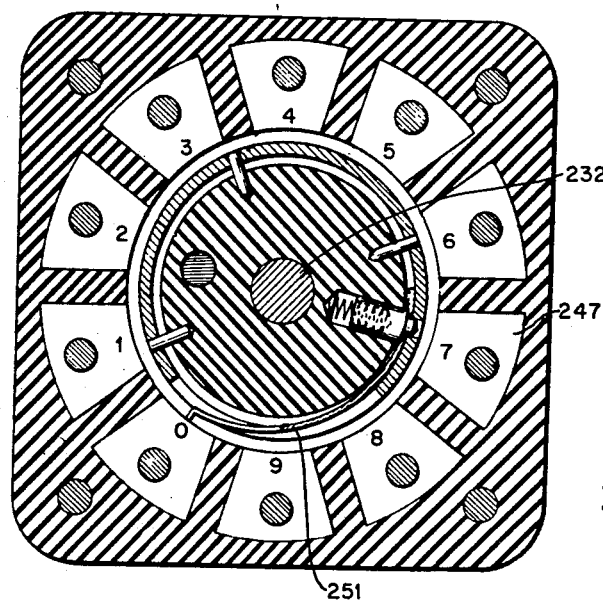
Fig. 14 is a detailed sectional view taken through one of the commutators of the converter and showing the digit representing segments.

Referring to Figs. 12, 13 and 14, a shaft 232 passes through the motor-driven sleeve shaft 220. The sleeve shaft 220 is mounted in a bearing 233 and moves freely about shaft 232 which is the units order shaft. Shaft 232 is journaled near its lower end in a bearing 227, the outer edge of which is held by a plate fastened to the bottom of block 213. Pinned to shaft 232 above bearing 227 is a gear 234 and also pinned to shaft 232 below bearing 227 is a member 235 which is the driving member of a Geneva gearing arrangement. Rigidly fastened to the sleeve shaft 220 below bearing 233 is a gear 236 which has the same number of teeth as gear 234.

In Fig. 12, it is seen that a shaft 237 is mounted for rotation in block 213. The upper end of shaft 237 extends through base plate 210 and carries an arm 238 fastened thereto. Gear 236 meshes with a gear 239 rotatably mounted on shaft 237. A cross shaft 240 is fixed to shaft 237 and carries loosely mounted thereon a bevel gear 242. Secured to gear 239 is a bevel gear 241 which engages bevel gear 242. A gear 243 is freely mounted on the lower portion of shaft 237. Fastened to gear 243 is a bevel gear 244 which also meshes with bevel gear 242. Gear 243 in turn engages gear 234 which is pinned to units shaft 232.

When arm 238 is rigidly held in the position shown in Fig. 13, as described hereinafter, the drive from motor M to units shaft 232 is traced in Fig. 12 as follows: shaft 217, work 218, worm wheel 219, gear 236, gear 239, bevel gears 241, 242 and 244 and gear 243, the latter gear meshing with gear 234 which is pinned to the units shaft 232. Rotation of units shaft 232 causes the Geneva gearing arrangement 235, 263 to effect rotation of an intermediate shaft 264 as explained hereinafter.

Fastened to units shaft 232 is a star wheel 246 (Fig. 13) which can be engaged by a detent plate 247. When detent plate 247 engages star wheel 246, arm 238 is free to move within limits in a horizontal plane as explained later in this description.

The detenting of wheel 246 locks shaft 232 against rotation and the drive from motor M is traced in Fig. 12 as follows: shaft 217, worm 218, worm wheel 219, gear 236, gear 239, bevel gear 241 and bevel gear 242 which rotates and causes movement of cross shaft 240. Since cross shaft 240 is fixed to shaft 237, shaft 237 is also rotated. It should be noted that since shaft 232 is locked against rotation, gear 234 which is pinned to shaft 232, causes gears 243 and 244 to be locked against rotation and the motion transmitted to gear 242 through gear 241 causes gear 242 to ride over the surface of locked gear 244.

The register has four orders, the units, tens, hundreds and thousands orders. The units order shaft 232 is driven through the differential gearing mechanism described hereinbefore. When the capacity of the units order is exceeded, the shaft 232, by means of the Geneva gearing arrangement, effects a step of movement of a tens order shaft 248. Similarly, the tens order shaft 248, steps along a hundreds order shaft 249, and the hundreds order shaft, through a similar transfer, through an intermittent gearing transfer, steps along a thousands order shaft 250. It is seen then that the register functions as a counter. The value positions of the orders are electrically registered by readout commutators, each being of the type disclosed in Patent No. 2,447,819 issued August 24, 1948, to Robert I. Roth.

Each readout commutator (Fig. 14) includes a carrier for a brush 251 which is adapted to wipe the segments 247, 0 to 9. The carrier in turn is mounted on a denominational order shaft such as 232. It will be seen that each of the denominational order shafts 232, 248, 249 and 250 of the register structure has ten rotative positions in which the connected brush 251 engages the contact segments 0 to 9. One step of value movement of the denominational order shaft is the movement required to move the brush from one contact segment 247 to an adjacent segment 247.

When the units order exceeds its capacity, it transfers one to the tens order. For this purpose, the units order shaft 232 carries the Geneva driver 235 (Figs. 3 and 6) comprising a pair of plates between which is sandwiched a locking plate, all three plates being rigidly secured to each other to form a rigid assembly which is fastened to the lower end of the shaft 232. The plates are bridged by a driving pin 262 which is centrally located with respect to a recess in the central locking plate. The Geneva driver coacts with a Maltese cross-shaped wheel 263 fixed to the intermediate shaft 264. Wheel 263 has four radial slots and concave arcuate peripheral portions between the slots to accommodate the circular portion of the locking plate. As long as the circular portion of driver 235 rides in a concave peripheral portion of wheel 263, the wheel is locked against rotation. When the recess begins to pass the wheel 263, the wheel is free to be moved and the pin 262 enters a slot in the wheel. The pin 262 cams against a wall of the slot to move the wheel slowly at the start, then more rapidly, and then again slowly as the pin leaves the slot. The net effect is that when the shaft 232 moves from the 9 to 0 value position in the positive direction or from the 0 to 9 value position in the negative direction, the wheel 263 and its shaft 264 are rotated through a quarter of a revolution.

Shaft 264 carries a gear 265 meshed with a gear 266 on the tens order shaft 248. The gear ratio is such that when shaft 264 makes one quarter of a revolution, the shaft 248 makes one tenth of a revolution. Thus, each time the units order shaft 232 passes through its carry position, it acts through the described gearing, to effect a carry step of the tens order shaft 248.

It will be noted that the carry means just described provides for a smooth gradual carry, which is especially desirable because the units order shaft 232 is rotated at high speed.

A known intermittent gearing transfer is provided between the tens and hundreds orders and between the hundreds and thousands orders. Referring to Fig. 12, the transfer device between the tens order and hundreds order includes a driver disk 270 and locking plate 271 fixed to tens order shaft 248. The disk 270 has two driving teeth, and the locking plate 271 has a notch aligned with the space between the two teeth on disk 270. The driven element of the transfer includes an eight-toothed pinion 272 for coacting with the teeth of disk 270. Alternate teeth are cut short, leaving four widely spaced teeth opposite the locking plate 271. When the tens order shaft 248 is in positions 0 to 9, the circular periphery of the locking plate 271 is in the space between two of the long teeth of pinion 272, locking the pinion against rotation. When the tens order shaft moves in the positive direction, from 9 to 0 value position or when the shaft moves in the negative direction, from 0 to 9 value position, then the notch in the locking plate 271 meshes with a tooth of pinion 272 while the teeth of driver disk 270 coact with the teeth of pinion 272 to effect a quarter of a revolution of the pinion. Rigid with the pinion 272 is a pinion 273 meshing with a gear 274 on the hundreds order shaft 249. The ratio of pinion 273 to gear 274 is such that in one quarter of a revolution of the pinion 273, it drives the gear 274 and the hundreds order shaft 249 through one-tenth of a revolution. In this way, a carry is effected to the hundreds order upon the tens order going from 9 to 0 in the positive direction or from 0 to 9 in the negative direction. It is evident that the higher of two orders in receiving a carry from the lower one of the orders will move in the same direction as the lower order.

A similar transfer is provided between the hundreds order shaft 249 and the thousands order shaft 250.

An air piston and detent mechanism is used to hold arm 238 in the position shown in Fig. 13 and also lock the shaft 232 against rotation to allow arm 238 to oscillate during the hunting operation as explained hereinafter. Referring to Figs. 12 and 13, it is seen that this mechanism is mounted on a casting 275 which is fastened to the top of the counter plate 210. Casting 275 is bored out at the left end, as viewed in Fig. 13, to receive a piston 276 which is free to slide within the bore of said casting. Piston 276 is free to move on a piston rod 277 which has an integral head portion and extends through an opening provided in casting 275 at its right end. Piston rod 277 carries a cross bar 278 on the end protruding from casting 275.

Piston 276 is formed to the right as viewed in Fig. 12 by a coil spring 279 which bears against a removable plate 280 fastened to the left end of casting 275. A gasket 281 is positioned between the head portion of piston rod 277 and piston 276 to prevent loss of air at this point. If air is admitted to the bore of the casting 275 from the right, piston 276 is forced to the left as viewed in Fig. 13, against the action of spring 279, thereby moving cross bar 278 also to the left. Two link arms 282 are pivotally mounted at their left ends to cross bar 278 and at their right ends to a pair of levers 283. Levers 283 are loosely mounted on shafts 284 and 285 which are journaled in sleeves pressed into casting 275. Pinned to shaft 284 is an arm 288 and pinned to shaft 285 is an arm 289. Lug portions on levers 283 engage arms 288 and 289 so that when piston 276 moves to the left, arm 288 is rotated in a counterclockwise direction and arm 289 is rotated clockwise. It is seen in Figs. 12 and 13 that arm 238 extends up between arms 288 and 289 and is engaged by them and positioned in the position shown in Fig. 13 when piston 276 moves to the left. Also secured to cross bar 278 is the detent plate 247 which is mounted for reciprocation in casting 275. Springs 200 and 201 are fastened at the left end of detent plate 247 to continually urge the plate into engagement with star wheel 246. Thus, when air is admitted to the bore of casting 275, piston 276 causes movement of linkage 278, 282, 283, 288 and 289 in order to lock arm 238, thereby locking shaft 237 against rotation. At the same time, detent plate 247 is retracted from star wheel 246 to allow rotation of the unit shaft 232. When air is extracted from the bore of casting 275, piston 276 moves to the right, thereby unlocking arm 238 and shaft 237. At the same time, detent plate 247 is moved into engagement with star wheel 246. Units shaft 232 will then be locked against rotation and shaft 237 will be free to oscillate.

Referring again to Fig. 12, it is seen that shafts 284 and 285 are geared together at their upper ends by means of gears 290 which are fixed to said shafts. A spring 292 is secured to casting 275 and stretched around a grooved pulley where it is anchored to a pin extending from the grooved surface. The pulley is rigidly fastened to the top of shaft 284. Spring 292 thus urges shaft 284 in a counterclockwise direction, Fig. 13, and shaft 285 in a clockwise direction through intermeshing gears 290. The movement of shafts 284 and 285 is limited by the position of arm 238. When arm 238 oscillates, it will move either arm 288 or arm 289 since these arms are urged toward arm 238 by spring 292.

Fastened to the top of shaft 285 above gear 291 is a cam 294, Fig. 13. A switch 295 is mounted on an insulating block secured to casting 275 through a supporting block. Switch 295 comprises two spring blades, each of which carries a contact. One spring blade has fixed thereto an insulated block which is adapted to be engaged by cam 294. If cam 294 is rotated sufficiently in a counterclockwise direction, as viewed in Fig. 13, a rise on cam 294 engages the blade block causing the spring blade to be moved sufficiently to close switch 295. The closure of switch 295 energizes a solenoid on a solenoid air valve, as will be explained hereinafter in connection with the description of the operating circuits, to admit air to the bore of casting 275 and force piston 276 to the left as viewed in Fig. 13. This action, which was previously explained, causes arm 238 to be returned to the position shown and the units shaft 232 to be released for rotation. Whenever arm 238 oscillates far enough clockwise or counterclockwise to effect a closure of switch 295, it will be immediately returned to the position of Fig. 13 by means of compressed air acting on piston 276. Switch 295 thus limits the oscillation of arm 238.

It is well known that when the field windings of a synchro-generator and a synchro-motor are connected together and their rotor windings energized by a source of alternating current that the synchro-generator converts the angular position of its shaft into a set of electrical voltages which when applied to the field windings of the synchro-motor cause the rotor of the latter device to assume a similar angular position, and that any variation of the generator shaft will then be reproduced by the shaft of the synchro-motor. Such devices are commonly used to reproduce angular movement at a distance, the drive shaft of the synchro-motor being connected directly or indirectly to a load device which may be an indicator dial, or any other device whose angular position is to be controlled from a distance.

It is also well known that a small deviation of the control shaft of the synchro-generator produces only a small torque in the synchro-motor. In order to increase the sensitivity of the system it has heretofore been proposed to employ two synchro-generators and two synchromotors, one pair for "coarse" adjustment operating in a 1:1 gearing ratio with respect to the controlling or input shaft and the controlled or output shaft respectively, the other pair for "fine" adjustment being geared to the input and output shafts so that for a small angular displacement of the input shaft a relatively large displacement of one of the synchro-generators is produced. This in turn produces a relatively large torque in the connected synchromotor, the resulting movement being transmitted to the load device through the gear mechanism. A device of this type is described in U.S. Patent No. 2,407,876, issued September 17, 1946.

The reason that two pairs of synchro devices are required is that there are a number of positions of ambiguity in synchro devices which are connected to the input or output shafts by coupling gears. That is, assuming a gear ratio of 10:1, rotating the input shaft through an angular rotation of 36° will cause the synchro-generator to rotate 360°. The synchro-motor will normally follow the generator through the same angular rotation, but it will be noted that the system would also be balanced, that is, the rotors of the synchro-generator and synchro-motor would again be in the same relative positions, if the synchro-motor did not rotate at all or if it were caused to rotate two or more full revolutions instead of one. While the output of the system would follow the input correctly if the input shaft were moved sufficiently slowly to allow the output shaft to maintain its relative position, power interruptions or excessive drag by the load might cause the output device to assume one of the displaced positions of ambiguity corresponding to a synchro-motor rotation of one or more full turns. In accordance with the present showing also, this ambiguity has been overcome by a second or direct-coupled pair of synchro devices, these serving to maintain the relative angular deviation of the input and output shafts within the approximate range necessary to insure that the synchro-motor is within 360° of the correct angular position. The fine or exact control is then effected by the first pair of synchro devices.

Figure 15:
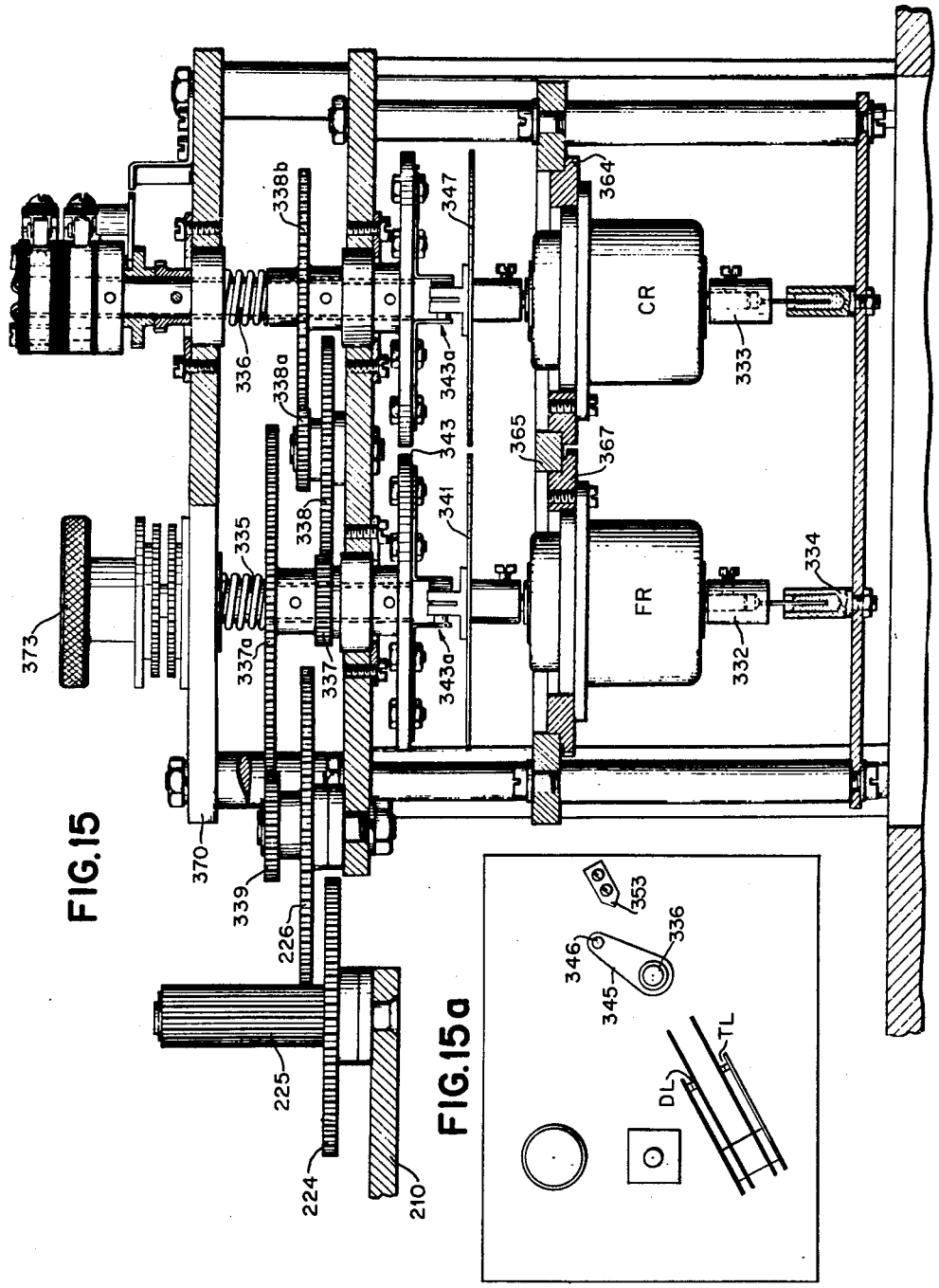
Fig. 15 is a side elevation view taken through the portion of the converter containing the two synchros for coarse and fine adjustment of the converter.

Referring to Fig. 15, the fine and coarse receiving motors of the self-synchronous motor systems are designated FR and CR respectively. Their shafts 332 and 333 are electrically grounded by mercury contact means 334. Coaxial with and above the shafts 332 and 333, respectively, are the fine and coarse follow-up shafts 335 and 336, each of which is a hollow shaft. Shaft 335 carries a pair of gears 337 and 337a of which gear 337 meshes with a gear 338. A gear 338a is rigid with gear 338 and is meshed with a gear 338b fixed to shaft 336. The gear ratio is such that shaft 335 will move ten degrees for one degree of motion of shaft 336.

Gear 337a, on shaft 335, meshes with a gear 339 integral with gear 226 which is driven by the pinion 225 of the register attachment described with reference to Fig. 12. The register attachment has the gear 224 integral with pinion 225 and driven by gear 223 which is rigidly connected with the tubing shaft 220 by means of which the units order shaft 232 of the register is driven. The ratio of the gearing between the units order drive shaft 220 and the shaft 335, Fig. 15, of the fine follow-up means is 100 to 1. That is, the units order shaft 232 will move in 100 to 1 ratio to the shaft 335. The shaft 335 will move 36 degrees for each degree of displacement. Each step of value advance of the units order is its movement through 36 degrees. Since the units order is in 100 to 1 ratio to shaft 335, each step of the units order counts a degree of displacement. Since the coarse follow-up shaft 336 is geared 1 to 10 to fine follow-up shaft 335, it will move 3.6 degrees for each unit degree of displacement. It should be noted that the positive and negative directions of both follower shafts are their counterclockwise and clockwise directions, respectively.

The shaft 332 of the fine receiver FR carries at the upper end a thin disk 341 to the bottom of which is fastened an inertia ring.

The shaft 335 of the fine follow-up means FR is coaxial with and above shaft 332 (Fig. 15). At its lower end, shaft 335 carries a coupling 343 which ties it to the upper end of the shaft of the unit FR. The coupling 343 is a curved leaf spring which is fastened to the lower plate 341 and pressed between the depending lugs 343a of the upper plate 343. Thus, a flexible form of drive is provided to the two synchro units.

The shaft 333 of the coarse synchro receiver CR carries at the upper end a thin disk 347 on which is fixed a bracket and anchored to the bracket is a coupling 343 similar to the one already mentioned.

The shaft 336 (Fig. 15a) has secured to its upper end an index member 345 which carries an insulation stud 346. When the stud 346 is directly opposite the point of a fixed member 353, both follow-up means are in zero position. The stud 346 upon clockwise movement of the index member 345 will strike a contact blade to open the limit switch contacts TL. Upon reverse movement of the index member, the stud 346 will strike another contact blade to open the opposite limit switch contacts DL. The drive ratio between the gearing is such that upon movement equal to four orders of counter millimeter measurements in either direction, the stud 346 will move far enough to open either switch contacts TL or DL depending on the direction of the displacement. Operation of the follow-up means by the converter motor M will thereupon be interrupted since it is not intended to indicate or follow measurements exceeding four decimal places in either direction from a zero position.

The receiver synchro CR is secured to a ring 364 which is clamped to the frame plate 365 by means of a pair of clamp brackets. The receiver FR is secured to a toothed ring 367 which is also clamped to the frame plate 365 by a pair of clamp brackets. Means are provided to loosen and turn ring 367, and the fine receiver FR carried thereby, in order to effect a zero adjustment of the fine receiver. The ring 367 is meshed with gearing which leads to a shaft on which is secured to hand knob 373 which moves ring 367 slightly for a relatively large degree of movement of the knob. In Fig. 15 it appears that knob 373 is on shaft 335, but this is not so as the gearing for rotating ring 367 is on a separate shaft.

Other details of construction of the converters may be determined by reference to the Roth Patents 2,447,819, 2,506,470 and 2,690,549 and also to the wiring diagram showing the way the commutators and synchros are connected for control of the star measuring machine.

Figure 16:
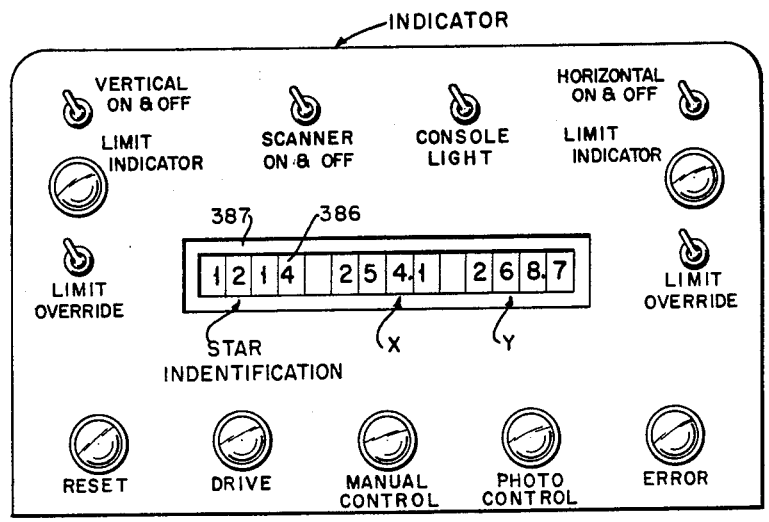
Fig. 16 is a front elevation view showing the outside panel of the indicator mechanism for the operator of the star machine.

The indicator portion of the console (Fig. 16) is seen to have numeral indicators, switches and signal lights. The three sets of numerals relate to four-place representations of the star identification and its coarse horizontal and vertical coordinates as derived from the card and directed via arrows out of the three storage devices in Fig. 20a. Labels on the four upper switches reveal their uses in preparing for automatic control and scanning. The two side limit switches and indicator lights tell when the carriages have conveyed the plate P so that it is being scanned near its edge and further scanning beyond the usual margin is to be controlled carefully by the two limit override switches. Progressive lighting of the lower indicator lamps, reset, drive, manual and photo control, show the stage of operation when there is no flash of the error light which indicates double punch or blank column of card in either reading or punching operation and stops the machine for manual control.

The keyboard (Fig. 17) has ten keys, the four at the right comprising the pairs of vertical and horizontal manual controls for moving the plate P as mentioned hereinbefore. In order to aid the vertical drive, the buzzer key is operated along with the "up" or "down" key to jar the slide loose and make it more responsive. The reset, start and stop keys are operated in that order for the usual style of operation. If motion in the vertical direction is to be accelerated for a long spacing operation, then the high-speed key is depressed along with a direction control key. The "validate" key is provided to verify that the image in the scanning range is the one which is to be measured. This last mentioned key is depressed after sighting the image in the scope area and insuring that the spot which is to exercise control is truly the star image desired, before again operating the start key to put control under automatic scanning after manual positioning.

Figure 18:
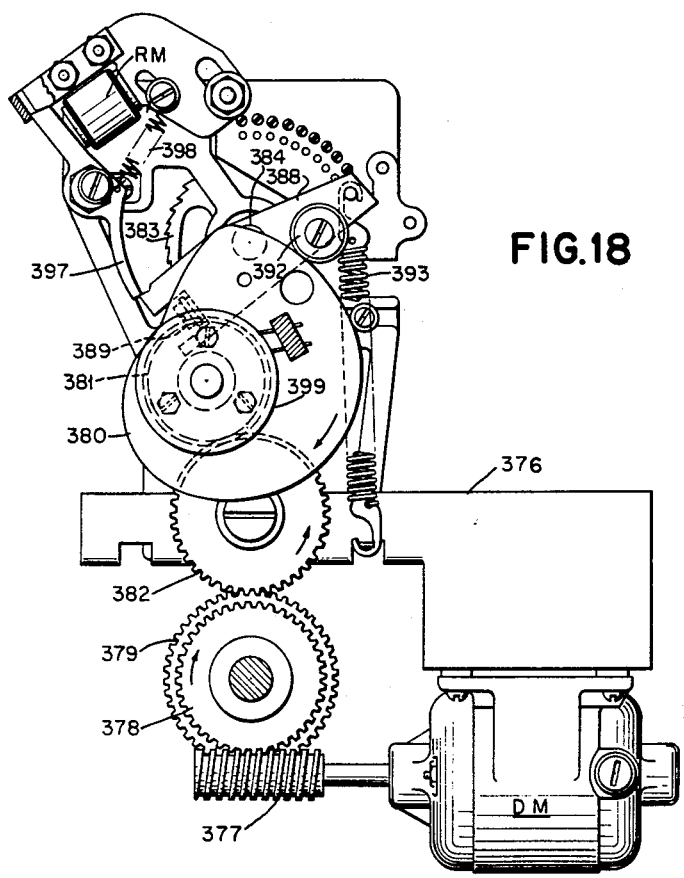
Fig. 18 is a side elevation view of the mechanism used for adjusting indicators to represent digitally in millimeters and tenths of millimeters the star position as shown in the indicator of Fig. 16.

The numeral indicating part of the console (Fig. 16) is shown also in the sectional views (Figs. 18 and 19) where it may be pointed out how the storage indicator segments are driven and positioned to reveal the star identification and the horizontal and vertical measurements in tenths of mm.

Under the base 376 of the console is fastened the drive motor DM with the shaft carrying a worm 377 for turning the worm wheel 378. Attached to wheel 378 is a drive gear 379 which rotates the cam 380 and gear 381 through the idler gear 382. Cam 380 serves to set the rockable storage elements 383 (Fig. 19) in a manner about to be explained.

Rotatably mounted on shaft 384 are three groups of storage elements 383 with four elements in each group. Extending from each element 383 are two posts 385 on which is secured the arcuate indicator segment 386 bearing the flash digits to show through the window 387.

Figure 19:
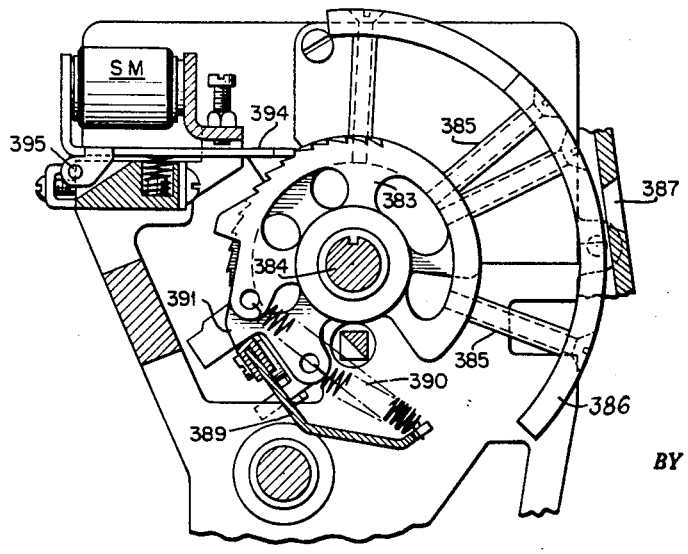
Fig. 19 is a side elevation view of the interior adjusting and indicator locating mechanism of the device shown in Fig. 18.

Means are provided to set the storage elements concurrently to indicate the star data as determined by differentially timed impulses from the card. For this purpose there are means to rock the twelve storage elements 383 together and to stop them individually in the proper indicating positions. Pinned to the opposite ends of the shaft 384 (Fig. 18) are two bail arms 388 connected by a crossbar 389 (Fig. 19). Springs 390 pull the storage elements 383 counterclockwise so that normally a shoulder 391 on each element abuts on a stop on the upper edge of crossbar 389.

A cam follower roller 392 (Fig. 18) pivoted on the bail arm 388 is held against the cam 380 by a strong spring 393 on the bail. The cam 380 rotates clockwise and during its rise rocks the bail 388 at a rate which causes the storage elements to travel in time with the reading of the corresponding card index point positions. Each storage element has a related storage magnet SM with an armature 394 pivoted at 395 and extending over into a position to coact with teeth on the element. When a storage magnet SM is de-energized, its armature is tilted up by a spring to a position where its right end is above the teeth of the storage element.

Fig. 19 shows the front magnet SM energized at a midpoint index position and its armature dropped in front of a particular tooth of the storage element to stop it in the position indicating the digit of the sensed perforation. Further movement of the bail thereafter merely stretches the spring 390.

When the cam follower 392 rolls onto the highest part of the cam 380, a latch 397 is pulled into position to latch bail arm 388 by means of spring 398. Further rotation of the cam will leave the bail latched with the values stored in the indicating unit. The unit is reset by energizing a reset magnet RM at the time that the cam follower 392 is on the high part of the cam and when the pressure of the bail on the latch is relieved. This results in the resetting of the storage unit in the latter part of the cycle, as the bail rotates clockwise and picks up the elements by the shoulders 391 and returns them to the home position.

The electric, photoelectric and electronic controls of the machine are shown in Figs. 22–71. These figures when connected as shown diagrammatically in Fig. 21 provide a unitary and comprehensive wiring diagram of the several control units of the star measuring device. In other words, the controls for the parts shown schematically in Figs. 20a and 20b are shown in greater detail in Figs. 22–71.

An effort was made to make the combined wiring diagram readable from left to right just as the schematic Figs. 20a and 20b are readable from top to bottom with the readings of the cards going into storage, compared with converters and controlling over synchros to set the photographic plate.

In the sections which follow it is intended to point out the location of the various electrical components and describe them generally as the initial step in explaining the wiring. Then a sample digital card reading and setting is to be traced as it appears in a single denominational order of the successive parts of the electrical controls.

Figure 39:
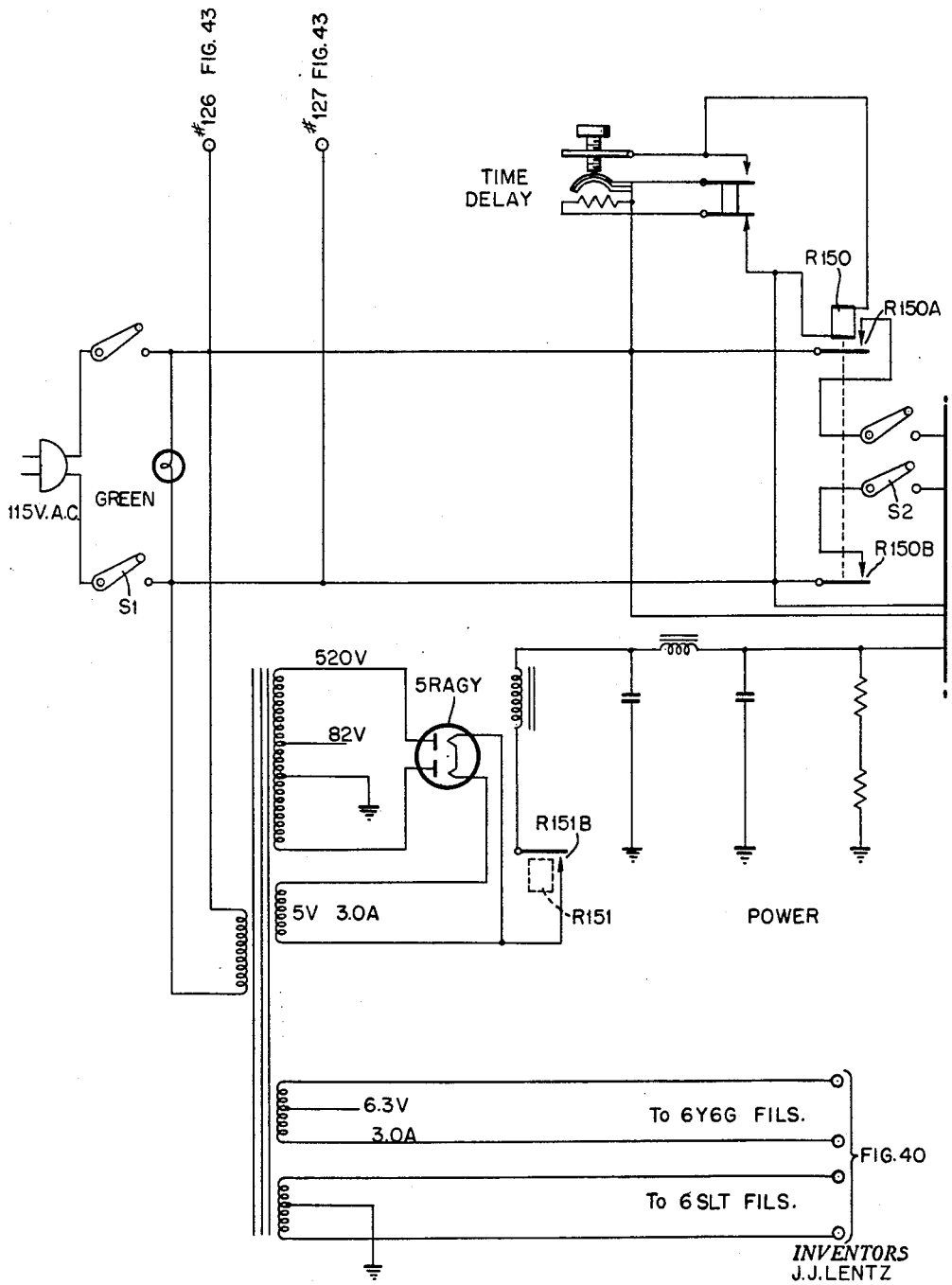
Figure 40:
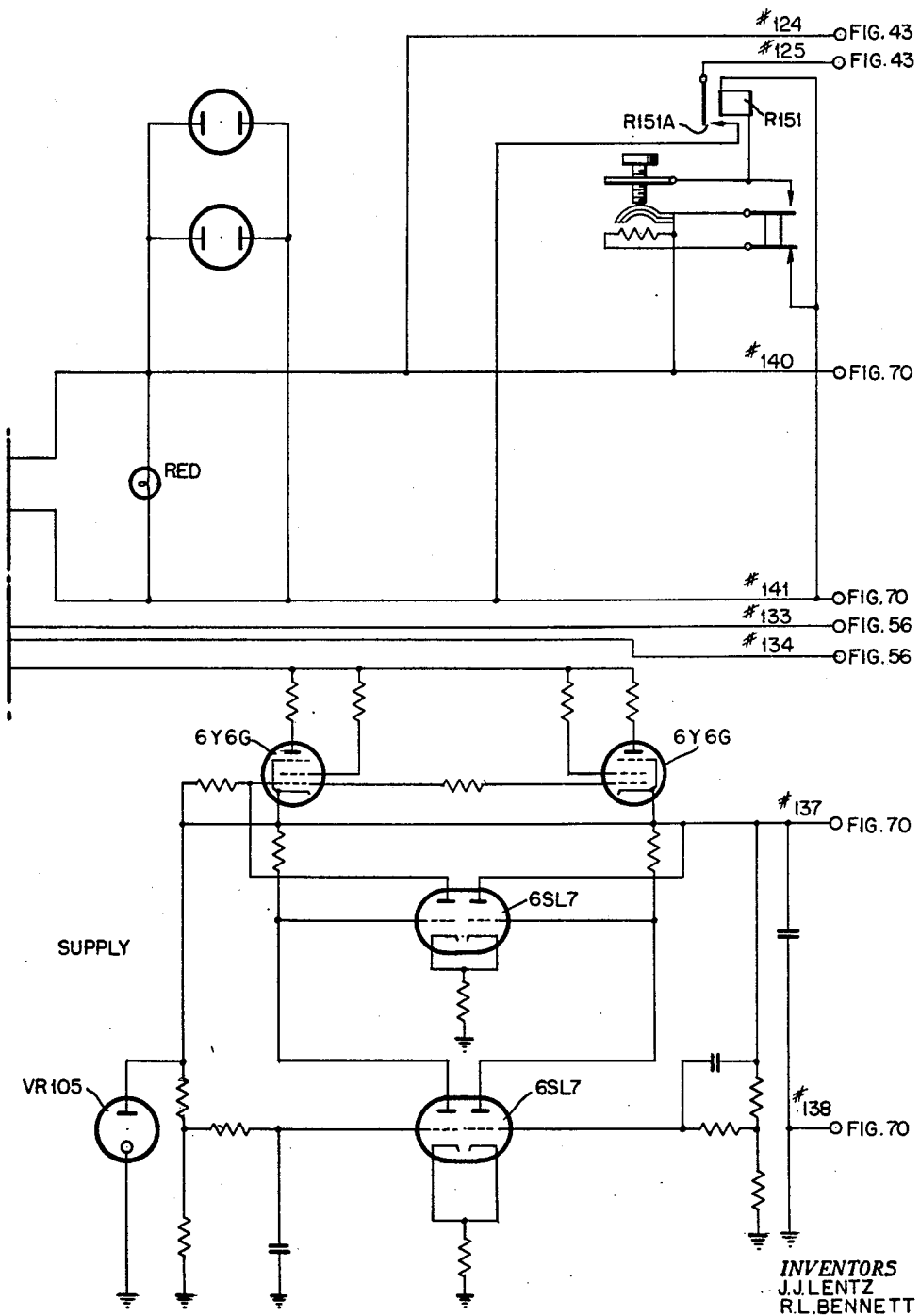
Figure 43:
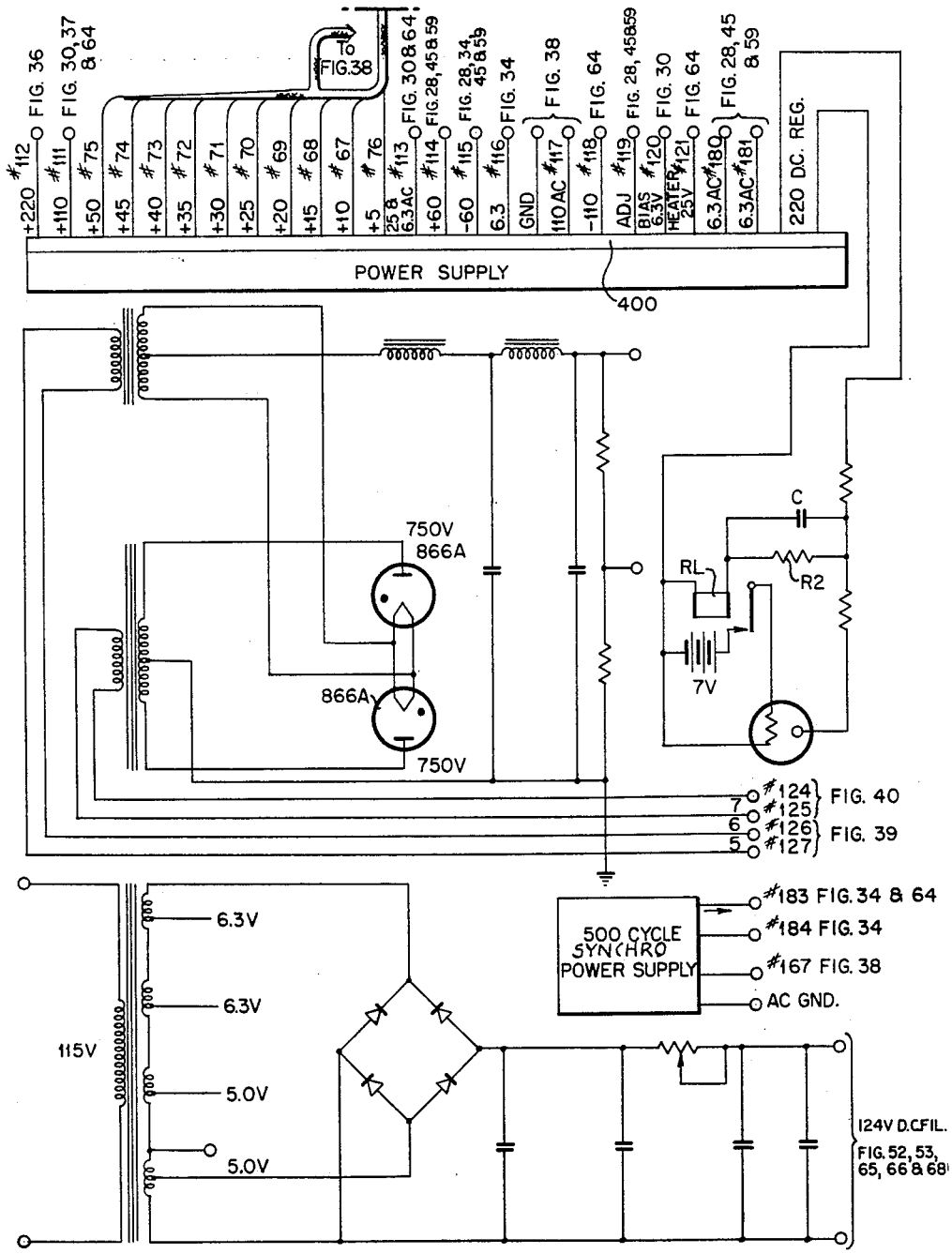
Figure 44:
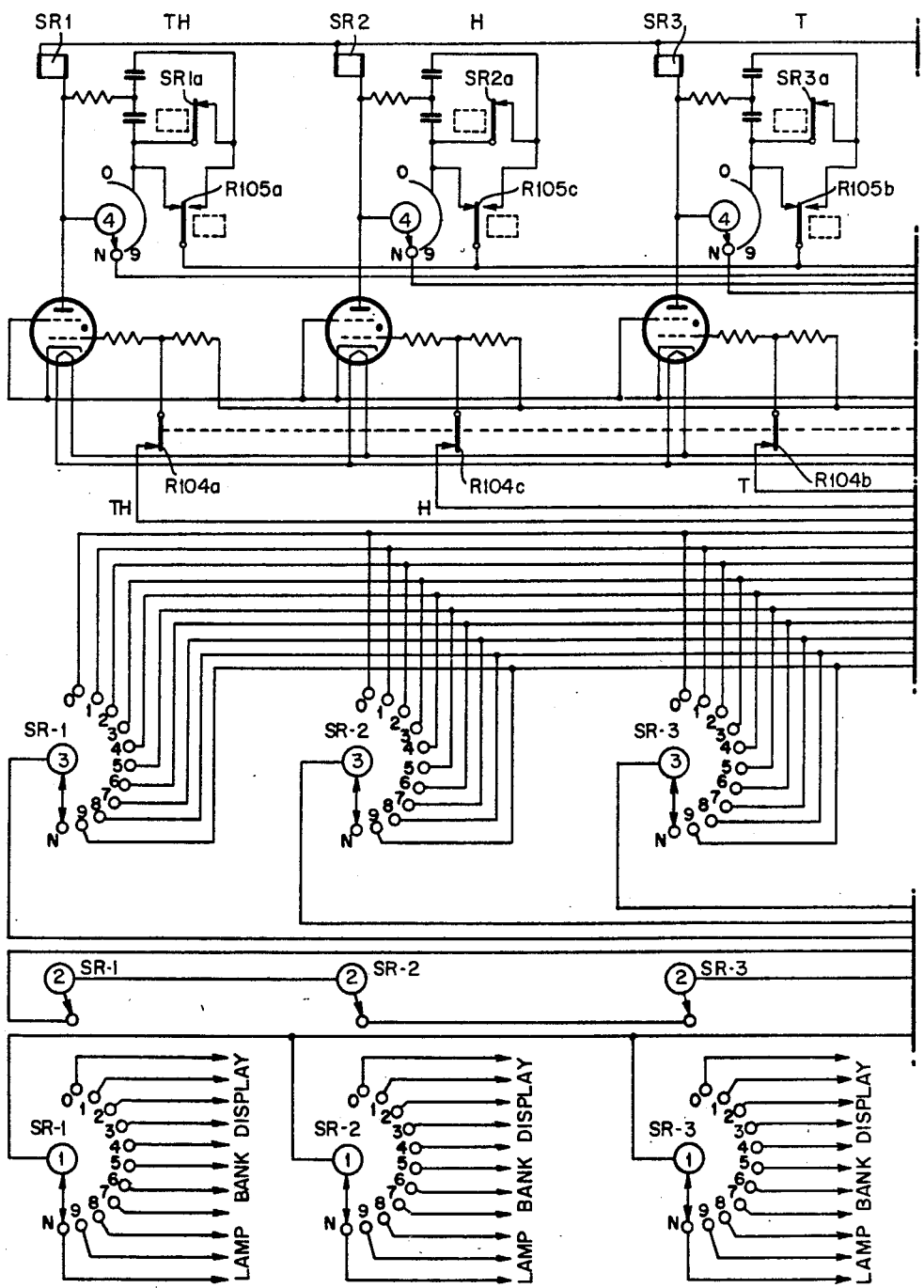
Figure 45:
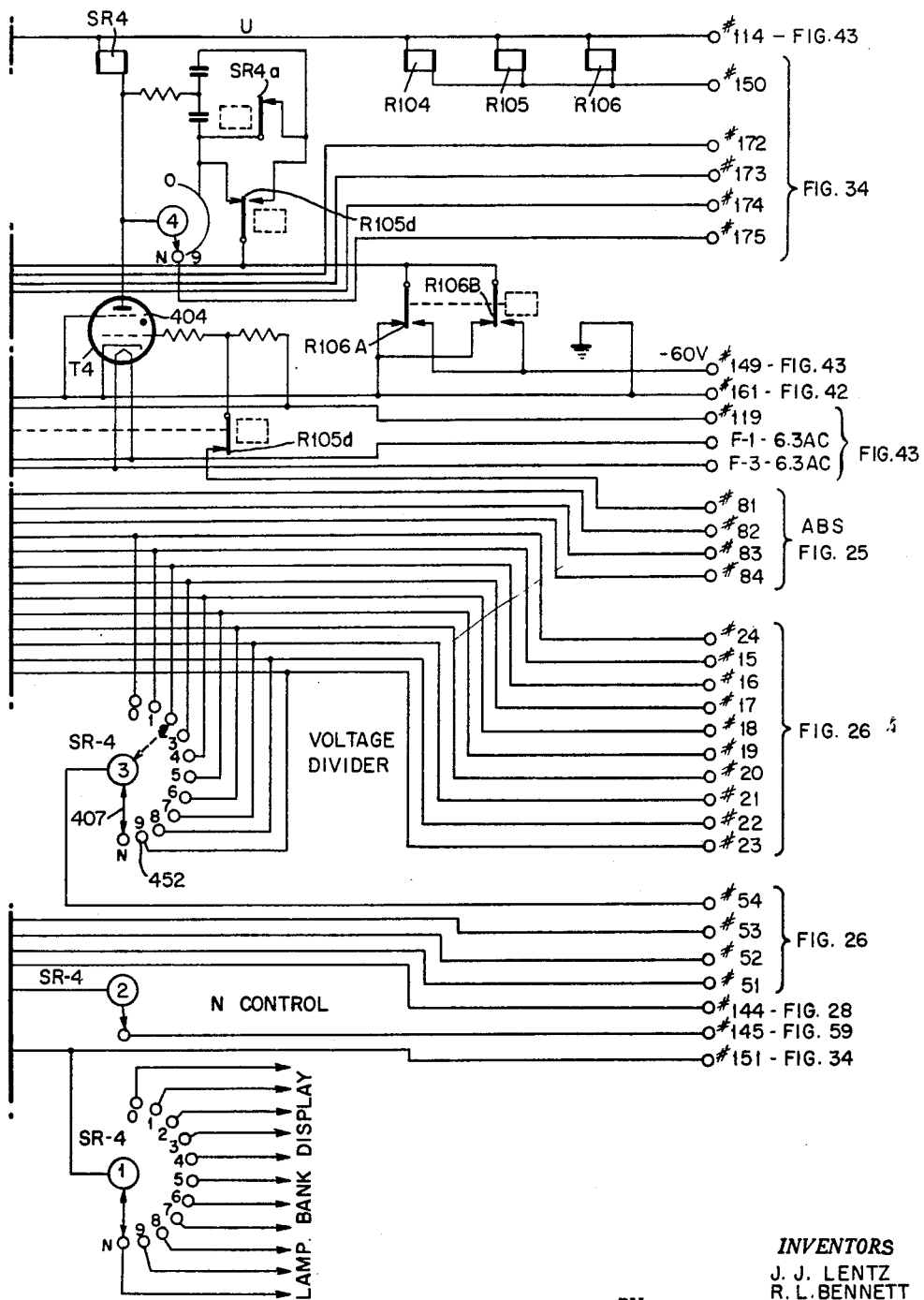

The main power source is that shown in Fig. 43 with the partial voltage divider 400 serving many controls of the machine. The 500 cycle supply also shown in Fig. 43 is used to drive all twelve fine and coarse synchros and also to provide reference voltage for the transformer TR3 (Fig. 63) for the tube and relay control of directional signals. The power supply unit shown in Fig. 39 and 40 is used to control the time of application of intermediate and high voltages for the servo power amplifiers. It includes the two time delay relays shown.

Figure 41:
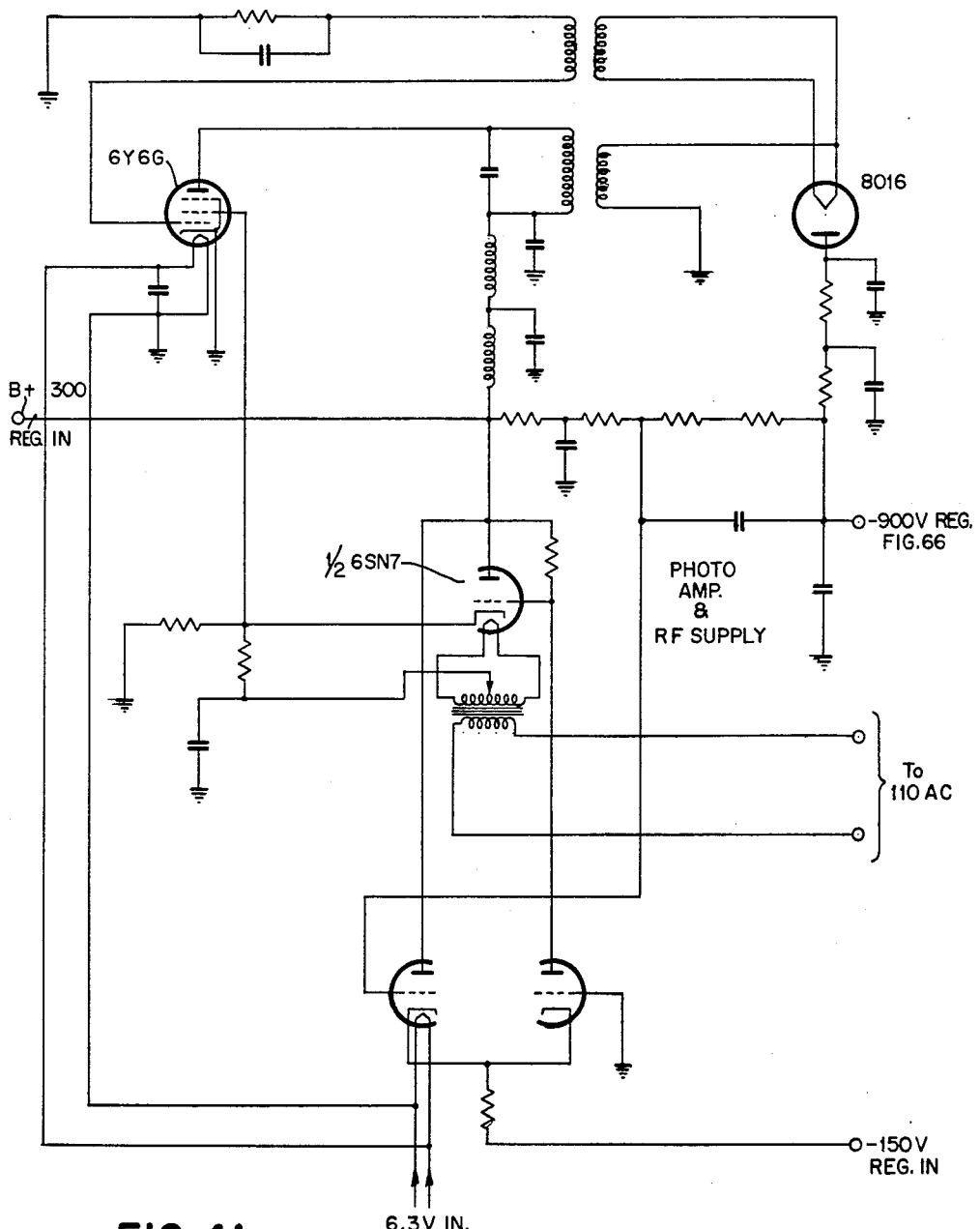
Figure 42:
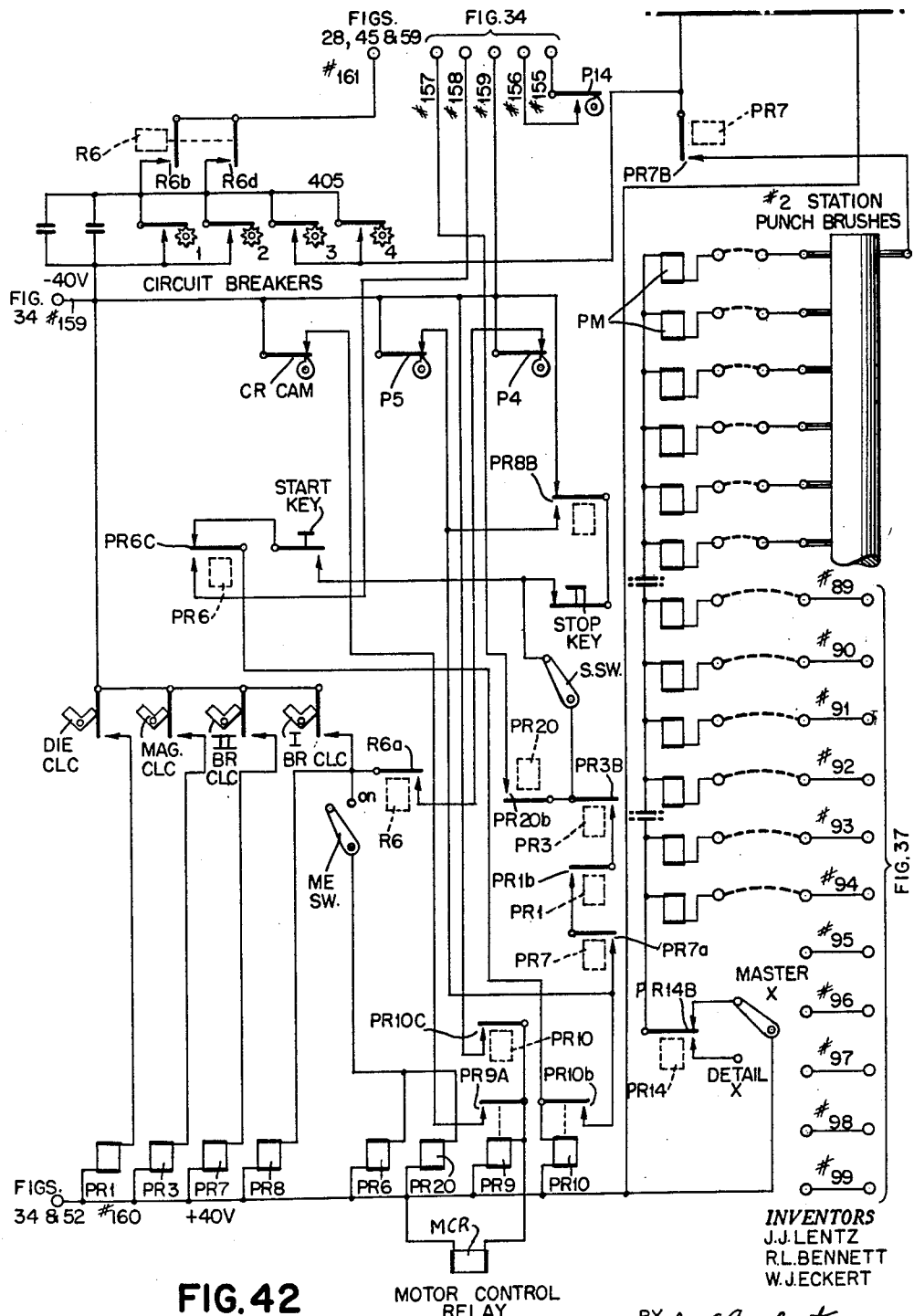
Figure 66:
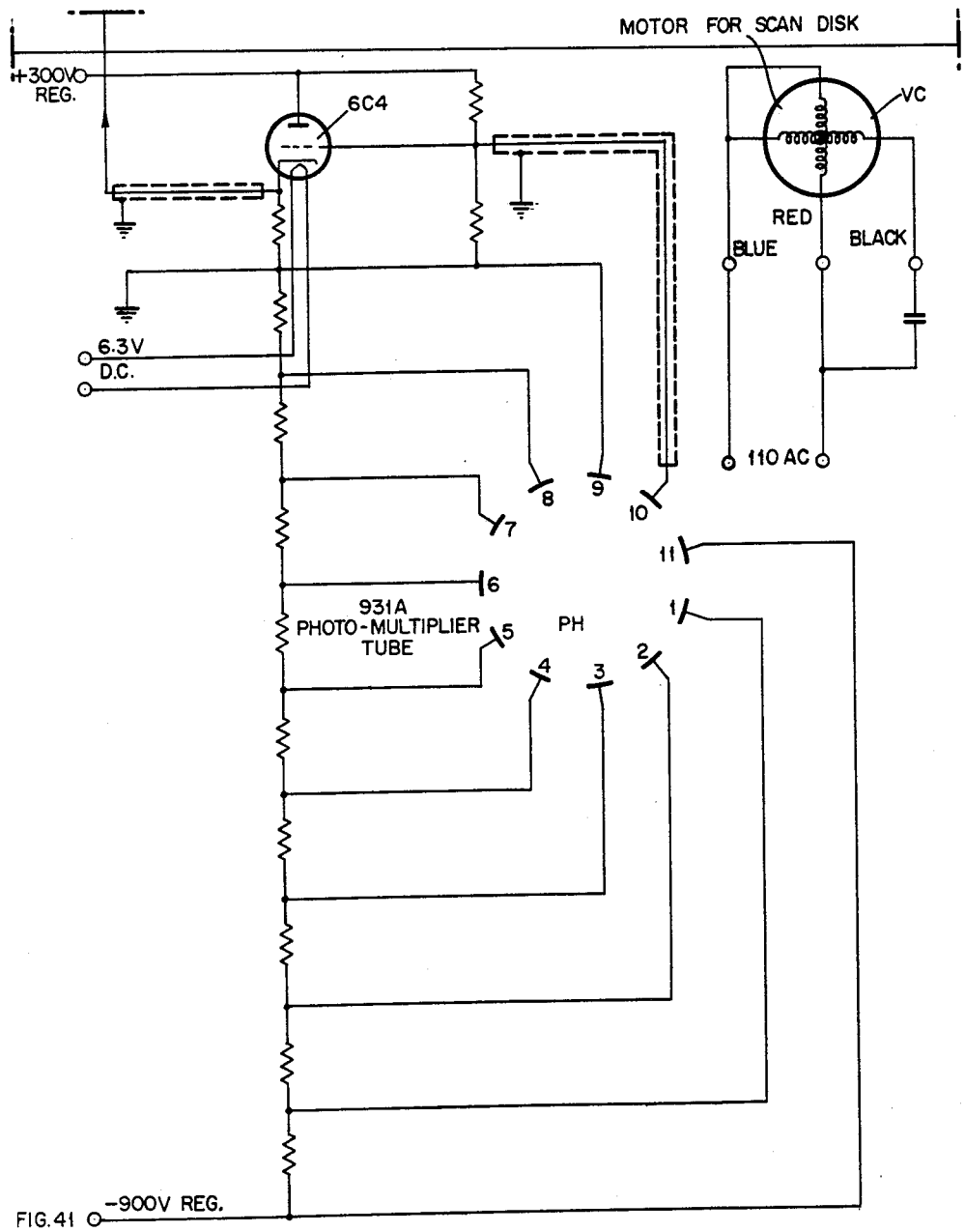
Figure 67:
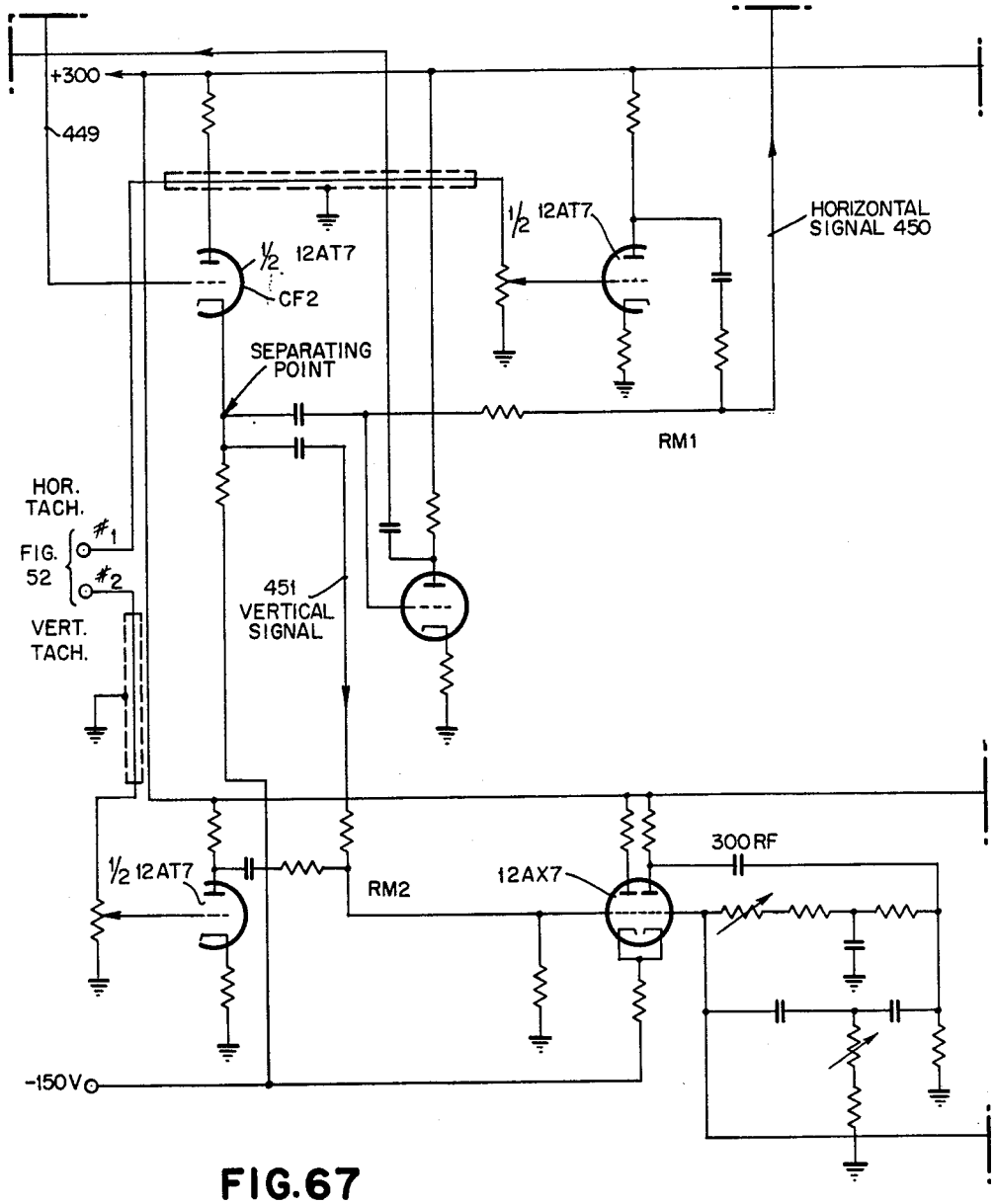
Figure 68:
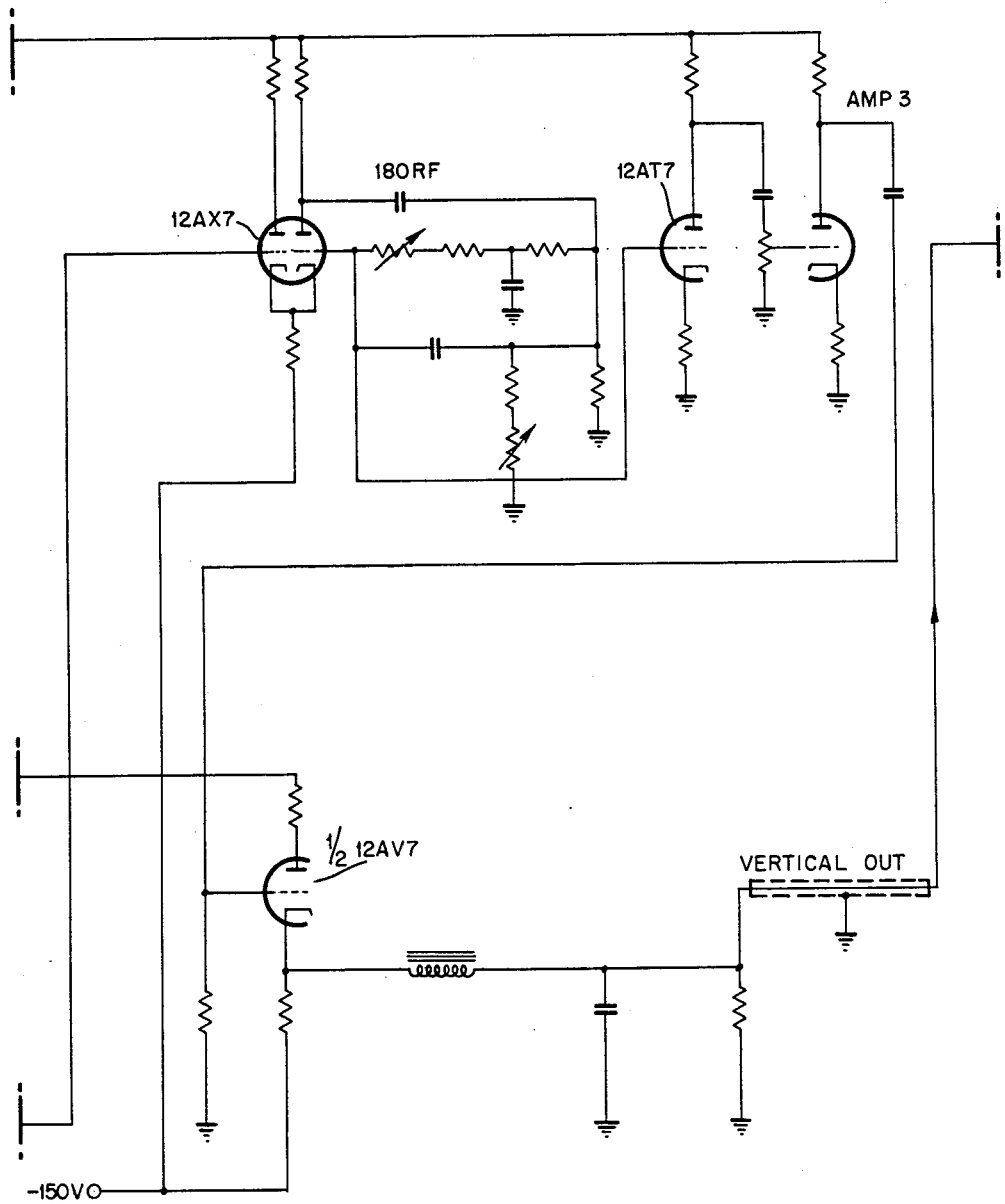
Figure 69:
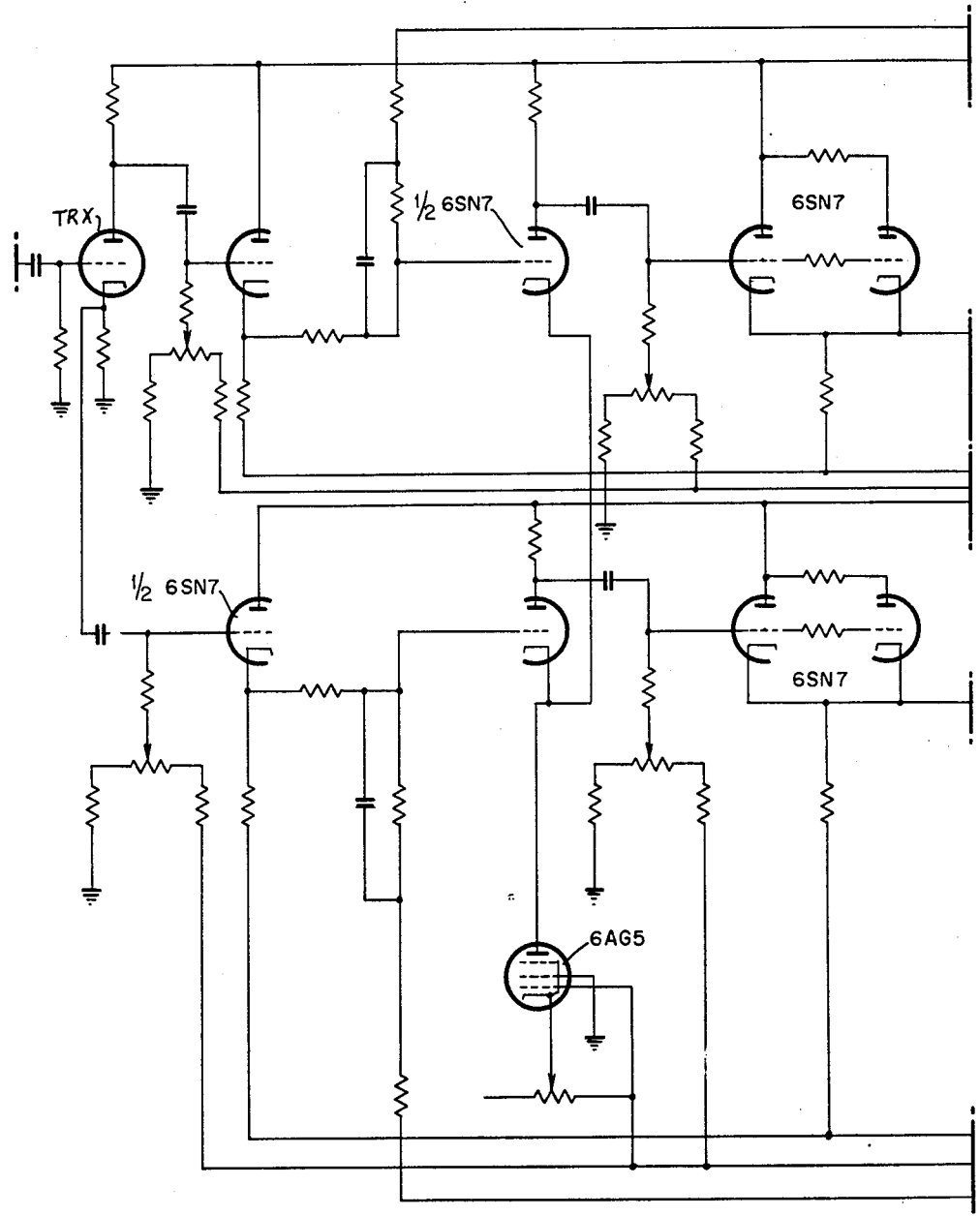
Figure 70:
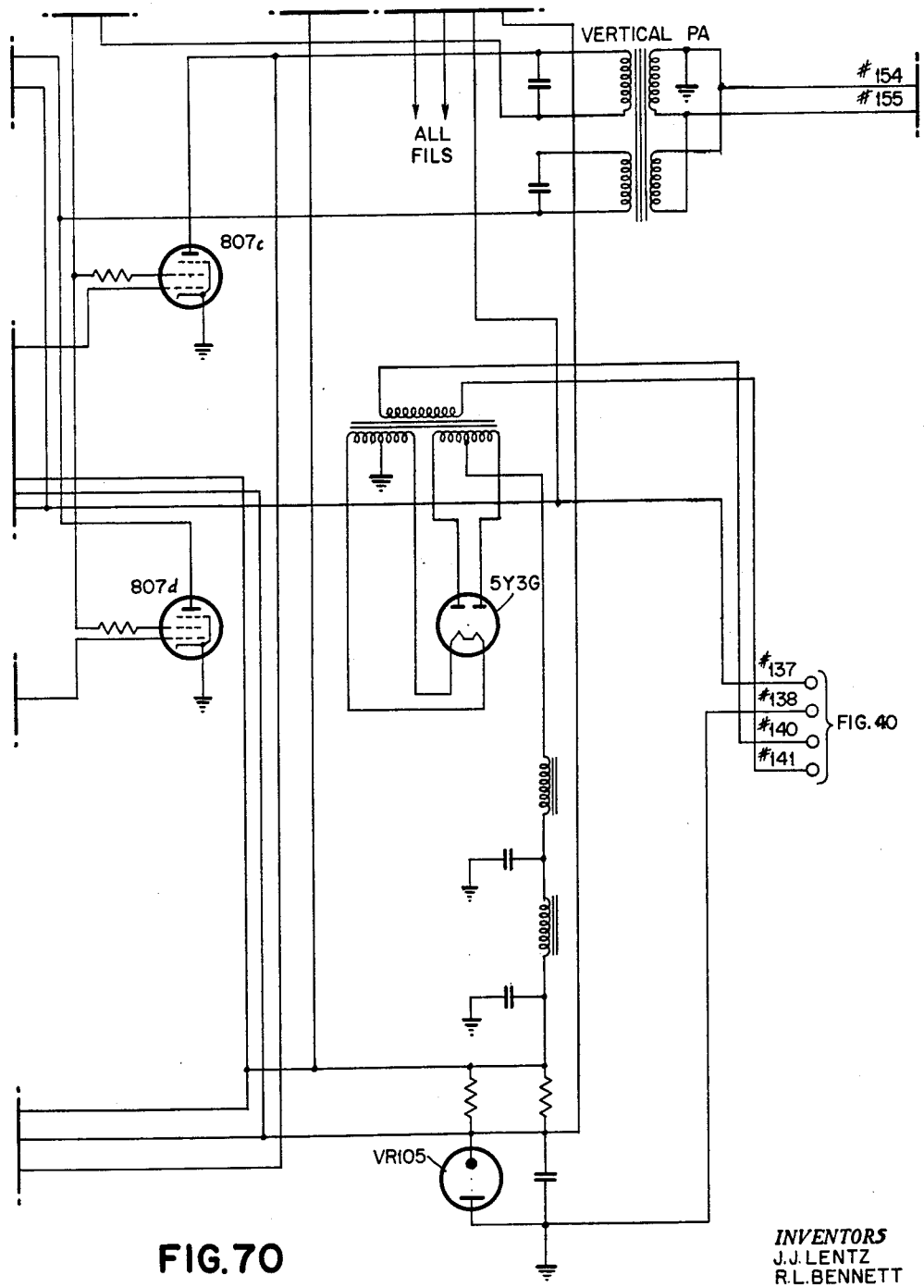

In Fig. 41 is shown the high-voltage generator with an oscillator, regulator and rectifier for an output of 900 v. for the photomultiplier tube PH (Fig. 66). Also shown in Fig. 66 is the motor VC for driving the scanner, and this has an ordinary 60 cycle, 110 A.C. supply.

Figure 23:
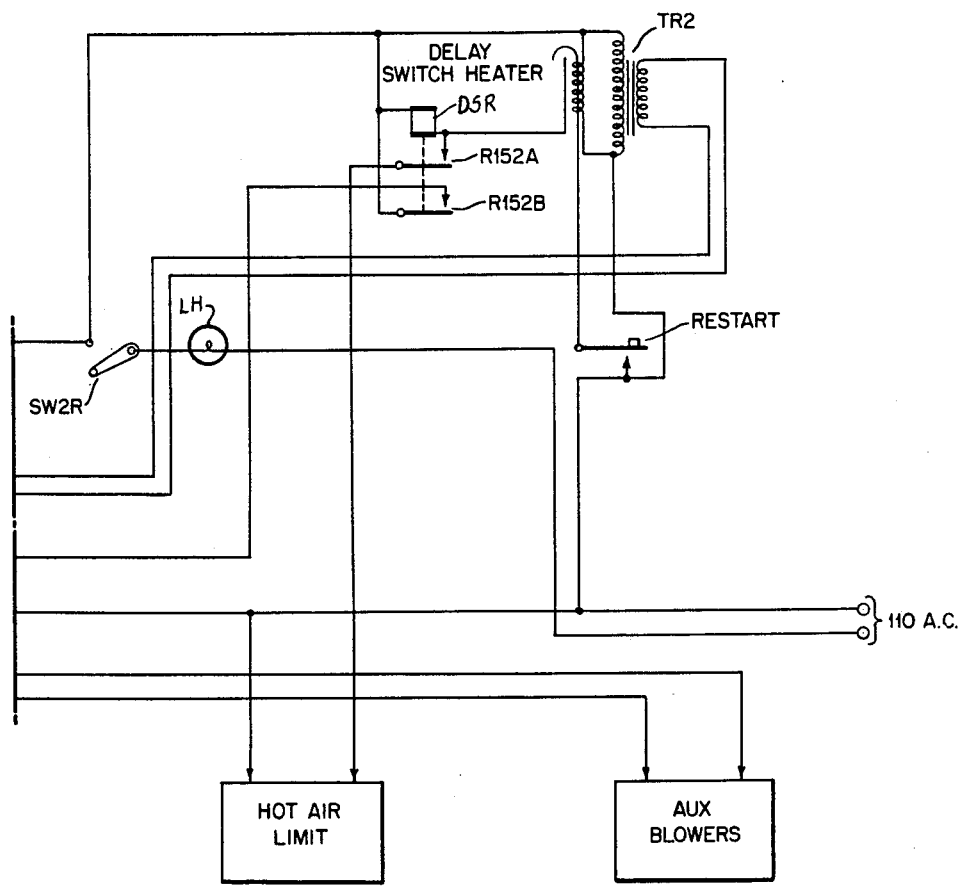

In Figs. 22 and 23 is shown the air conditioning blowers, thermostat controls, neon lights and delay switch for maintaining the enclosing cabinet of the machine within close temperature limits.

The card reader and punch is of a well-known form including a line of eighty card reading brushes 403 (Fig. 25) for sensing the card while it is in motion. Since the line of brushes extends along the length of the card, it encounters the passing index points in the order 0, 1, 2, etc. Pulses therethrough are timed to be representative of the digits and used to set the storage devices and the indicator console (Fig. 26).

From the brushes 403 (Fig. 25) the timed card pulses are directed into three sets of storage and lamp indicating devices. At the bottoms of Figs. 27, 44 and 58, respectively, are the switches set to light bulbs in a cabinet (not shown) for the star code number, horizontal or abscissa measurement and ordinate or vertical measurement. In the centers of the three figures are the switches set to store the numbers independently of lights and in the case of the abscissa and ordinate switches of Figs. 44 and 58 to ready them for comparison with converter readings. A sample circuit from a units brush 403 of the abscissa control (Fig. 25) will go to the right center of Fig. 45 to point 81 and triggers the tube 404 which picks up the relay SR4 which then starts the stepping of the related units switches (Fig. 45) as pulsed by the circuit breakers 405 (Fig. 42) of the card feeder. For a low card reading such as "2," the tube 404 and relay SR4 is picked up early in the cycle and time is afforded for the step switch to be actuated eight times from the home position and brought around to contact the "2" segment.

Figure 26:
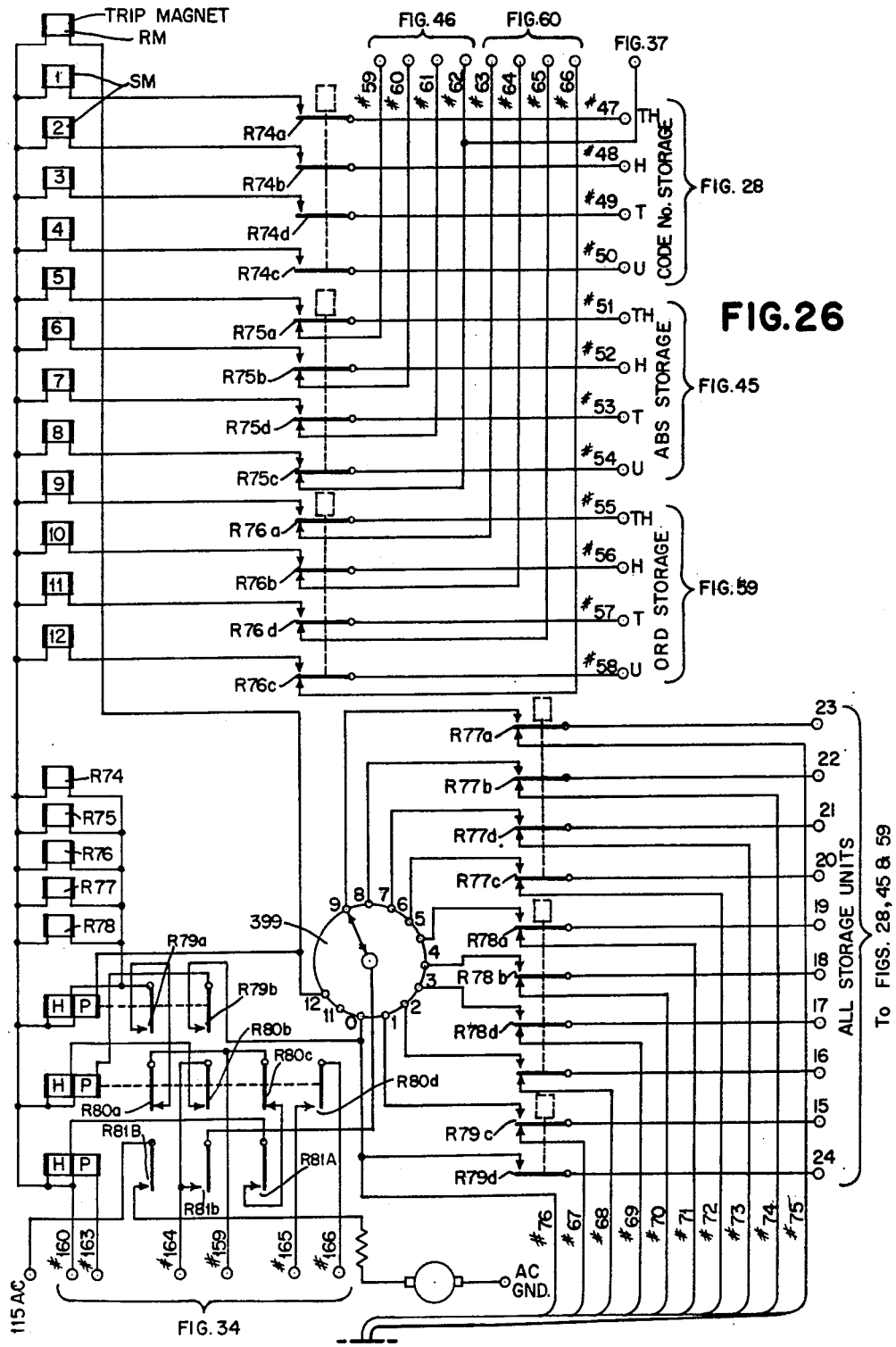
Figure 27:
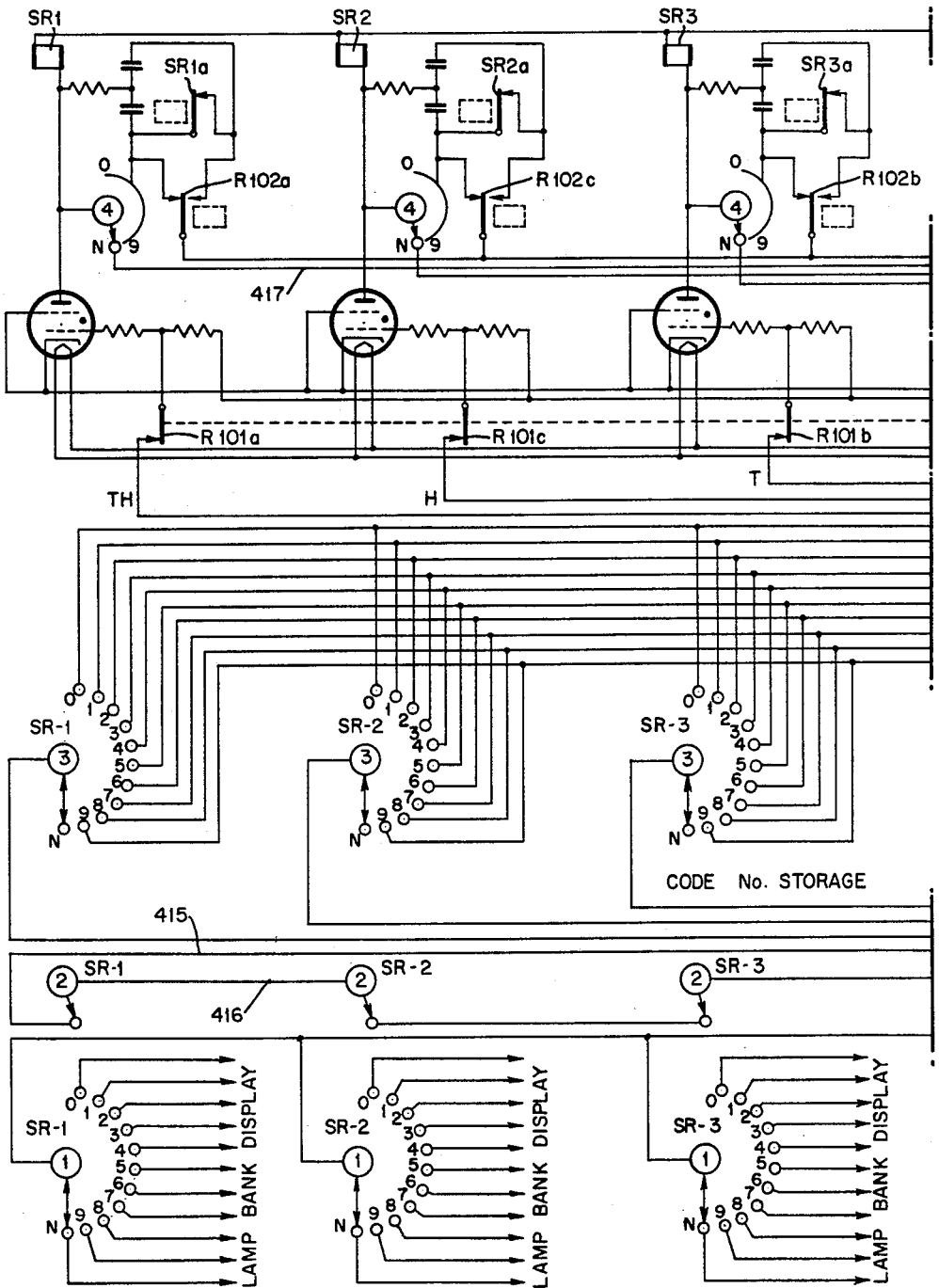
Figure 28:
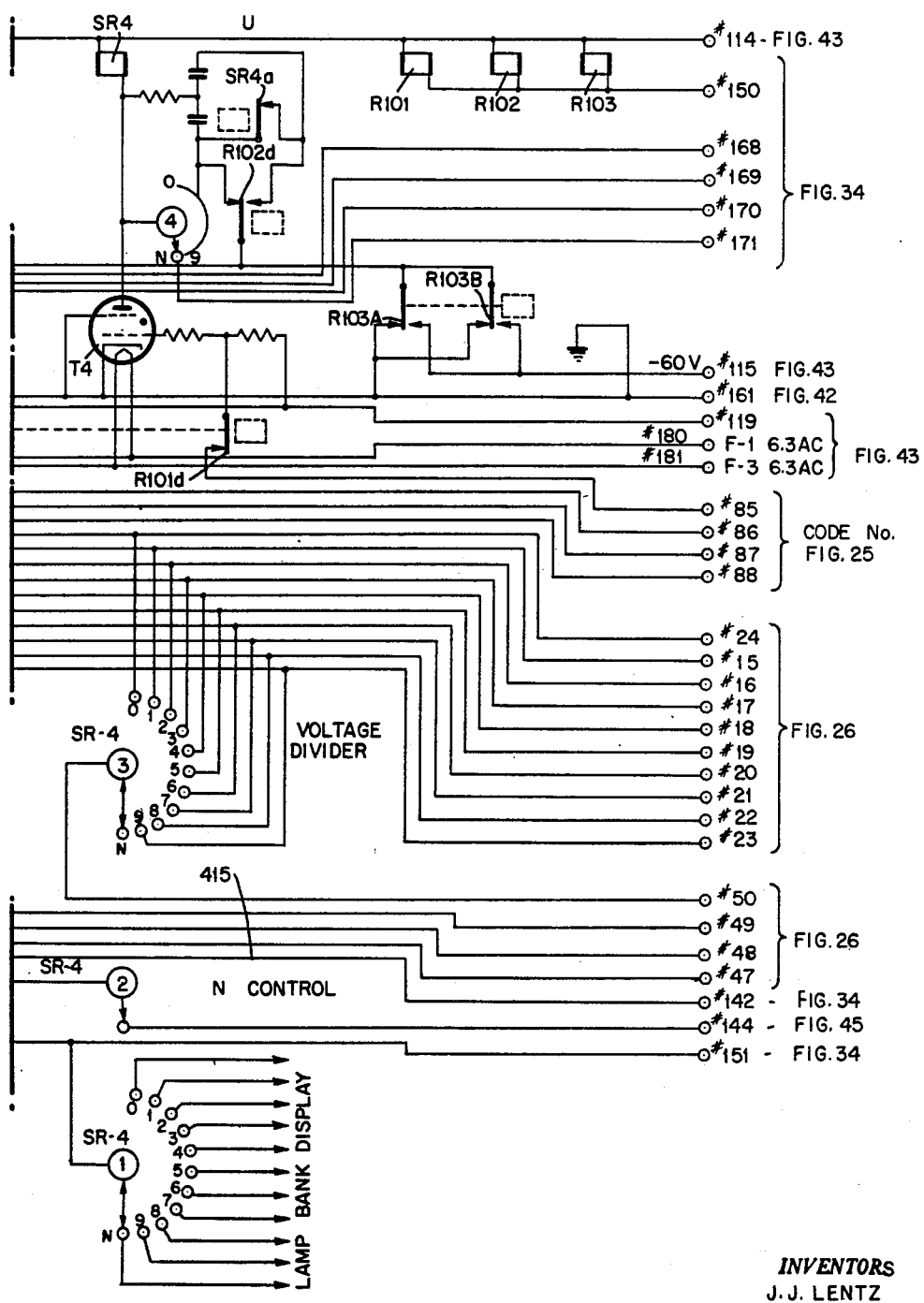
Figure 29:
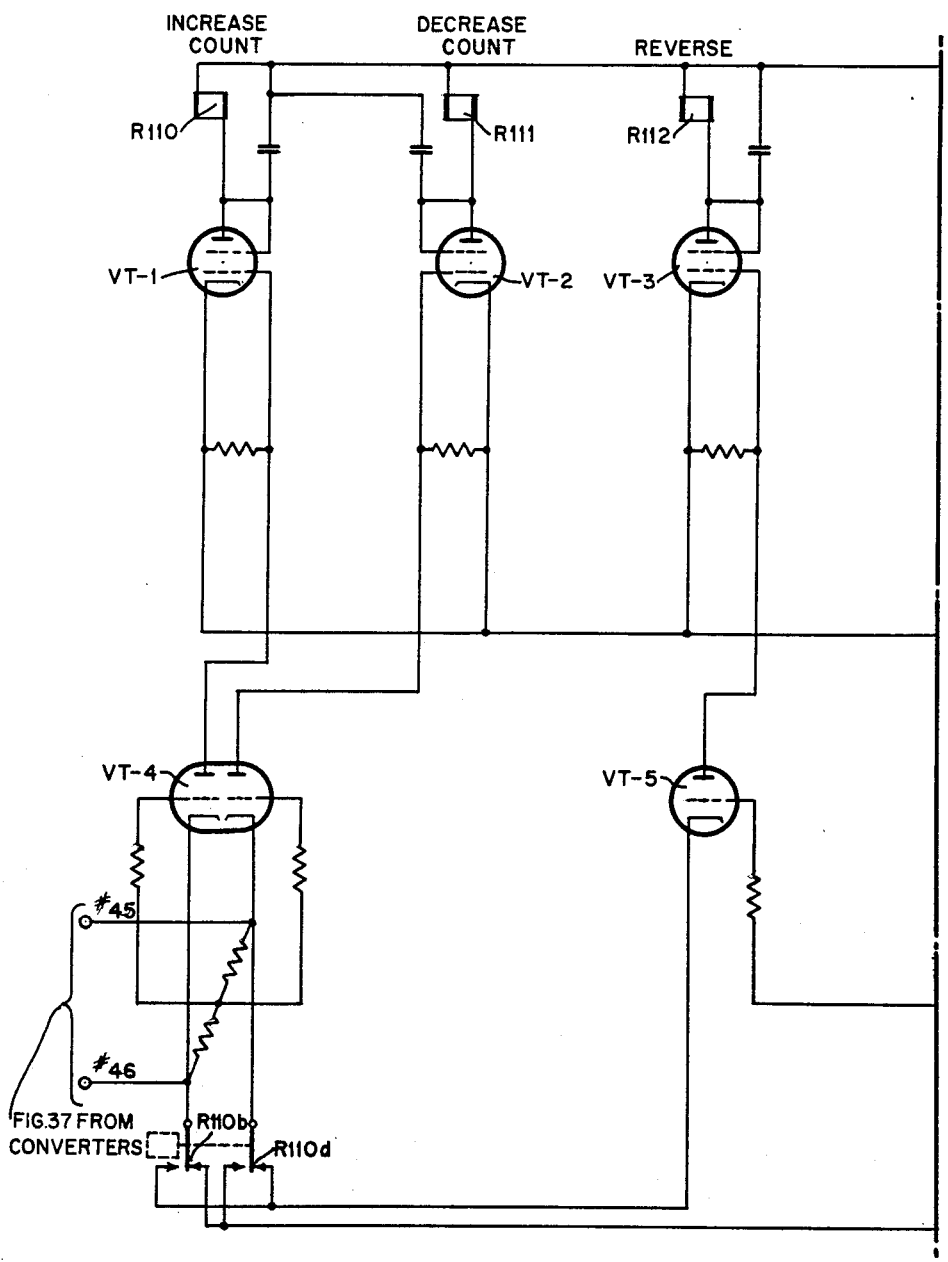

The abscissa reading is communicated to the independently driven console indicator shown diagrammatically in Fig. 26 with its drive motor DM. The commutator 399 sends scanning pulses through the digital lines seeking the setup in storage. In the case of the "2" setting assumed the commutator moves from 9 to 3 without any effect. However, when touching the "2" line (wire 16, Fig. 45) of the SR4 switch, a circuit is made through the switch arm at "2" and over to the switch common No. 54 at "2" time, and thence to the corresponding No. 54 socket leading to the eighth SM magnet which stops the indicator sector 386 in the "2" indicating position.

Punch magnets PM (Fig. 42) are also part of the card reader and they come into play near the end of each measuring operation. The punches are operated in timed relation with the intermittent digital advance of the card under the line of punches. A reading of the converter communtators 251 (Fig. 38) is taken, and timed pulses therefrom are directed through cable wires into the punch magnets PM. Pulses are directed from the punch emitter (Fig. 25) and carried over into the sockets No. 100—109 (Fig. 38) and through relay contacts R5—R7 and then selectively through a particular segment 247, arm 251, relay contacts R10 called into play at punch-out time, and into the sockets 90—99 (Fig. 42) and plug connections to the punch magnets PM.

As already noted, as a card is read for sensing the four ordered horizontal and vertical measurements of a star position, the reading is stored in a switch form of electrical storage means. These switches (Fig. 44 and Fig. 58) are related respectively to the horizontal and vertical measurements in tenths of mm. The switches are of the type in which the contact arm 407 is swept around by ratcheting due to the pulsing of a magnet SR4 and restored to the home position by the actuation of the same magnet by the closure of contacts of relays R105 and R106 and an interrupter contact SR4a by which the magnet is pulsed successively to step arm 407 around to the normal point. Identification of the switches is given as that of type 810A made by the Federal Telephone and Radio Corporation.

Figure 48:
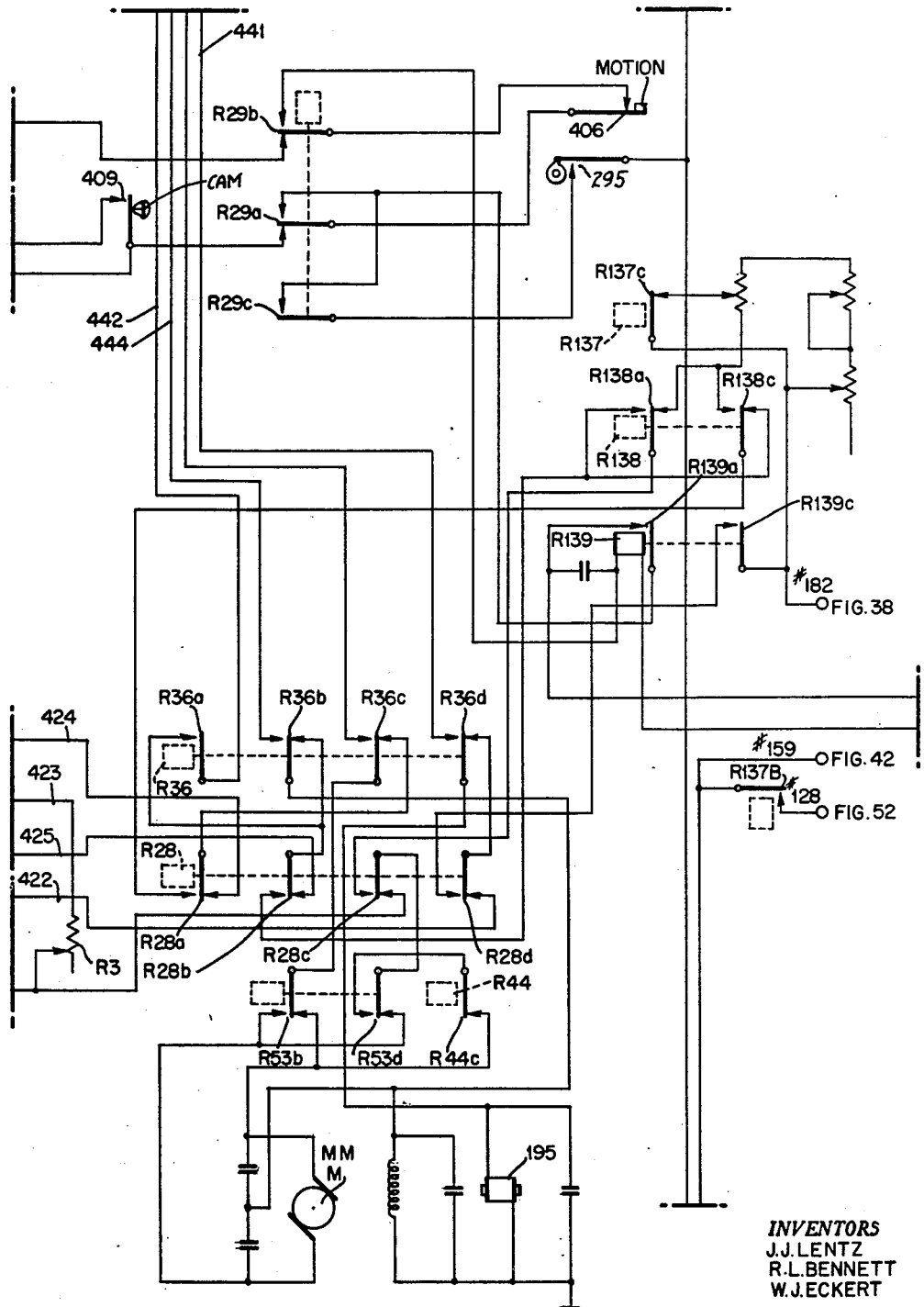
Figure 49:
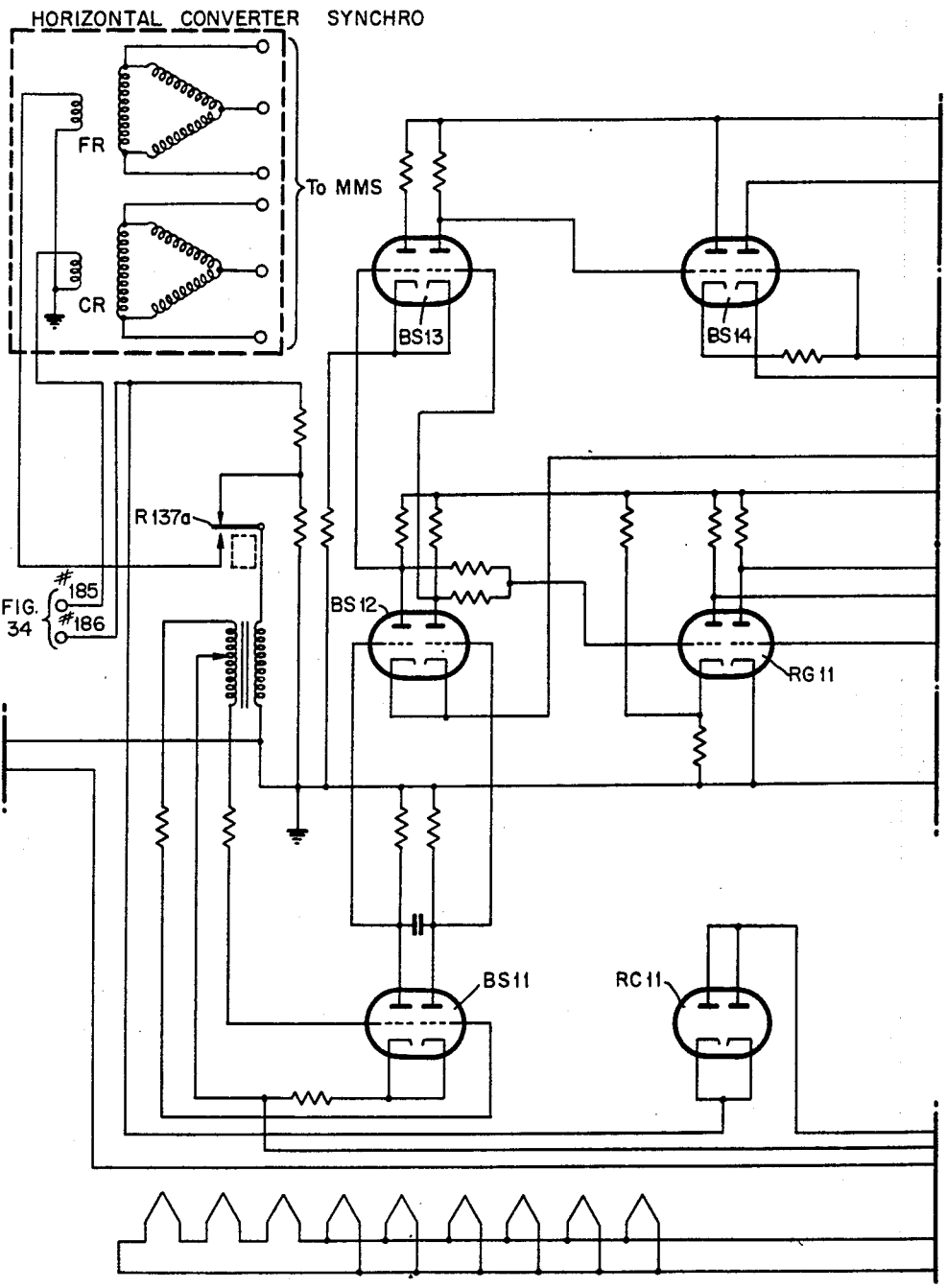
Figure 62:
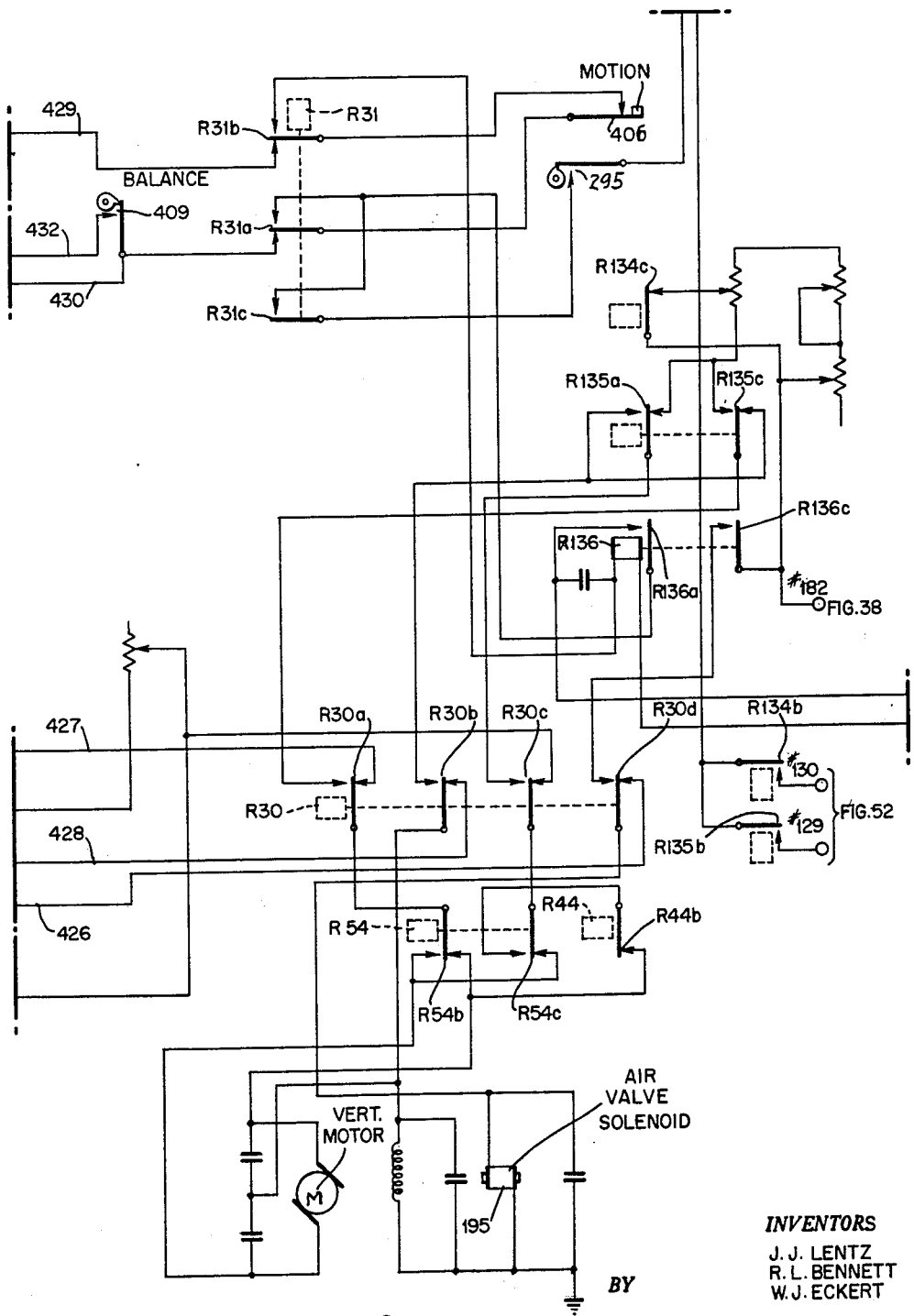
Figure 63:
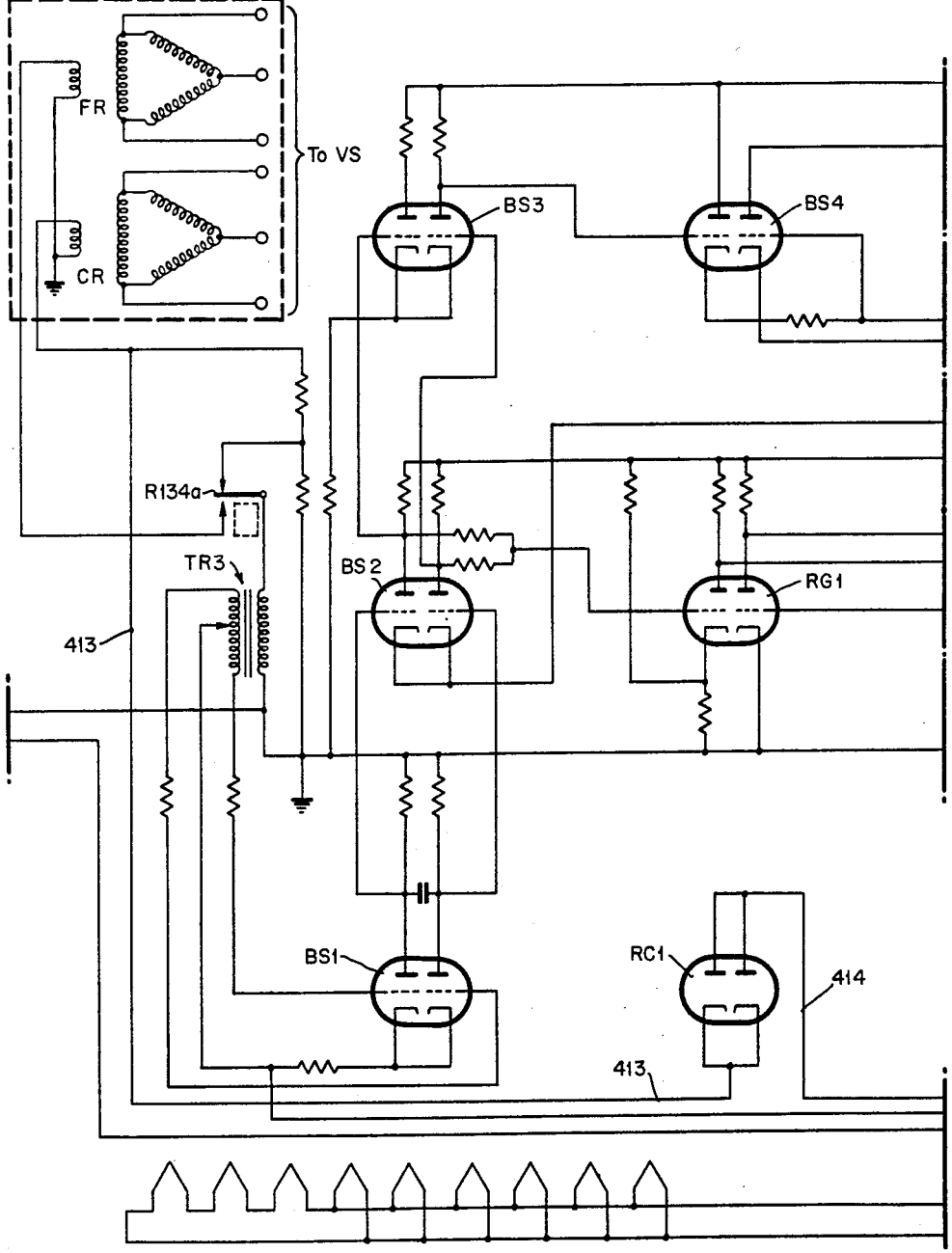

It is already noted with reference to Fig. 20a that the device has three converters, namely, horizontal or MM, vertical and micron; and they are represented in the three different rows of wiring figures, Figs. 48 and 49 for the horizontal MM converter; Figs. 62 and 63 for the vertical converter; and Figs. 31 and 32 for the micron converter control. In these three tiers or rows of wiring controls, it is endeavored to keep allied controls in a straight left to right order. For example, the control synchros FR and CR (Fig. 49) of the horizontal converter are in central alignment with the drive synchros of the MMS or horizontal millimeter control on the machine (see Fig. 71).

The controlling synchros of the converters are set under control of comparing means operated as governed by figures in horizontal and vertical number storage switches.

The comparing devices are shown in Figs. 46, 47 and 60, 61, and the purpose of the counter-storage comparing unit is to compare the digital star measurement information stored in four orders of the storage device with the four orders of the follow-up counter of the converter and then provide motor control circuits to drive the counter into agreement with the stored amount. Provision is made to operate the counter at high speed until the figure is reached and then the counter is brought into agreement at a slower speed and stopped.

The type of counter used is the X1 detenting counter. This counter has an air-controlled detent (Fig. 13) for positioning the counter emitters for read out. During advance-count or decrease-count operations, the detent 247 is held out of engagement with the toothed wheel 246 located on the units shaft 232. When the motor is stopped, the detent is allowed to engage the toothed wheel and thus lock the emitters into position with all brushes centered on the emitter spots. When it is required to move the counter the detent is held out by supplying compressed air to an air piston under control of an air valve that is solenoid operated. In removing the detent the air piston also locks an arm that is part of a differential arrangement between the units shaft and the motor drive. The motor is thus positively coupled to the units shaft at this time. When the detent is engaged, the motor drive and associated gearing is allowed to move through a small range without moving the units shaft. If it exceeds this range of movement in either direction, the operation of a contact 295 (Figs. 31, 48 and 62) by the arm 294 that is attached to the differential causes the detent to be removed so that the counter may advance or decrease count in the direction indicated. This feature is of use when the counter is "following" under synchro control. The oscillating arm contact 295 described above is not used during the initial setting up of the counter from storage. The detent is operated from the comparing unit motor control relay contacts through circuits set up by the programming relay R31.

The two contacts that are used to interlock the comparing unit to the counter are the motion contact 406 (Figs. 13 and 48) and the balance contact 409.

The motion contact 406 opens whenever the counter reverses its direction of travel. It is normally closed when the counter is moving in either direction but opens shortly after the direction is changed and closes again. It is normally used in the follow-up operation, briefly described above, to signal the proper time to drop the relay that is being used to hold out the detent. In interlocking the comparing unit it is used to hold up a speed control relay R123 (Fig. 47) as picked up through speed control condenser 410 and drop it out as soon as the counter direction changes. Thus, the counter may operate at high speed until equality is reached, the MM motor M is then reversed, still under high speed conditions and as soon as the counter is actually moving back toward the point of equality, the speed control relay is dropped out. This allows the counter to "settle down" at slow speed.

The balance contact 409 is operated by a cam that is timed in such a way that it closes the balance contact whenever the highest order (thousands) of the counter goes from 0 to 9. This contact would normally be used to pick up balance relays to invert the order of scanning the emitter spots in order to change the complementary figures to true negative figures. This is not necessary in this instance, so the balance contact is used as a sort of "limit" contact that automatically puts the counter back to the plus side of zero in case it passes through zero accidentally—as it would if it were going from 1,000 to 0001 for instance. In this case it would be travelling at high speed when it hit the 0001 figure and so would be driven by the power of its own momentum to the other side of zero. Here a comparison would be made that would send it on in the same direction—seeking 0001 if it were not for the revising action of the balance contact.

There are two counter-storage comparing units—one for the abscissa or MM counter and one for the ordinate or vertical counter. Since both are used in the same way, only one, the MM counter-storage comparing unit, will be described.

Figure 38:
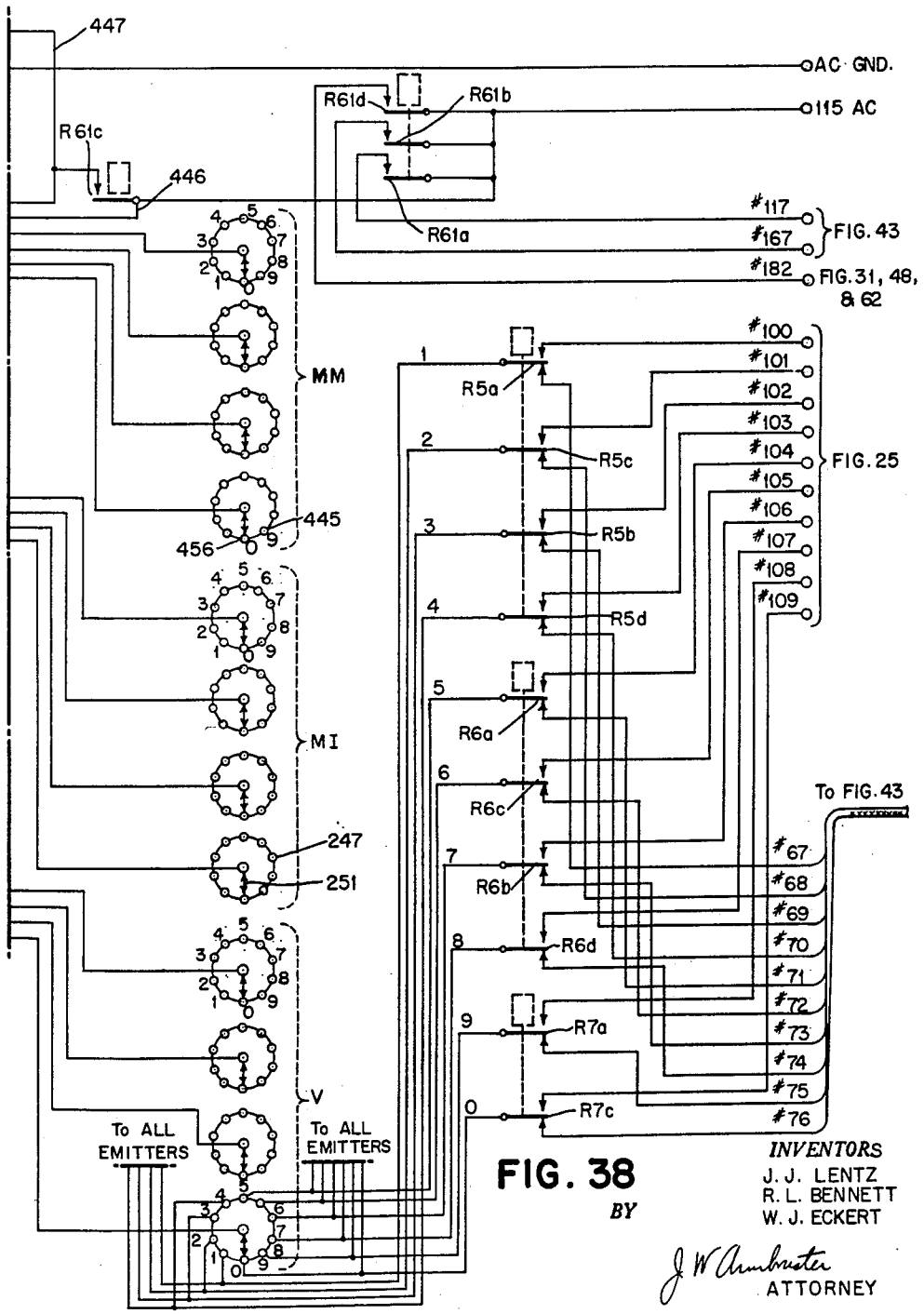

In order to compare digital information electronically, each digit is made to correspond to a certain voltage level. The storage unit contains rotary switches (Figs. 44 and 45) that act in a similar way to the counter emitters (Fig. 38). If the thousands orders of MM storage (Fig. 44) is standing on "2," then a voltage of +15 volts will appear on the thousands order output. The thousands position of the MM counter (Fig. 38) will likewise be at +15 volts if the thousands order emitter stands at "2." This is by reason of the fact that all spots of like number, whether they are located in the storage unit or on the counter emitters, will be connected during comparison operations to the same point on a voltage divider. This divider is located in the A.C.-D.C. power unit (Fig. 43). The voltages start at +5 volts for "0" and progress by 5 volt steps to +50 volts for "9."

The outputs from the MM storage unit are connected to terminals 54, 53, 52 and 51, representing units, tens, hundreds and thousands respectively. These leads then go through the console indicator contacts R75a, etc. (Fig. 26) and reappear at terminals 62, 61, 60 and 59 which connect to corresponding terminals near the bottom of Fig. 46 which shows the electronic comparing controls. The corresponding MM counter emitters 247 (Fig. 38) are connected through points of the program relay R8 (Fig. 37) to the terminals No. 25—28 and connect to corresponding terminals near the bottom of Fig. 47. The comparing unit operates so as to bring the counter to a position that corresponding lines are brought to the same voltage level, at which time equality of counter to storage is obtained.

If it is assumed that the storage unit stands at the figure of 0001 and that the counter stands at 1000, the following voltages then appear:

| Storage | | | Counter | | |
|---|---|---|---|---|---|
| "1" | 62 | +10 volts | +5 volts | 28 | "0" |
| "0" | 61 | +5 volts | +5 volts | 27 | "0" |
| "0" | 60 | +5 volts | +5 volts | 26 | "0" |
| "0" | 59 | +5 volts | +10 volts | 25 | "1" |

The comparing unit is called into service by the application of +220 volts to the input terminal. Just prior to this, the twin triodes, T–9 to T–12 (Fig. 46) are made conductive or nonconductive by the above voltages as follows:

Left side of T–9 will conduct (cathode at +5, grid at +10)

Right side of T–9 is cut off (cathode at +10, grid at +5)

Left side of T–10 will conduct (cathode at +5, grid at +5)

Right side of T–10 will conduct (cathode at +5, grid at +5)

Left side of T–11 will conduct (cathode at +5, grid at +5)

Right side of T–11 will conduct (cathode at +5, grid at +5)

Left side of T–12 is cut off (cathode at +10, grid at +5)

Right side of T–12 will conduct (cathode at +5, grid at +10)

The conducting sides will draw 0.5 mia. so that these anodes will be down from 110 v. by 75 volts or at +35 volts. The anodes of the cut-off triodes will be at +110 volts. A typical circuit as follows: terminal No. 111, Fig. 30 (110 v. D.C.), T–1 (8), Fig. 46 resistor 411, T–1 (5), T–9 (2), T–9 (3), No. 59 terminal and through the storage switch and voltage divider to ground.

The voltage divider is made up of 27 ohm sections. The combined currents of all triodes in this comparing unit equals 5 m.a. This will raise the voltage of the "0" spot by .135 volt—a negligible amount.

The anodes of the triodes are directly connected or connected by normally closed relay points to the grids of the beam power tubes T–1 to T–8. From the foregoing it is evident that tubes T–2 and T–7 are the only ones that can conduct when +220 volts are applied to the input terminal. All other tubes will be held nonconductive by the drop in the resistor 411 created by the current flowing in the conductive triode associated with each tube.

Therefore, when the comparing unit is called into service, relays R115 and R120 will be energized by the current flowing in tubes T–2 and T–7.

The R115a points will immediately open, however, and cause relay R117 to be picked up, since T–4 will now conduct.

The R117a points will open and cause relay R119 to pick up, since T–6 will now conduct.

The R119a points will open and cause relay R121 to pick up, since T–8 will conduct.

The R119a points will cause T–7 to cut off and drop out relay R120 by means of the drop produced in the 411 resistor in the following circuit: terminal No. 111 (110 v. D.C.), T–7 (8), 411 resistor, T–7 (5), R118a normally closed, R121c transferred, resistor 412 to ground.

Note that relays R115, R117, R119 and R121 are now energized and that tubes T–1, T–3, T–5 and T–7 are definitely cut off by the transferred R115c, etc. points of said relays. Therefore, as long as relay R115 is energized, relays R117, R119 and R121 will remain energized regardless of what may occur in the triode sections of T–10, T–11 and T–12. By the same token, the transferred R115c, etc. points will prevent conduction in tubes T–1, T–3, T–5 and T–7 and so prevent these from picking up the associated relays.

The foregoing illustrates how control is passed from the highest order down to the lowest order. As the higher orders reach agreement, control is given to the lower orders until the units come into agreement, at which time all relays are dropped out and the converter motor M is stopped.

At the time that relay R119 picked up, a circuit was completed to pick up relay R123 as follows: terminal No. 188 (+220), relay R123, coil and contacts R123c, contacts R119b, +side of capacitor 410 to ground.

The charging current of the capacitor will pick up the relay, closing the upper R123c points, when it will hold as follows: terminal No. 188 (+220 v.), relay R123 coil, R123c, through program relay control R29b, through normally closed motion contact 406, to terminal No. 111 (110 v. D.C.).

The end result of the comparison is that relays R121 and R123 are energized. This will drive the converter motor M in the "decrease count" direction at high speed. Figure 48 shows a simplified motor control circuit with program relay points, terminal connections, etc.

The converter motor M (Fig. 48) operates on 110 volts A.C., and it is a series motor so that all circuits will include both the rotor and the field. When relays R121 and R123 are picked up, the following circuits are established:

To energize the air valve solenoid 195 and so remove the detent: 110 v., terminal A5 (Fig. 47), R121d, solenoid 195 and ground.

To operate the motor: 110 v., terminal A5, R121a transferred, R122c normally closed, program contacts R28a etc., motor M rotor, R123a, tap on 50 ohm resistor, section of resitsor, R122a normally closed, R120a normally closed, program contacts R28b, etc., motor field and ground.

The motor will operate the converter counter for one count and then the counter will stand at 999. The thousands order is now in agreement with storage, so both sides of T–9 will conduct and T–2 will cut off, dropping out relay R115. This closes the R115a contact in the grid circuit to T–4, but T–4 will remain conductive because the right half of T–10 is now cut off, since the "9" that now stands in the hundreds order of the counter will raise the cathode to +50 while the grid stays at +5 volts.

Contacts TL and DL (Fig. 15a) are limiting switches for disabling relays R53 and R54 (Fig. 37) which in turn disable the converter motors M (Figs. 48 and 62) to prevent excessive movement in either direction.

Figure 32:
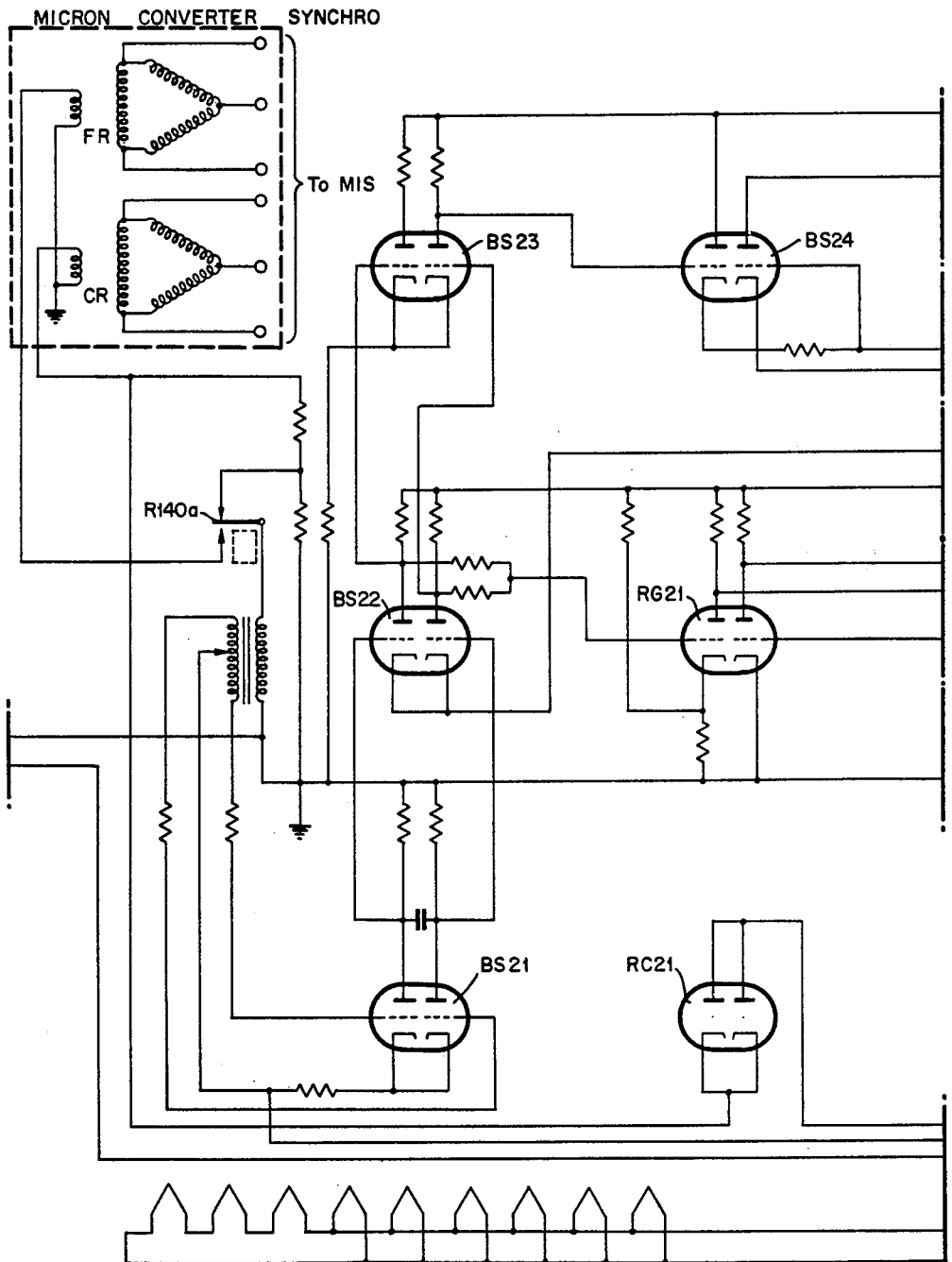
Figure 33:
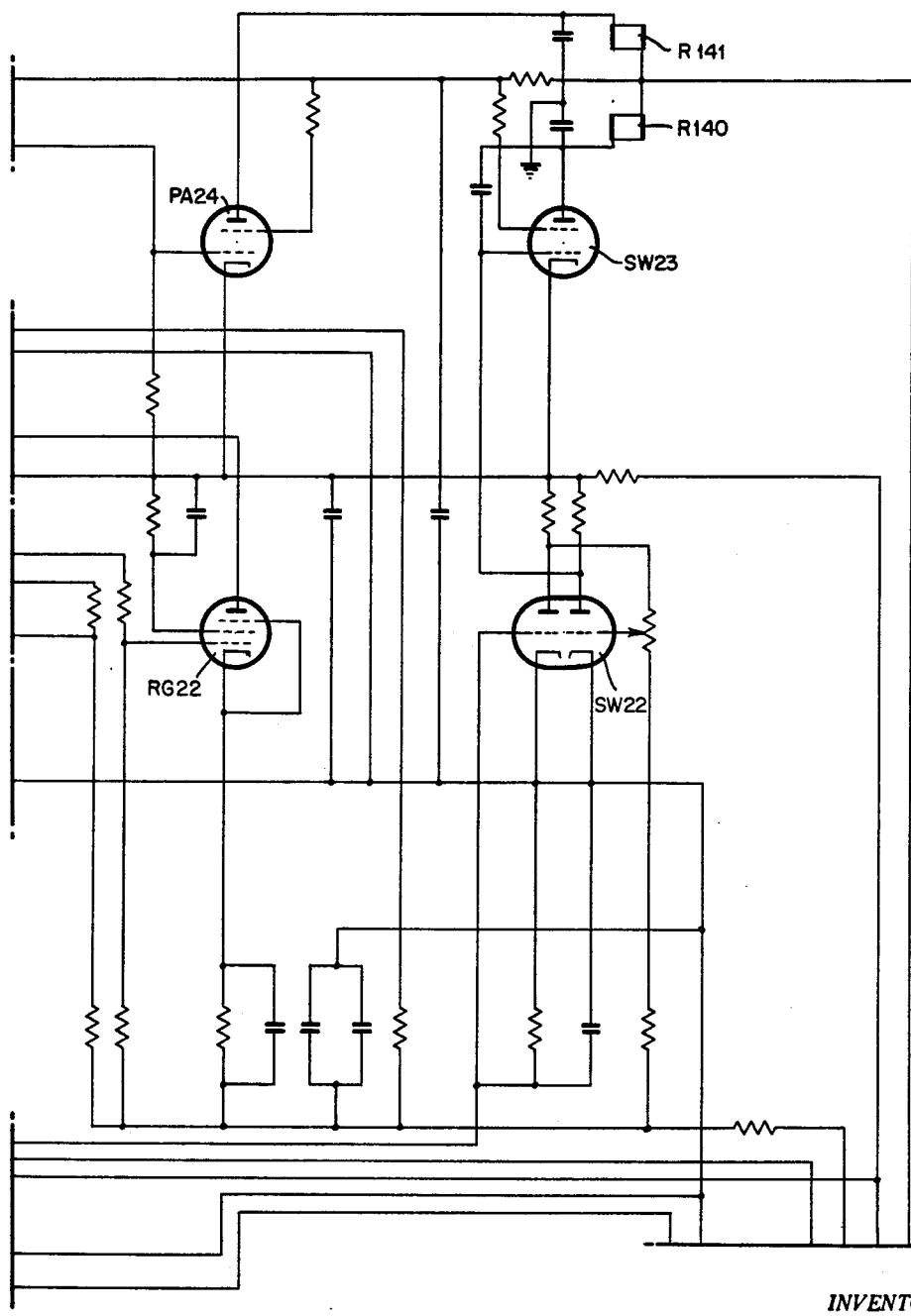

The three converters have three pairs of fine and coarse synchros as noted in connection with the description of the mechanical view (Fig. 15). These pairs of synchros are shown in Figs. 49, 63 and 32, as relating respectively to the horizontal, vertical and micron converters. Each has the characteristic set of six connecting wires for operation and control. They are connected by cable with the machine controlled synchros of MMS, VS and MIS as noted in Fig. 71.

The vertical converter motor M (Fig. 63) in driving the counters into agreement with the storage settings also drive the two sets of synchros FR and CR toward the card data positions and in so doing also drive the machine synchros. As the converter synchros are driven, an error signal therefrom has magnitude dependent on lack of register between the paired rotors. The amplitude of the signal varies and is lowered as agreement is approached and when close to agreement, the potential over a line 413 (Fig. 63) is lowered and a rectified portion through tube RC1 is carried by wire 414 to reduce the bias of the switch tube SW2 and fire tube SW3 which picks up the switch relay R134. The latter then operates its contacts R134a (Fig. 63) to switch the error signal to be derived from the fine synchro FR and through the transformer TR3 and into the first balance switch triode BS1.

The transformer elements are connected to the triode elements and affect the conductive status thereof and also that of connected tubes BS2, BS3 and BS4 which have regulator tubes RG1 and RG2 and a power amplifier PA4 which calls into play the directional control relays R135 and R143 when the error is in a direction calling for an upper or forward drive.

In Fig. 62 it is seen that relays R134 and R135 have contacts for effecting changes in speed and direction, respectively of the vertical drive.

The normal direction of drive is to the right and down when looking at the photographic plate from the front of the machine. Activation of relay R135 and a similar horizontal control relay R138 causes a reversal of drive to carry the measurement controls upward and to the left.

Figure 50:
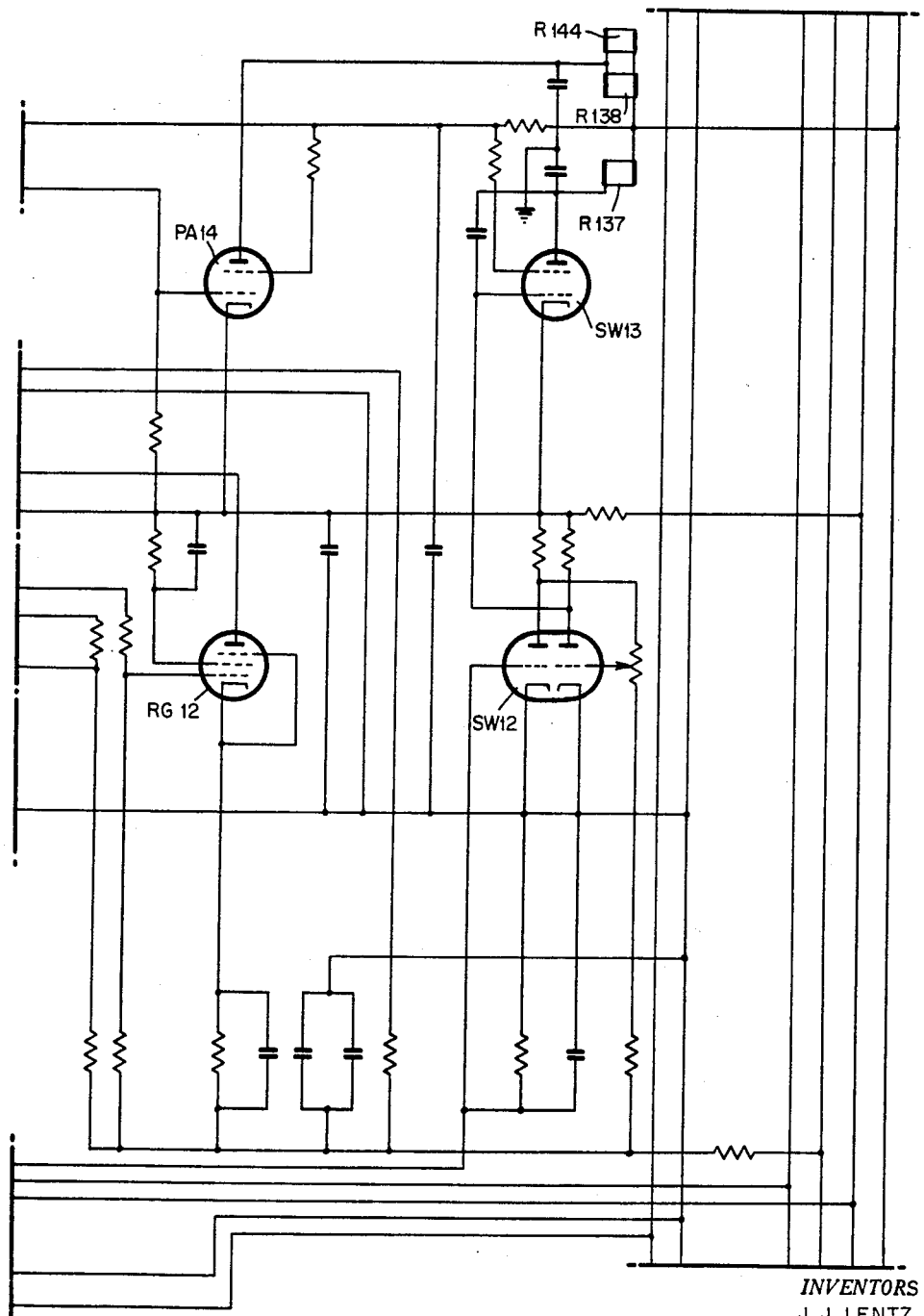

The other two pairs of synchros for horizontal and micron control have similar sets of electronic controls and relays for regulation of speed and direction. Referring to Figs. 49 and 50 and the mm. converter synchros, it is seen that tubes BS11, BS12, BS13 and BS14 correspond to tubes BS1, BS2, etc., of Fig. 63. Similarly, Figs. 32 and 33 with the micron converter synchros has control tubes BS21–BS24 of a like nature and other tubes agreeing in type of control.

The horizontal drive motor HD (Fig. 71) and the vertical drive motor VD are wired to be operated either manually, photoelectrically or under control of the synchros. It is seen in Fig. 71 that in parallel with the vertical drive coils VD are the coils of the image deflector motor ID which are called into action when the photoelectric control is in operation to scan the star image. The switching from VD to ID is done by the program devices.

The horizontal drive motor HD is a two-phase induction motor and comprises two windings HDP and HDS, the former being excited by the variable phase current from the scanning device and the latter having an invariable 60-cycle supply. The other two motors for the vertical control, VD and ID, are constructed in a similar fashion with one or the other operated selectively according to whether the vertical adjustment is being made at times other than during scanning at which time the image deflecting control of motor ID comes into play for small variations. The merging of the phasing control currents is performed through the phasing unit with a pair of Variac units shown at the bottom of Fig. 71.

Figure 37:
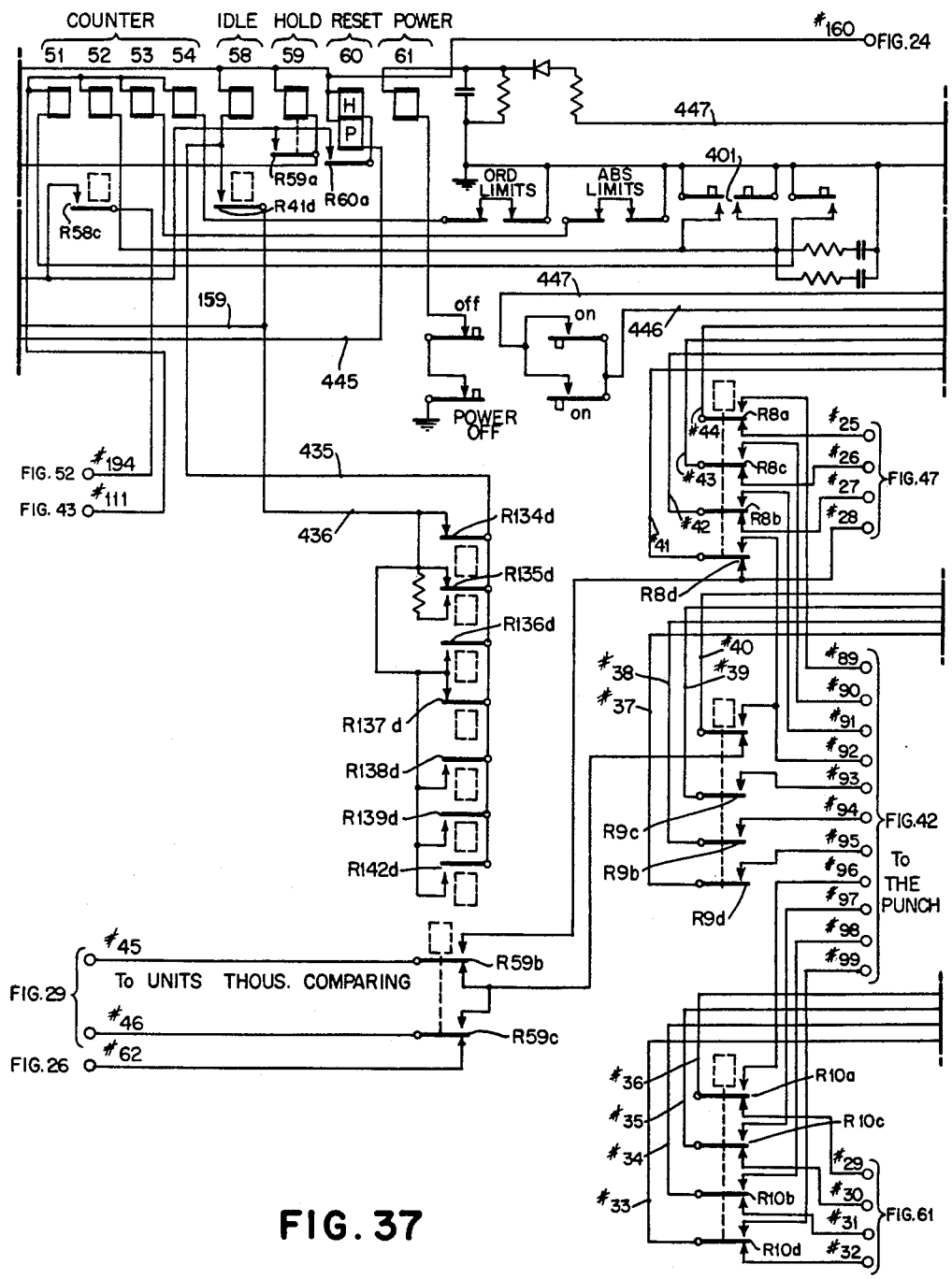

Early in the measurement operation, i.e., when the drive motors are adjusted under control of the synchros which are in turn varied in position to conform with the positions of the converter representing star distance measurements, the drive motors such as HD are driven in one direction or the other according to the influence of the synchros as manifested by operation of a relay such as relay R144, the operation of which is described hereinbefore in connection with the electronic controls of Fig. 50 associated with the synchros related to the converter. The drive control contacts of R144 are at the lower left of Fig. 57. In a similar fashion, the two windings of the vertical control drive motor VD are affected by the operation of relay R143 (Fig. 64) as controlled from the vertical converter synchros and contacts of R143 at the upper left of Fig. 57. These two drive motors operate to shift the carriage and the plate holder until conformity is reached with the measurement figures derived from the card. When a stable condition is reached, a series of relays controlled by the various synchros operate a number of contacts arranged in parallel as shown in Fig. 37 and controlling over the relay R58. The last-mentioned relay has control over a number of program relays shown in Fig. 35 where it is seen that relays R19—R22 are related to the driving condition of the machine. When relay R58 is effective, a number of relays are called into operation in a sequence of controls which eventually causes the breakdown of relay R20. The contacts of relay R20 are shown in the upper right-hand corner of Fig. 57 where they normally connect lines to the driving motors. When the contacts open to interrupt such control, the motors are stopped and made ready for manual control by the directional operating keys on the keyboard associated with the indicating console. The operator has before her the reflection of the star image against an intersecting arrangement of lines showing the displacement away from a normal centralized position.

Figure 36:
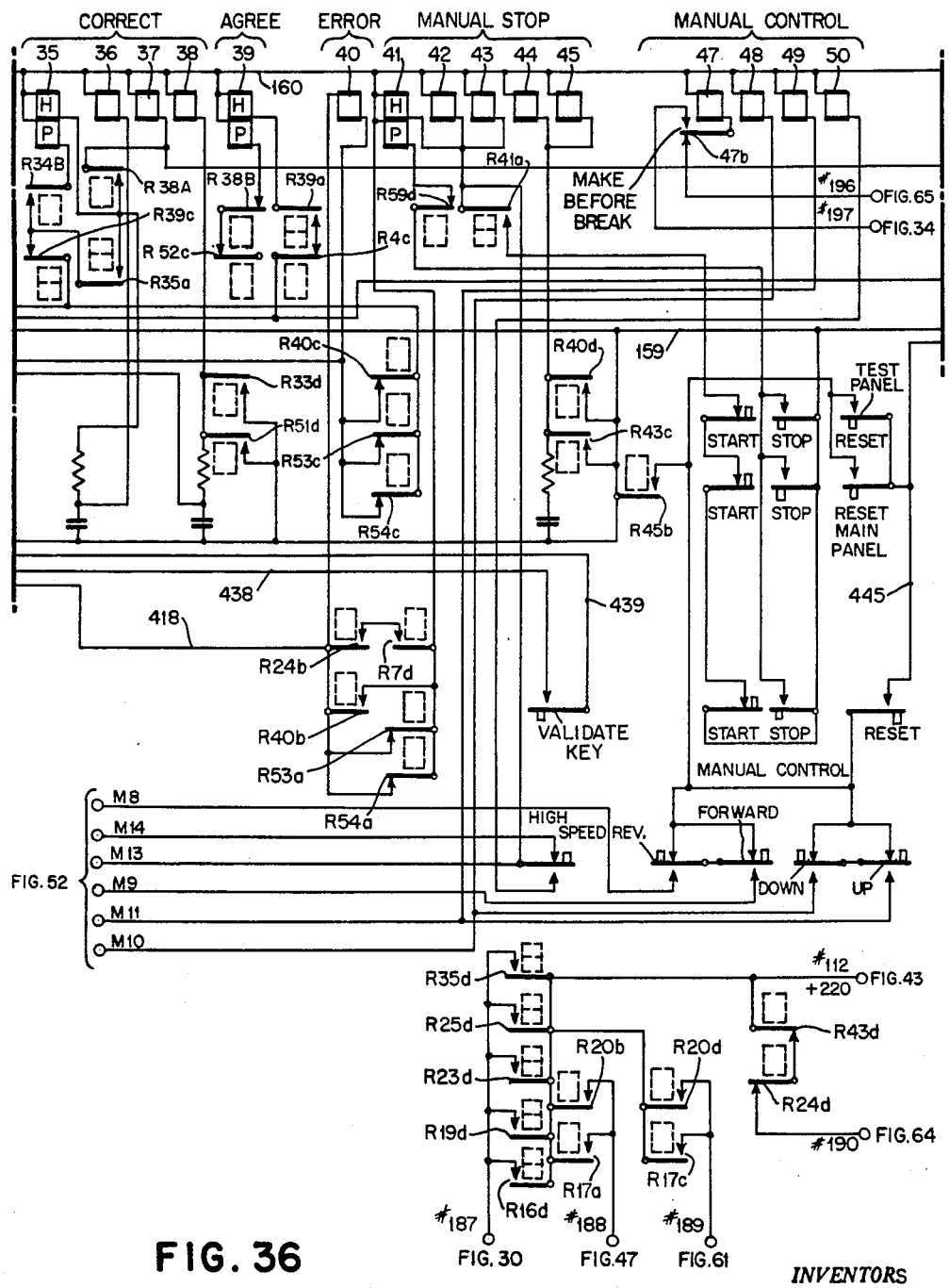
Figure 51:
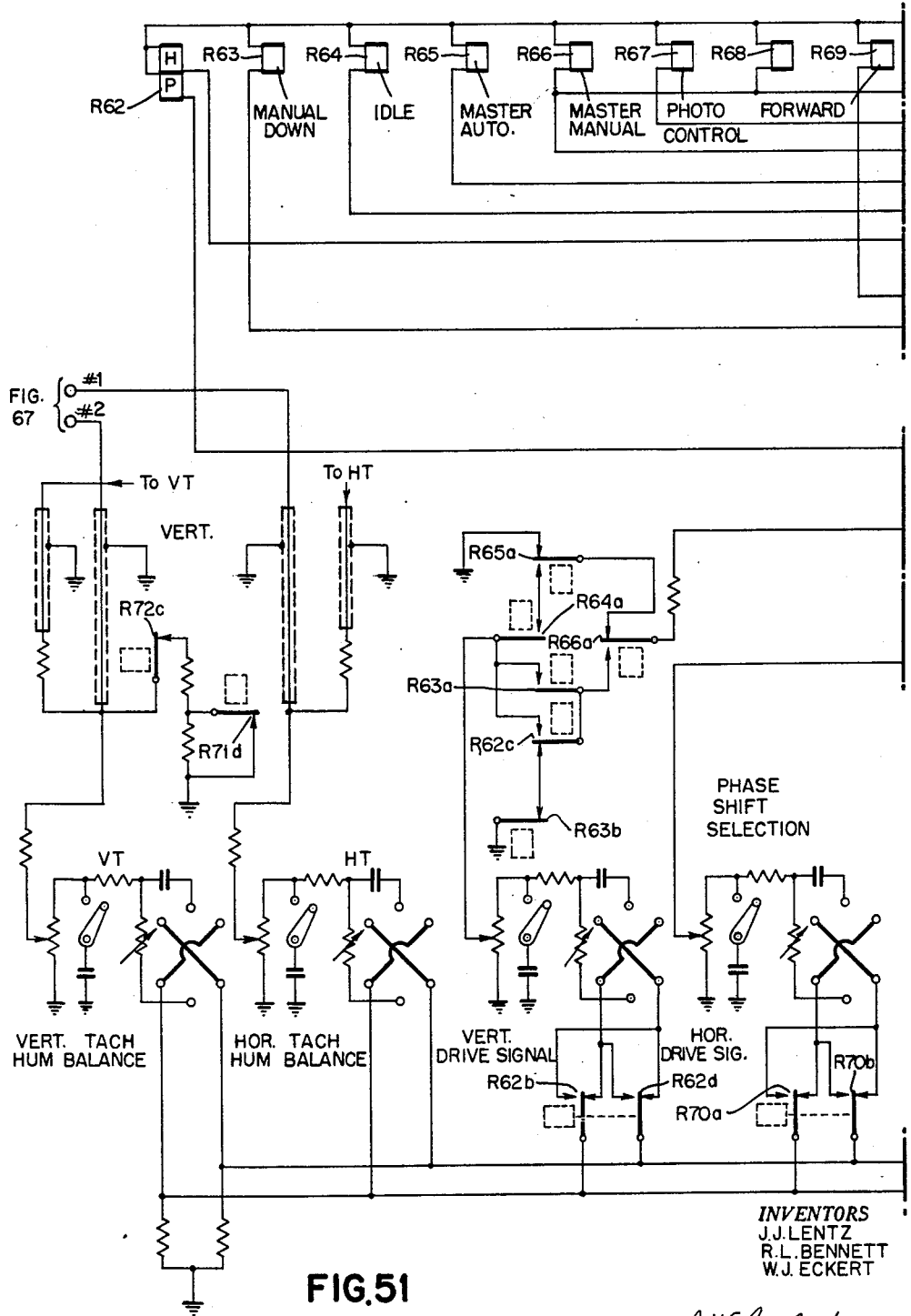
Figure 52:
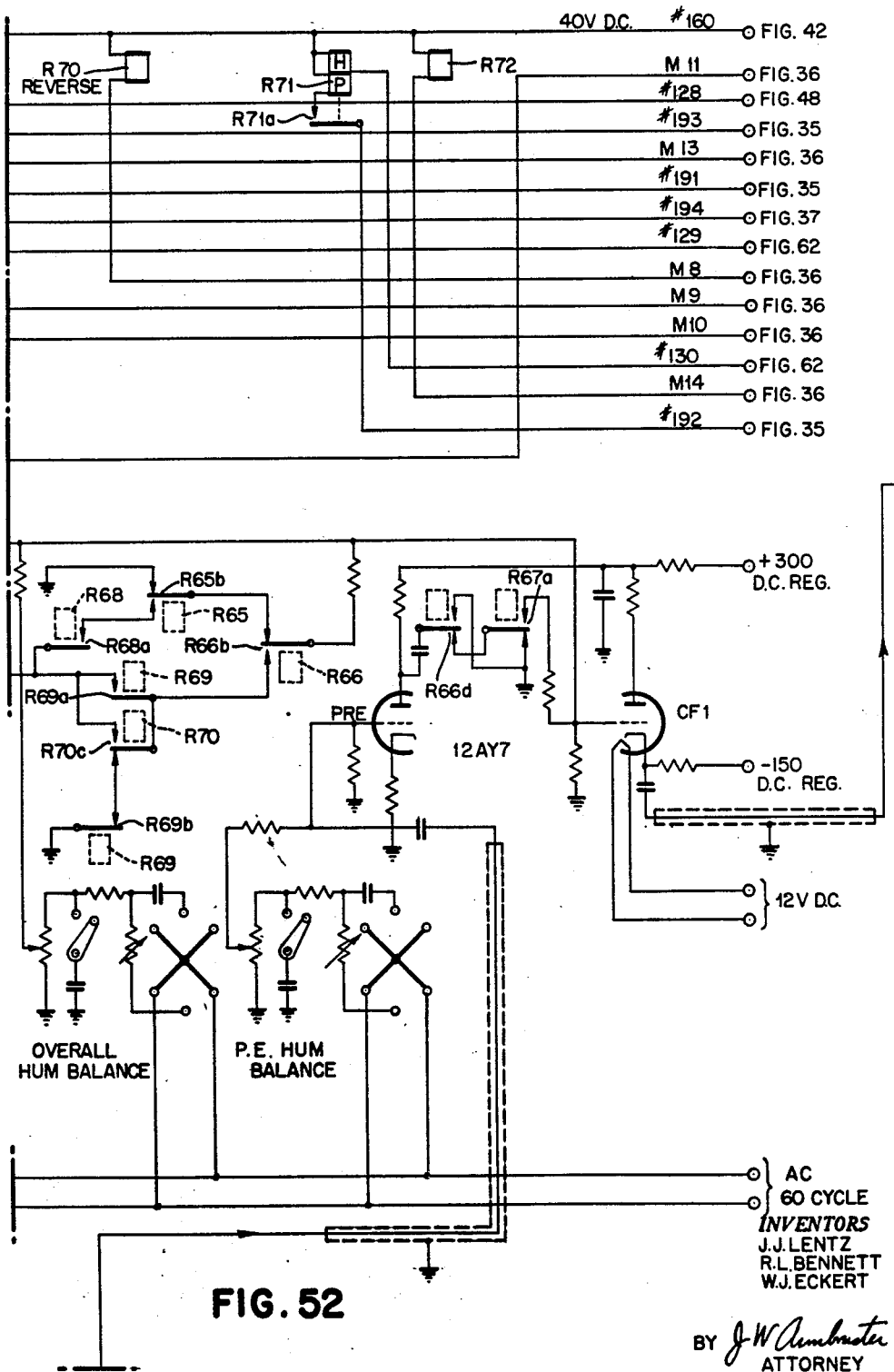
Figure 53:
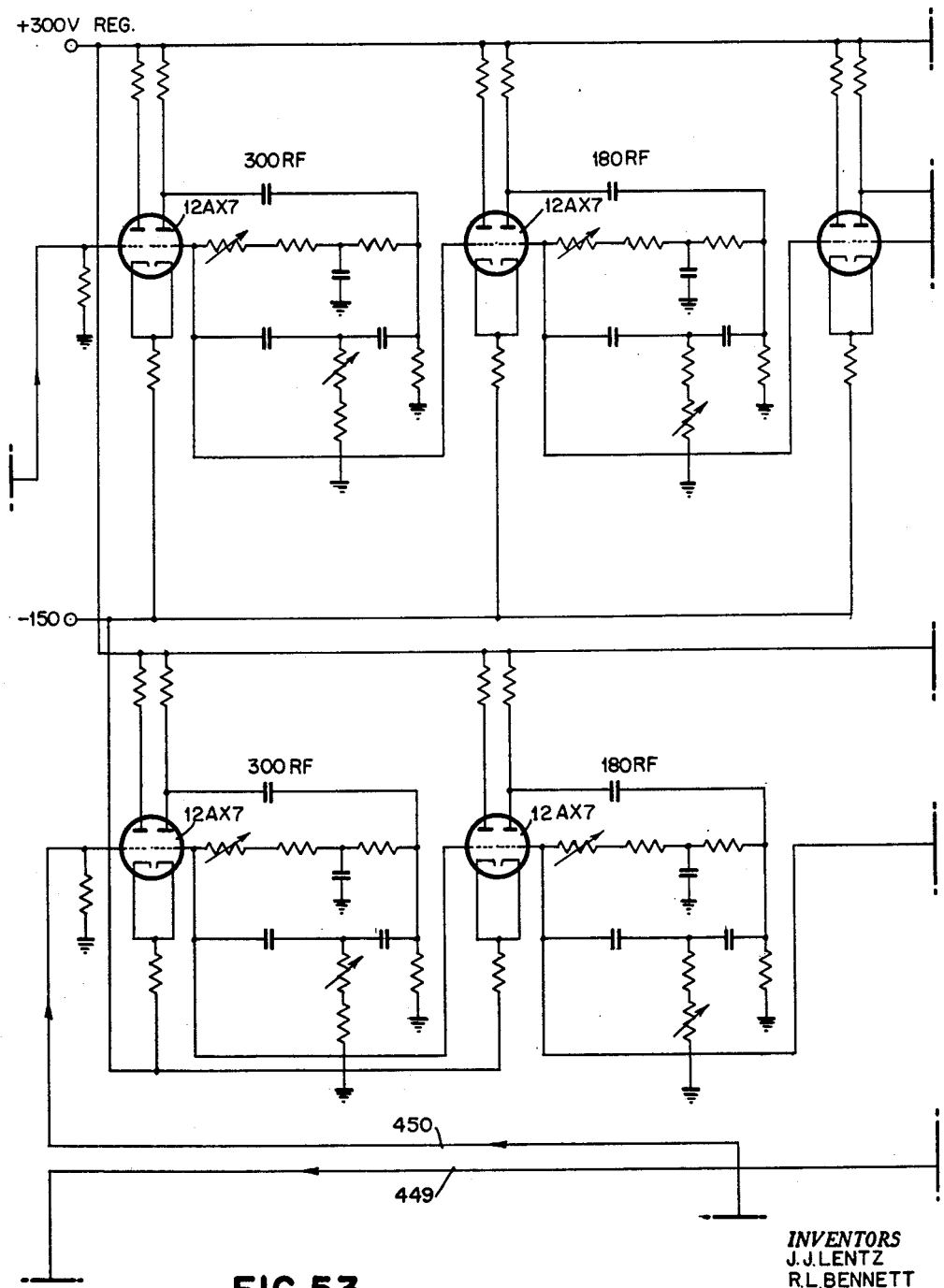
Figure 54:
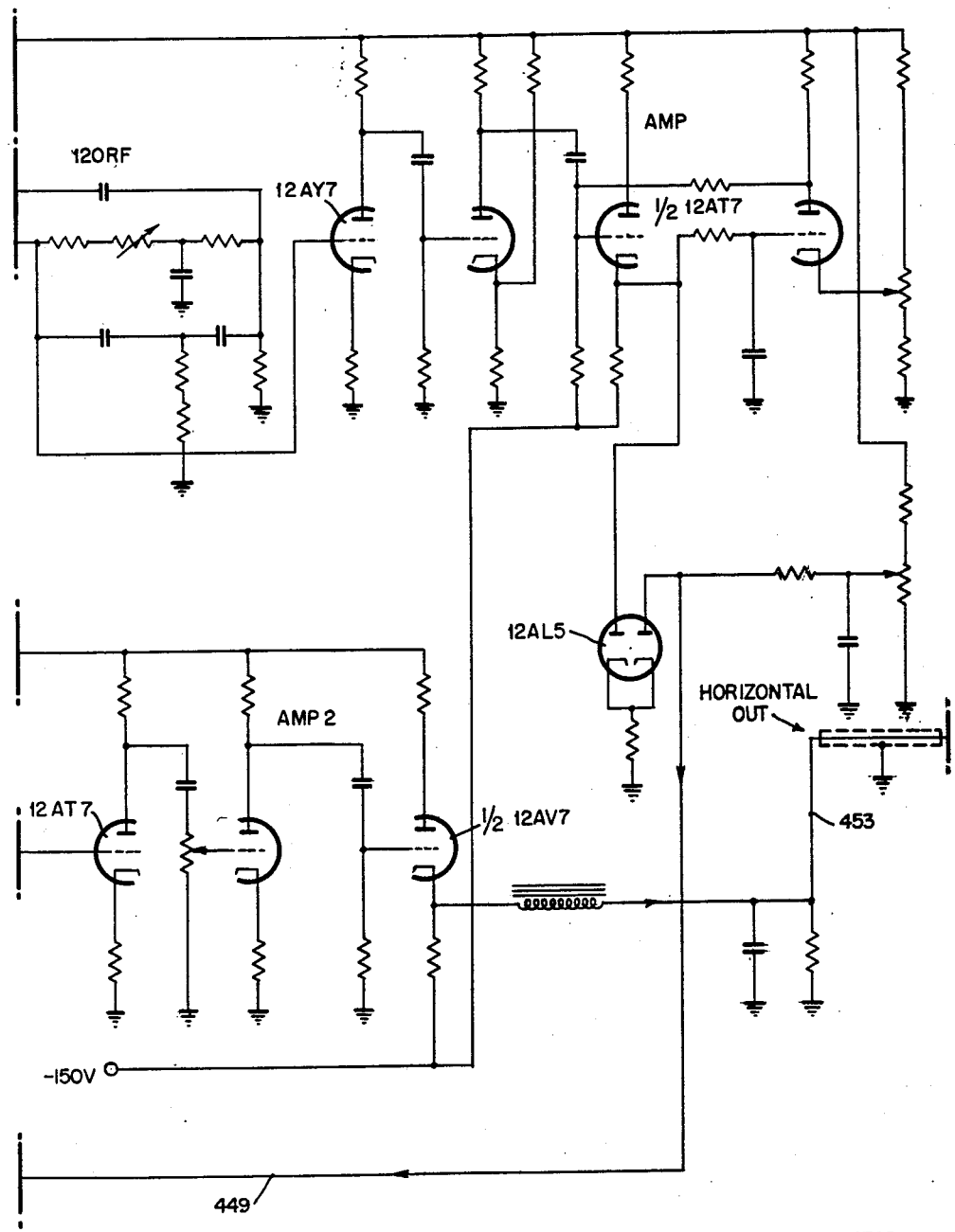
Figure 55:
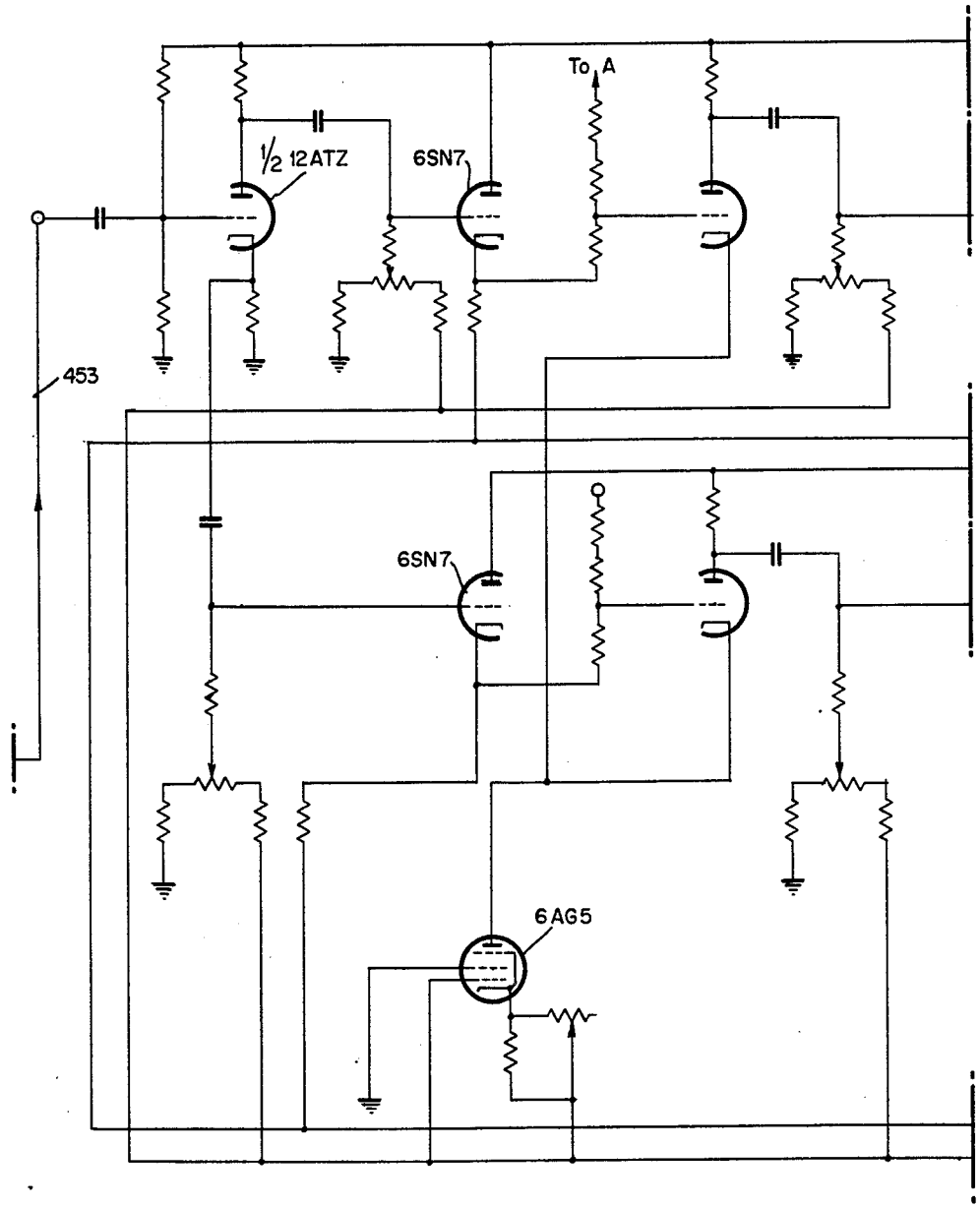
Figure 56:
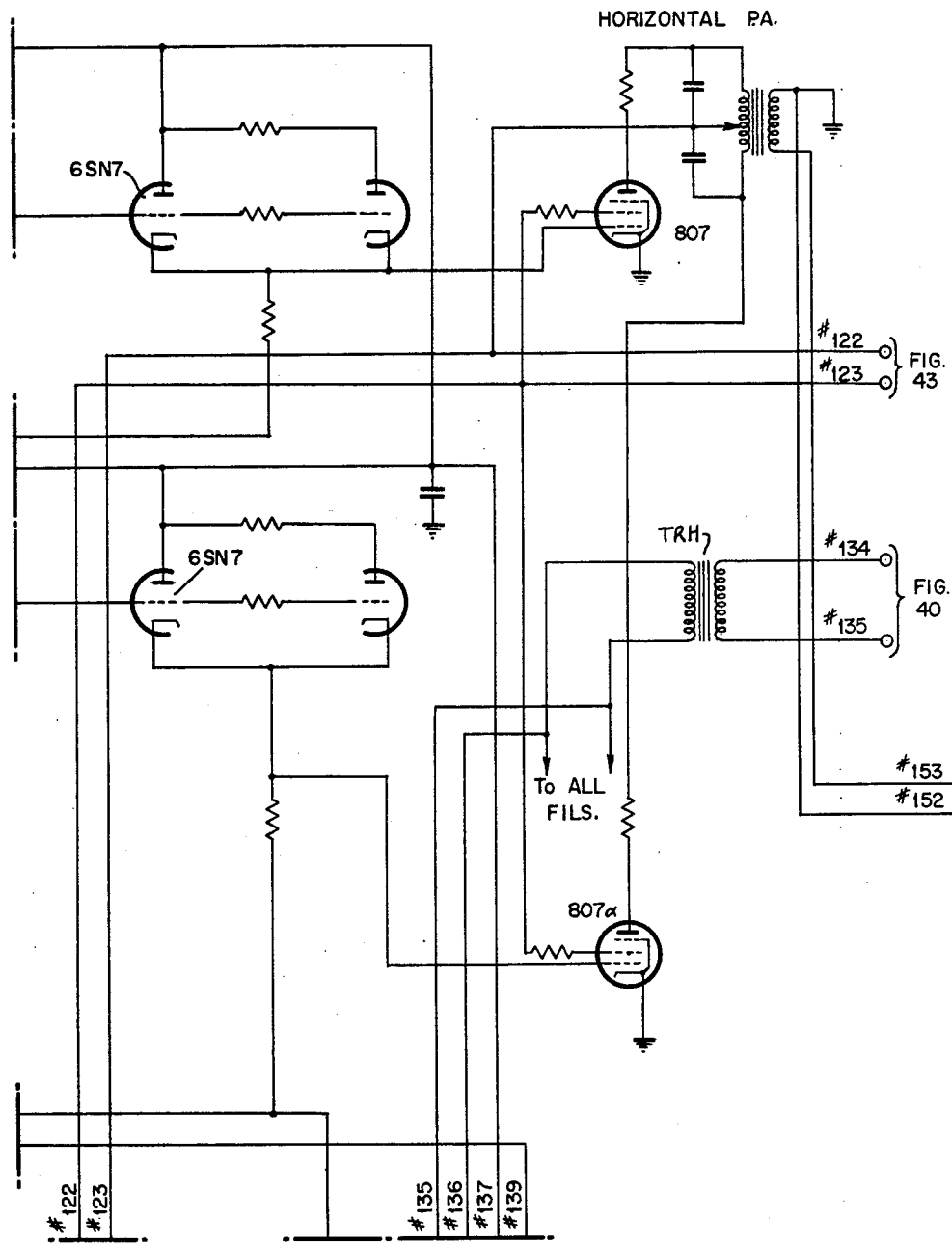

When the operator depresses a manual control such as the reverse horizontal movement key shown in Fig. 36, then a circuit is directed through the line M8 (Fig. 52) and the reverse control relay R70 is picked up. It is shown at the bottom of Fig. 51 that this last-mentioned relay has contacts associated with the phase shift selection controls for varying the signal put into the horizontal drive controls through the electronic devices later described in connection with the photoelectric controls. The manual drive control circuit includes the contacts R70c (Fig. 52) and the contacts of relay R66 which are closed prior to the selection of the reverse operation by the operation of a relay R40 which is made effective by the operation of the manual stop control key prior to the operation of the reverse control key. The circuit for the manual drive control is continued from relay contacts R66b (Fig. 52) through the cathode follower CF1 also shown in Fig. 52 and the output of which is impressed upon the tube shown at the upper left corner of Fig. 53. The latter is part of the three filters and amplifier extending across the tops of Figs. 53 and 54 and leading down into the circuits of photoelectric signal later generated through the scanning of light directed around the star image. In either event, the horizontal power amplifier PA shown at the top of Fig. 56 produces a signal directed through lines 152 and 153 which pass through contacts of relay R20 (top of Fig. 57) and are carried down through lines and into the primary winding HDP of the horizontal drive motor HD. The exciting voltages applied to the second windings of the motor are phased so that the vertical error signals are ignored but a torque is developed tending to drive the lead screw in such a direction as to reduce deviation from the 90° interval as shown at the lower right of Fig. 71.

Should a manual vertical control be exercised, a somewhat similar train of connections are established to the vertical phase shift selection devices shown to be controlled by relay R62 at the bottom of Fig. 51. This control is also carried over into the cathode follower CF1 shown in Fig. 52. The manual control signal is carried across the upper sections of the two Figures 53 and 54 and then down along the right side of Fig. 54 and under the two figures and into the cathode follower CF2 shown at the upper left-hand corner of Fig. 67. There the horizontal component is directed upwardly while the one being considered at present is directed downwardly through the filter shown at the lower right-hand corner. The manual vertical control signal is carried along through the electronic controls shown in Figs. 68, 69 and 70 and appears at the upper right-hand corner of the last-mentioned figure at the vertical power amplifier PA. The signal is directed through wires 154 and 155, and these wires are connected to the contacts of relay R20b at the upper right-hand corner of Fig. 57 where they are connected to the normally closed sides of the contacts. The circuit continues down through the lines and leading to the primary coil VDP of the vertical drive motor VD.

Figure 57:
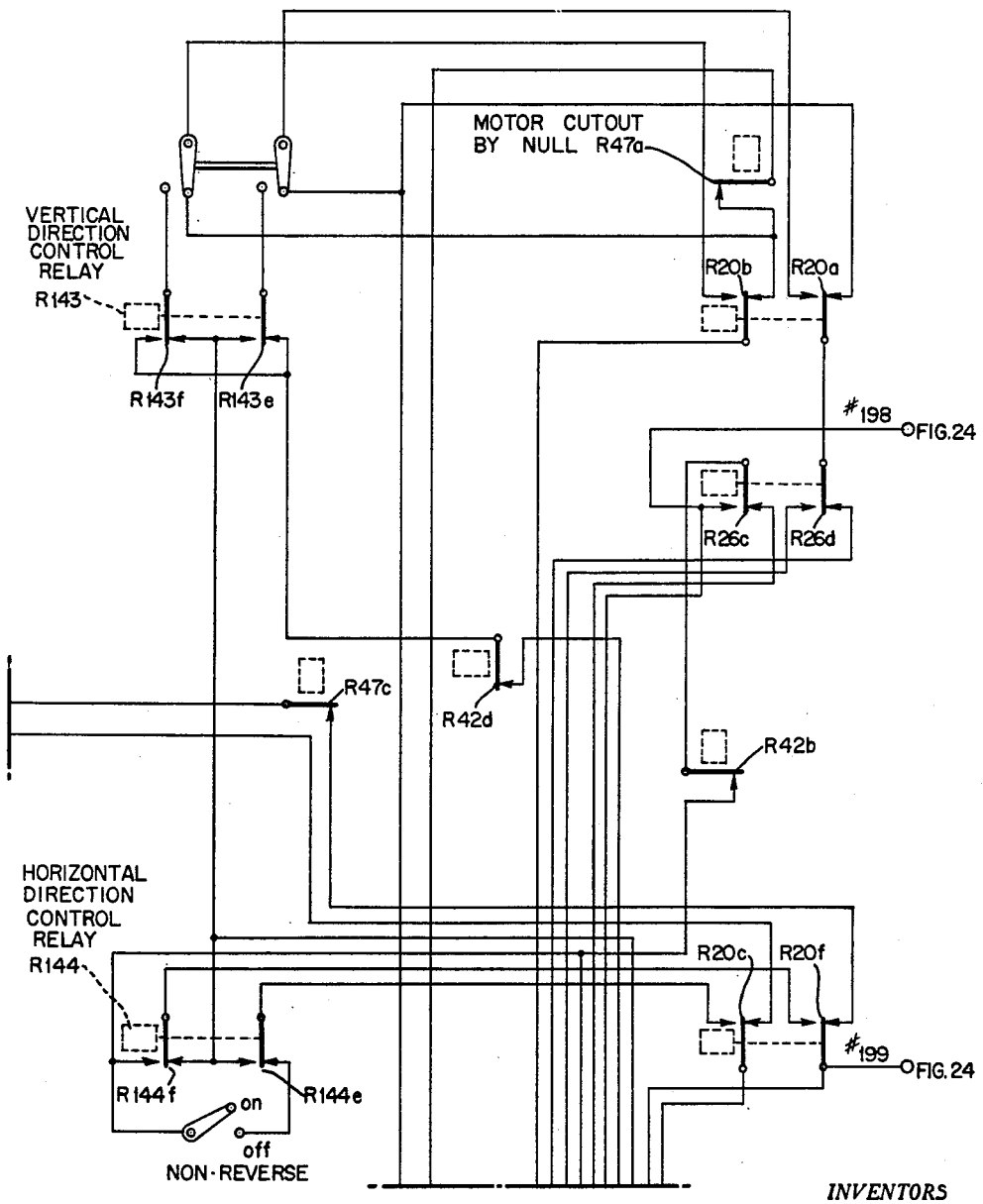
Figure 58:
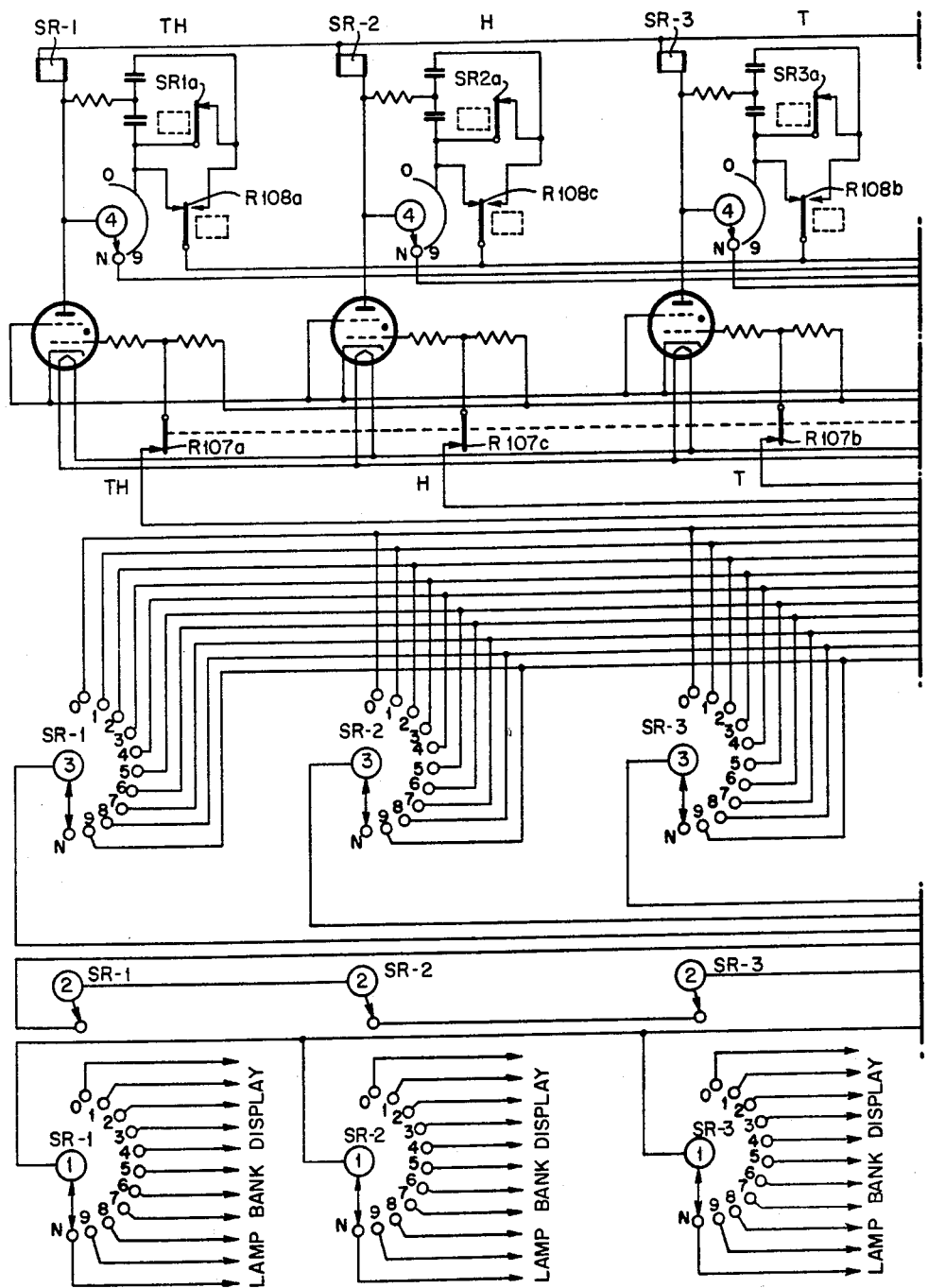
Figure 59:
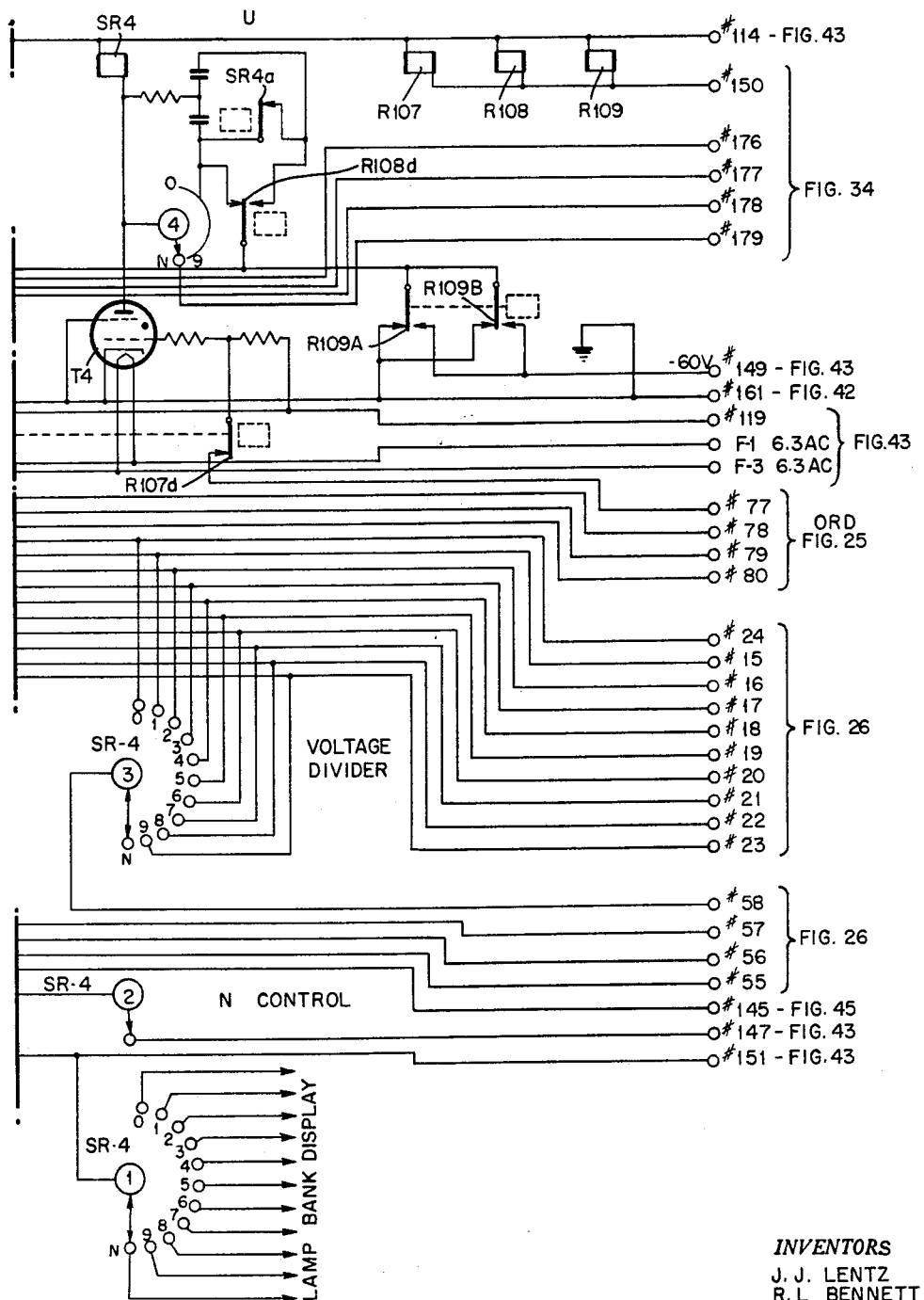
Figure 60:
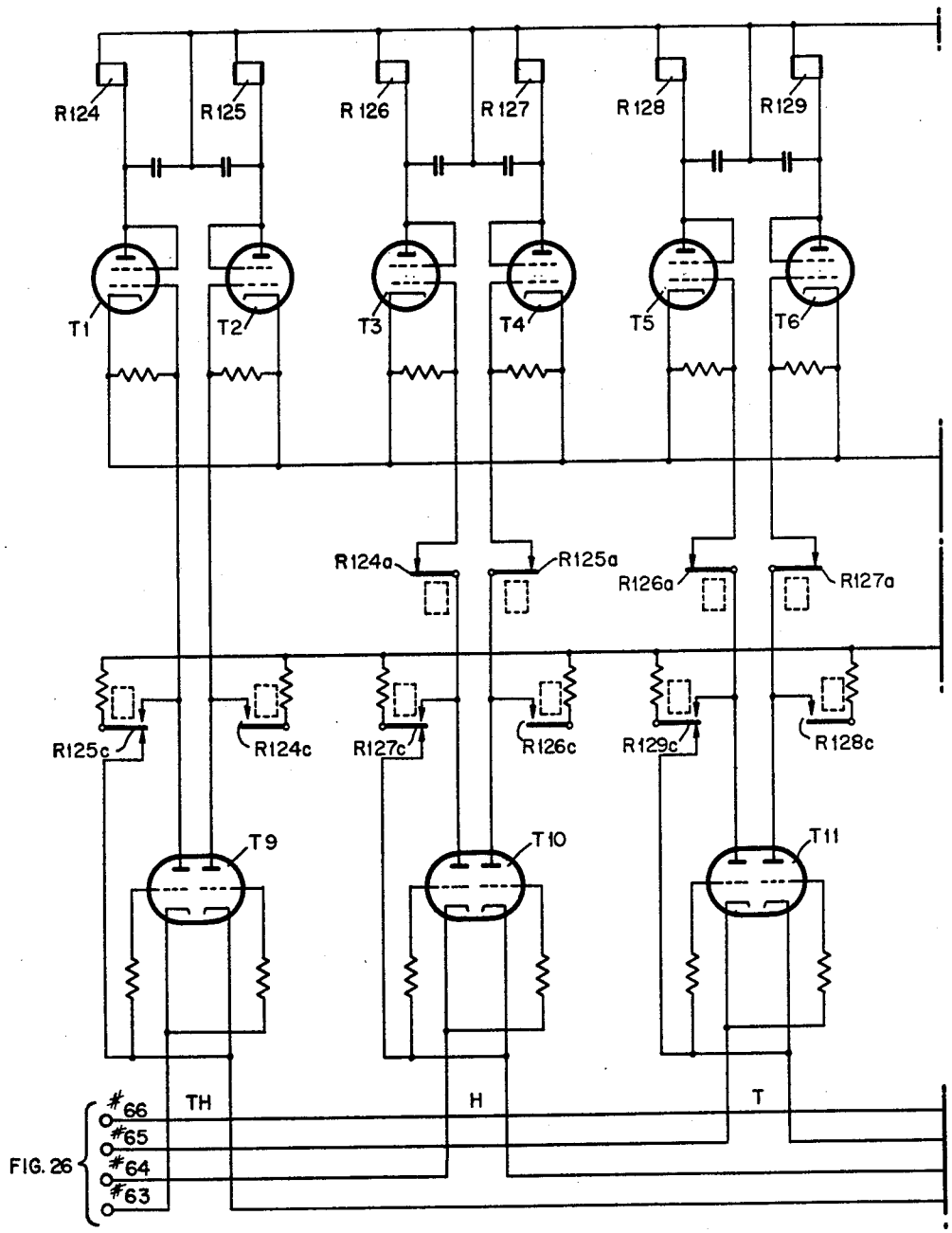

When the manual adjustment control has been completed, the operator depresses a validate key and a start control key, the former serving to pick up a relay R26, the contacts of which are shown at the right in Fig. 57. These contacts serve to change the circuit connections so that the drive motors are arranged to be controlled by the signals generated through the photoelectric scanning devices and impressed upon the primary windings of the drive motors. It is at this time also that the control over the vertical drive motor is switched to control over the image deflector motor ID for rocking the glass-plate deflector vertically in the path of the scanned image to shift it slight amounts either upward or downward according to the signal derived from a scanning means.

In Fig. 71 it is seen that limit switches are in series with the primary windings of the two main drive motors and these limit switches may be overcome by key control if it is desired to extend the measuring range outside the normal scanned area of the photographic plate.

The horizontal tachometer HT (Fig. 51) is normally held removed from cooperating with the spinning wheel of the horizontal drive motor HD. However, when the scanned image is truly centered, it is desired to regulate and moderate the last movement of the horizontal drive, and it is at this time that the solenoid SD is energized to rock the tachometer and cause its drive wheel to come into contact with the revolving wheel of the drive motor. It is at this time that the number of hunting operations are limited to five swings of the horizontal carriage and this is ascertained by operating a counter by means of pulses created by the successive operation of the carriage.

Of the two tachometers VT and HT, the latter presents the greater complications because it is made operable selectively under solenoid control as mentioned before. Tachometer HT (Fig. 51) is seen to be wired through line No. 1 and an amplifier (Fig. 67) to the resistance mixer RM1 which has effect over the electronic power amplifier horizontal PA (Fig. 56) leading to the horizontal drive motor HD (Fig. 71). The control of HT is not used for the preliminary setting of the horizontal controls by the car, but it is only after the photoelectric controls come into play and near the end of the automatic adjustment that the HT is called into operation to moderate the horizontal swings. Solenoid SD (Fig. 24) is called into operation after five oscillations of horizontal carriage as governed by the counter shown in the same figure. When signals of the forward drive phase over lines 198, 199 (Figs. 57 and 24) are applied to the network, the total voltage across the lines will be 230 volts, which is sufficient to pick up the impulsing relay R88 (Fig. 24). A reverse drive signal presents an in-phase input to the circuit; no voltage appears across the terminals and the relay R88 drops. Forward and reverse signals continue until a selected number of impulses are delivered to the counter to cause it to operate solenoid SD and the tachometer clutch.

Relays R25 and R26 are part of the program controls which operate associated contacts (Fig. 24) only during photoelectric scanning and thus prepare for counting control. A series of count relays R86, R85, etc., are picked up successively and at a selected time, call a relay R87 into operation to pick up relay R55 which in turn activates the solenoid SD.

The vertical control of tachometer VT (Fig. 51) is applied directly and continuously to the resistance mixer RM2 (Fig. 67) at terminal No. 2.

Although in Figs. 20a and 20b only six switch positions are shown, there are a number of other sequence step settings which are omitted from the diagrammatic showing for the purpose of simplification. The omitted steps involve resetting, checking, stopping, error detecting, etc. Now it is intended to describe all sequence switch controls with reference to the wiring diagram and particularly that portion in Figs. 34–37 showing the relays R1–R61 which are picked up singly or in groups successively to close related contacts and call into operation different parts of the measuring device.

The first group of relays to be considered are the reset relays R1 and R2 which are energized automatically at the end of a programming cycle. When the storage counters and the optical part of the measuring device are in agreement, the relay R39 will be energized as part of the controls following the establishment of a correct condition. The closure of associated contacts R39c completes a circuit as follows: From the power supply common to the punch of Fig. 42, terminal No. 160 (Fig. 34) the pickup coil of relay R1, contacts R39d, contacts R45d normally closed, contacts R3c and terminal No. 159. In the following section of the circuit description, these terminals No. 160 and No. 159 will be considered as the power supply terminals.

Relay R1 is held energized through terminal 160, the holding coil, R1a, contacts R3c (normally closed) and terminal No. 159. Relay R2 is picked up and held through the same circuit.

The operation of relay R1 causes the normally closed contacts R1c to open and deenergizes several of the programming relays which are energized at the time. It will be noted that the reset relays, the read-in and punch-out relays, agree relays, manual stop relays, hold relay and manual reset relay will not be affected by the opening of this point because the holding circuits of these relays are not dependent upon relay R1.

The contacts R1b close and light the reset indication lamp by a circuit including terminal 116 (Fig. 34), the intensity control IC, contacts R1b (Fig. 35), the reset lamp RL and a connection to ground. The normally closed contacts R2a open the circuits to the lamps during resetting. Other of the contacts of relay R2, namely, R2c, are in the pickup circuit to the relays for the second sequence stage for the read-in and punch-out operation.

A third pair of relay points R2b (Fig. 34) complete a circuit to energize the reset relays in the counter storage devices as follows: the +60 v. supply terminal No. 114 (Fig. 28), the storage unit relays R101–R103, terminal No. 150, to same Fig. 34, contacts R2b and terminal No. 115. All other counter storage units will be reset by the same kind of circuit.

A fourth set of contacts R2d operate to break the circuit that shunts the intensity control so that illumination of the lamps remains constant with the lamp bank load removed.

The second sequence step of operations involved in measuring requires the operation of a series of read-in and punch-out relays R3–R10 with contacts interposed between the card-reading and reproducing devices and the storage counters of the measuring device. A relay R3 will be picked up when resetting is completed by a circuit involving line No. 160, the pickup coil of relay R3, contacts R2c, line 142 (Fig. 28), wire 415 (Fig. 27), the second or single position emitter of the thousands counter order and wire 416, etc., to line 144 (Fig. 45), and similarly through the MM counter to line 145 (Fig. 59), and through the vertical position storage counter to No. 147 (Fig. 34), contacts R44a and R11c (closed), and terminal No. 159 and the other side of the line. It is evident that the failure of any one of the storage counter relays to be reset will prevent the energization of relay R3. Relays R3 and R4 will be held through line 160, holding coils R3 and R4 in parallel, contacts R3a, contacts R11c (normally closed) and line No. 159.

During an automatic reset operation, relays R5–R10 will be energized through line 160, the relays in parallel, contacts R60c, R3a, R11c and line 159. When resetting is controlled manually, other of the relays are called into operation as pointed out hereinafter in connection with manual controls.

The normally closed contacts R3c de-energize the reset relays by opening both the pickup and hold circuits.

The contacts R3b (Fig. 35) close to light the read indication lamp. Meanwhile, the reset lamp is extinguished as a result of the open contacts R1b operated when relay R1 is de-energized.

The contacts R3d (Fig. 34) are in the pickup circuit of relay R11 and are considered hereinafter in connection with the third set of sequence controls involving the check relays.

Although the numbers punched in a card at the second station of the card reader and reproducer is related to a previous set of operations, it is performed at the same time as the reading cycle associated with the second card. In other words, while an accurate measurement is being perforated relative to one star measurement, the relatively coarse measurements of a second star measurement are being read off a second card. Therefore, it will be understood that although the read-in and punch-out operations are considered here concurrently, they relate to altogether different star measurements. They are considered together because they happen at the same time and control the same unit of mechanism. The contacts R4a (Fig. 34) close to start the operation of the punch-over connections involving the 40 volt source at line 160 (Fig. 42), punch relay PR10, contacts PR6c (shifted), line 158 (Fig. 34), contacts R4a. Line 159 (Fig. 42) and the P5 contact will sustain relay R10 through contacts R10a until the end of the punching cycle.

The normally closed contacts R4c are in the holding circuit for the agreeing relay R39 and drops out this sequence control when they are opened. The normally closed contacts R4b open the circuit to the lamp bank emitters and the normally closed contacts R4c open the shunt around the intensity control in order to maintain the level of illumination constant.

When the reproducer is started, circuits are completed through the card sequencing brushes to set up the counter storage relays to the reading of the star measurement figures in millimeters and tenths of a millimeter. In addition thereto, whenever an automatic reset condition occurs, relays R5 to R10 are energized and counter read-out circuits are completed through transfer points R5a, R5b, etc., R6a and R7a, etc., and they shift the counter emitter connections from the voltage divider and storage emitter positions (posts 67—76, Fig. 38) to the punch interlock connections (posts 89—99, Figs. 37 and 42). Thus, the storage counter emitter segments will be connected to the punch emitter segments.

Relay contacts R8a, R9a and R10a, etc., shift the counter emitter rotors from the comparing circuits to the punch positions 1 to 11. Of these 11, 7 are for the horizontal measurement and 4 are for the vertical measurement. It is evident that three positions of the micron counter have no connection with the comparing conditions. It is also noted that the thousands order connection to the punch position 4 is in common with the units connection of the horizontal millimeter counter.

An example may be taken to perforate a "2" from the vertical counter in units position and into the 11 column of punch positions. The circuit may be followed from the 40-volt source through line 160 (Fig. 42), the master switch, contacts PR14b, the punch magnet PM connected by plug wire to position number 99 (Fig. 37), relay contacts R10d, the units order vertical counter, the "2" segment of the counter, post 2, relay contacts R5c, post 101 (Fig. 25), the emitter brush at 2 and contacts 2b, circuit breakers CB3 and 4 (Fig. 42), cam contacts 1 and 2 and the line 159.

The contacts R7d (Fig. 36) are used as an interlock to pick up relay R40 in connection with error control. During manual reset operation, relays R5–R10 are not picked up because contacts R16c are then opened so that punch control is suspended during manual operation.

A number of check relays R11–R15 are called into play as a third step of program. At the end of the punch cycle, a circuit will be completed as follows: line 160 (Fig. 34), relay 11 pickup coil, contacts R3d (closed), line 155 interlock connection to punch, P–14 cam contact, line 156 (Fig. 34), contacts R50c, contacts R1c and line 159.

The R11a points will hold up relay R11 and pick up relays R12–14.

The R11c points will open and drop out relays R3–10.

The R11b points will light the "check" light on the main and auxiliary panels.

The R11d points close and complete a circuit to relay 15 as follows: line 160, relay R15 coil, R11d, R51c (these points will be closed if the micron counter detent is out as an indication that the air supply is on), Fig. 36 and the + side of 1500 mfd. electrolytic capacitor, 270R resistor, R51d (closed), − side of 1500 mfd. capacitor and line 159. It will be observed that if there is a + charge on the capacitor, it must first bleed off through the 270R resistor to lower the capacitor potential to a point where there is enough voltage across relay R15 to pick it up. Thus, an interval of about ½ second must elapse after the R51 relay picks up before R15 can be energized. This assures that all check relays will be up and the error detection will have operated for sufficient time to get the error relay up, if an error is present.

During the time that relays R12–14 are up, circuits will be completed to check the storage units to see that all orders have information stored in them. If any storage relay is left on "N," there will be a circuit to the "12" pin of the A to D connectors as follows: line 114 (Fig. 28), coil SR1 (Fig. 27) of the fourth rotor and on "N" spot, wire 417 to line 168 (Fig. 28) and to the lamp bank plugs (Fig. 34) and wire 418. Only those connectors that are plugged to the lamp bank will be checked so that if any position of storage is to be unused, it is merely disconnected and no checking will result. If an order that is plugged to the lamp bank contains no digital setup, a circuit will be completed, as noted above, from line 114 to one of the lamp bank terminals, thence through one of the closed points of relays R12–14 and wire 418 (Fig. 36) to error relay R40. This will require a manual reset to restore programming.

If all positions check, programming will advance when relay R15 picks up.

A set of three relays are provided R16–R18 (Fig. 35) to determine comparative values of digits in storage and values in the converter commutators. When R15b points close, a circuit is completed to pick up relay R16. The holding circuit for relay R16 and pickup for relay R17 is through contacts R16a and other normally closed points.

The normally closed R16c (Fig. 34) points open and drop out relays R11–14. When relay R11 drops so does relay R15 because the normally open R11d points are in the relay R15 coil circuit.

The R16b points close to complete the circuit to the compare lights.

The R16d points (Fig. 36) close to complete a circuit from line 112 and R16d points to line 187 (Figs. 29 and 30) of the units-thousands comparing unit.

Note that all comparing units are called into service by the application of +220 v. to the respective No. 187, 188 and 189 terminals.

The R17a and R17c contacts (Fig. 36) are used to call in the abscissa comparing and ordinate comparing respectively.

Figure 30:
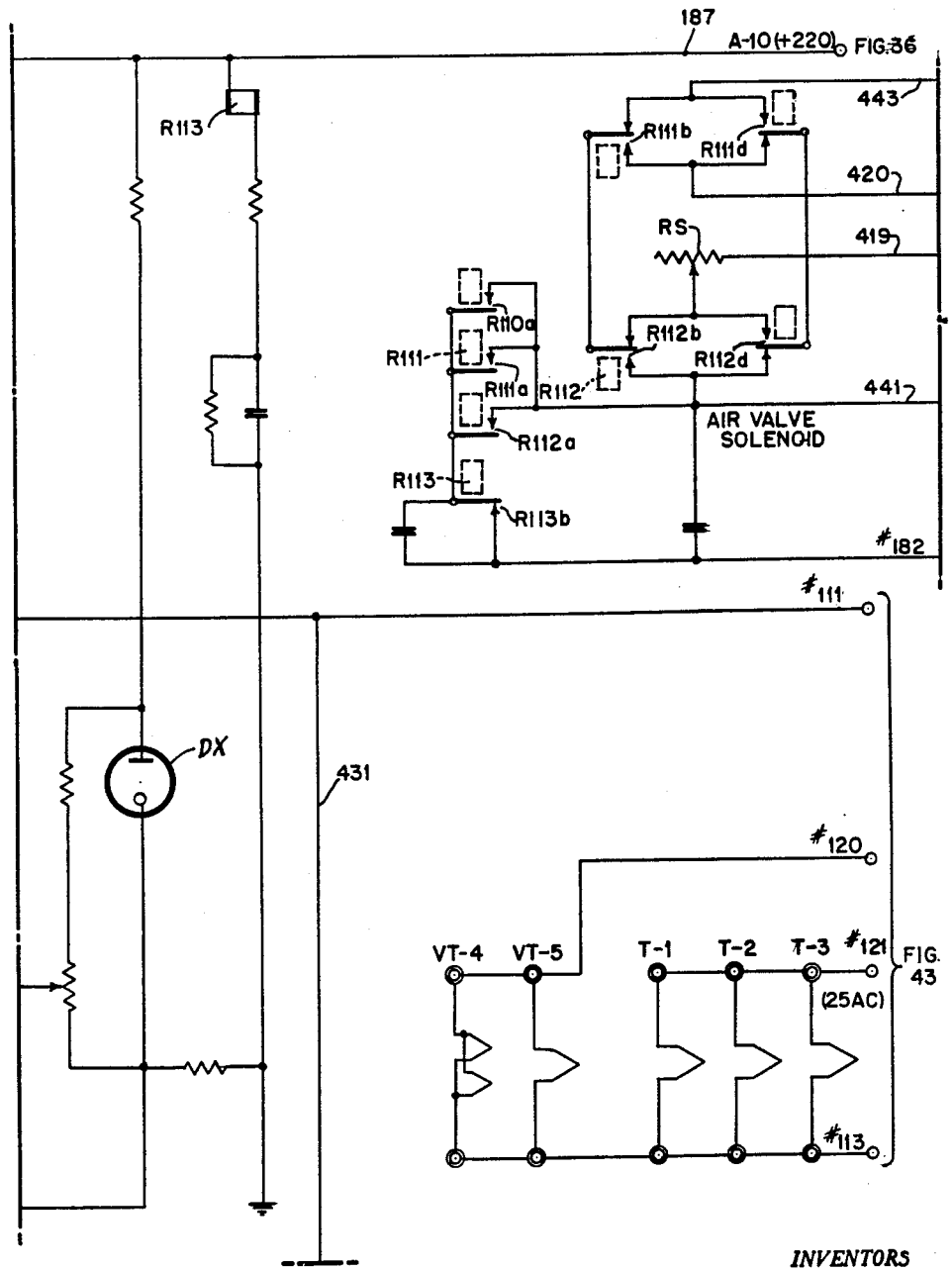
Figure 31:
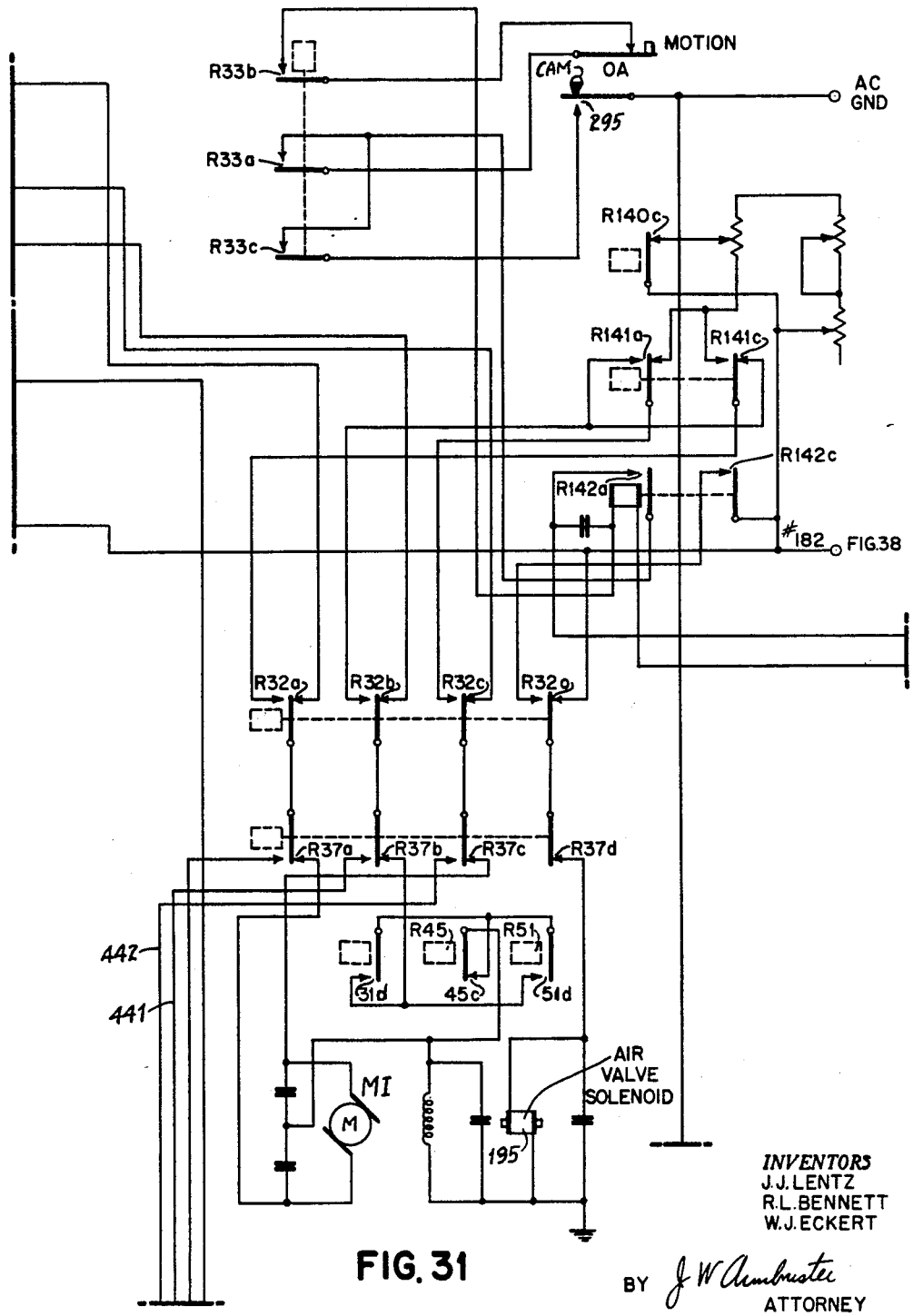

The counter motor control and detent control circuits are shown on Figs. 30 and 31. It is assumed that relay R110 (Fig. 29) of the units-thousands comparing unit is energized by the comparison. The circuit to actuate the air valve solenoid 195 to remove the detent is as follows: line No. 115 (Fig. 38), contacts R61d (closed when power is on), line 182 (Fig. 31), R32d (normally closed), R37d (normally closed), the micron counter air valve solenoid 195 and the ground.

The circuits to actuate the counter motor M from the comparing unit is: line No. 115 (Fig. 38), contacts R61d, line No. 182 (Fig. 30), units-thousands comparing devices, R113b and R113d (normally closed), R110a, R112d (normally closed), R11d (normally closed), wire 420, R32c (normally closed), R37c (normally closed), MI counter motor rotor M, R37a (normally closed), R32a (normally closed), R11b (Fig. 30) (normally closed), R112b (normally closed), speed control resistor RS, wire 419, R32b (normally closed), R37a (normally closed), R51a (will be closed because detent is out), R45c (normally closed) and the motorfield to the ground.

This places the micron counter motor M in operation at high speed so that the thousands positions may be quickly positioned to the units of abscissa storage.

Note that, when the punch relays R5–R10 were dropped out, all the comparing circuits were restored to normal. The circuit from terminal No. 45 (Fig. 29) and tube VT4 of the units-thousands comparing is as follows: line No. 45 (Fig. 37), R59b (normally closed), R9a (normally closed), wire 421 (Fig. 38), the thousands micron counter emitter 251, 247, and the voltage terminals No. 67 to 76. The circuit from line No. 46 (Fig. 37) is: line 46, contacts R59c (normally closed), line 62 (Fig. 26), R75c, line 54 (Fig. 45), the units order switch 407, voltage divider lines 15 to 24 and then through console storage in Fig. 26.

The normal points R5a (Fig. 38) to R7c connect the converter counter emitter spots to the voltage divider. The ordinate and abscissa storage relay emitters and lines 15–24 (Figs. 45 and 59) are connected to the corresponding voltages through the console relay contacts R77a–R79d (Fig. 26). Thus, a certain voltage is associated with all emitter spots of like numbers.

When the micron counter motor M has driven the micron converter counter to a position such that the voltages on lines 45 and 46 of the units-thousands comparing unit are equal, indicating that the counter emitter for the "thousands" order is in agreement with the "units" of the stored abscissa, then relay R110 will drop, and the motor circuit will be opened so that the counter will stop running. Only the highest order of this counter can be compared to the stored abscissa coordinate since this order represents tenths of a millimeter as does the units of the stored coordinate.

Figure 46:
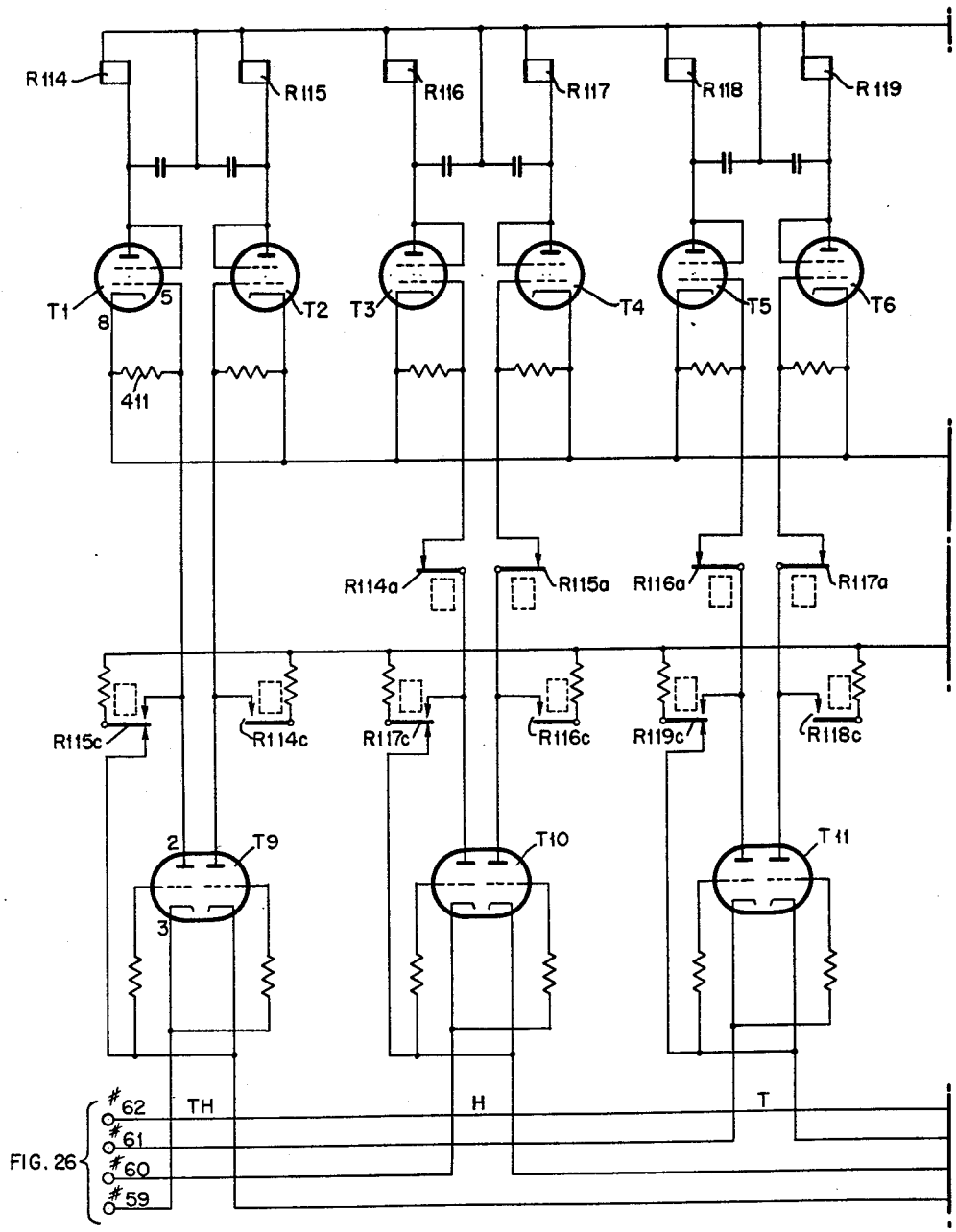
Figure 47:
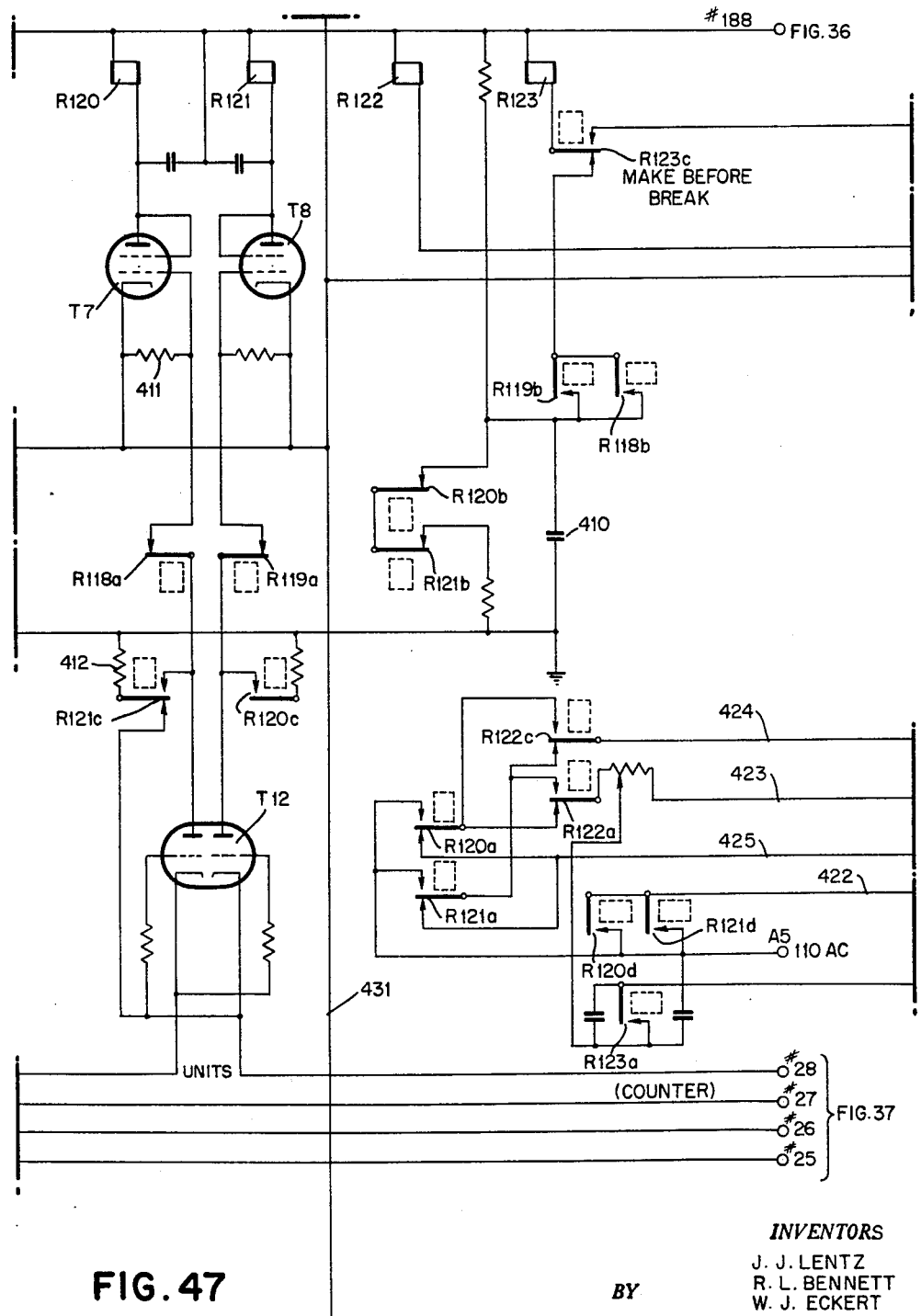

The abscissa MM counter will compare all four of its orders to the respective four orders of the stored abscissa coordinate. The normal points (Fig. 37) of punch relay R8 are used to connect the MM counter emitter brushes 251 to the abscissa comparing unit (Figs. 46 and 47). The storage emitters are connected to the comparing unit through the console contacts (Fig. 26) as already noted.

The end result of the comparison (Figs. 46 and 47) is to energize the comparing unit relay R120 (Advance Count) or relay R121 (Decrease Count). It may be assumed for purposes of this description that relay R120 alone is operated, indicating a difference in the units order only. From Fig. 47 it will be seen that the speed control relay R123 will not be energized. The circuits to advance the abscissa MM counter at low speed are as follows: To energize the air valve solenoid 195: terminal A5 (Fig. 47), connection of abscissa MM comparing contacts R120d, wire 422 (Fig. 48), R28d (normally closed), R36d (normally closed), abscissa MM counter air valve solenoid 195 and ground. To energize the MM motor: terminal A5 (Fig. 47), R120a (transferred), R122a (normally closed), 50 ohm resistance, wire 423, 100 ohm variable resistor R3, R28c (normally closed), R53d (transferred), R44c (normally closed), MM counter rotor M, R53b (transferred), R36c (normally closed), R28a (normally closed), wire 424 (Fig. 47), R122c (normally closed), R121a (normally closed), wire 425 (Fig. 48), R28b (normally closed), R36b (normally closed), the motor field, and to the ground.

From the above it will be seen that the converter counter motor M will advance in count at slow speed since there is more than 50 ohms resistance in the motor circuit.

When the counter reaches agreement with abscissa storage, relay R120 will drop and the motor will stop and the detent will engage. The counter will then stand at the correct figure.

Figure 61:
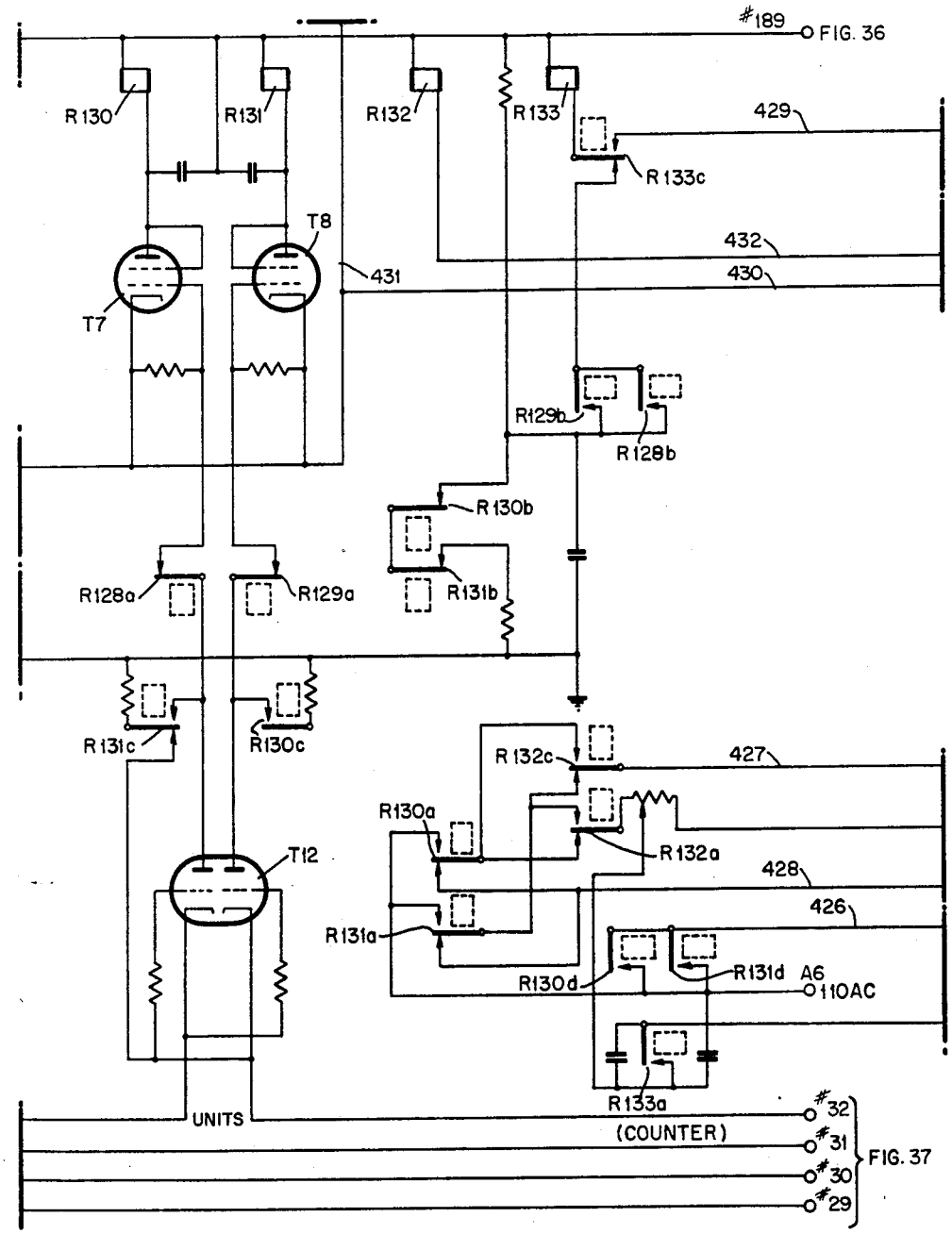

To show how the speed control relay R133 of Fig. 61 affects the operation of the counter, it may be assumed that the vertical or ordinate converter counter is setting at a figure that differs from the ordinate storage figure by a large amount. These figures will be compared by means of the normally closed contacts (Fig. 37) of punch relay R10 connecting the ordinate comparing unit with the counter emitters. The wide divergence of voltages on the comparison lines caused by the dissimilar readings will cause various relays of the comparing unit to be operated. It is assumed that the counter has the larger figure and, therefore, must decrease count (Fig. 60) to reach equality with the stored figure. Then relays R125, R127, R129, R131 and R133 of the comparing unit will be energized. The end result, as far as driving the counter motor M is concerned, is that relays R131 and R133 are energized.

The circuits are: To energize the air valve solenoid 195 (Fig. 62): terminal A6 (Fig. 61) ordinate comparing, R131d, wire 426 (Fig. 62), R30d (normally closed), the ordinate counter air valve solenoid 195 and to ground.

To energize the motor in the decrease count direction at high speed: terminal A6, R131a (transferred), R132c (normally closed), wire 427 (Fig. 62), R30a (normally closed), R54b (transferred), ordinate counter motor rotor M, R44b (normally closed), R54c (transferred), R30c (normally closed), R133a, tap on 50 ohm resistor, R132a (normally closed), R130a (normally closed), wire 428 (Fig. 62), R30b (normally closed), the motor field, and the ground.

From the foregoing, it will be gathered that the vertical motor M will operate at high speed since the R133a point shunts all but a small portion of the field resistance. Also note that the circuit is reversed for the rotor. In tracing the other motor circuits, both of which were advancing count, the rotor circuit is downward. In this case it is upward. Therefore, the motor will turn in the opposite direction and the count will decrease. The comparing unit relays R131 and R133 will stay up until equality is reached. At that time, relay R131 will drop, cutting off power to the motor. The momentum of the motor will carry the counter past the equal reading, whereupon relay R130 will pick up. Since relay R133 does not drop out until the motor actually changes direction, the motor will be rapidly brought to a stop and reversed. At this time relay R133 will drop and the counter will seek equality at a reduced speed. When equality is reached, the detent will engage and the motor will be cut off and the counter will be stopped.

The pickup circuit for the comparing unit relay R133 is such that it will be picked up if a difference exists in the tens order or higher (see 25,002,004).

The holding circuit is as follows: line 112 (Fig. 36), program relay contacts R17c or R20d for the ordinate counter, line 189 (Fig. 61), ordinate comparing relay R133 coil, R133c, wire 429 (Fig. 62), R31b (normally closed), ordinate counter motion contact 406, R31a (normally closed), wires 430 and 431 to terminal 111.

This circuit will be effective until the motion contact opens by the reversal of counter direction at which time the hold circuit will be broken and relay R133 will drop out.

Even if relays R128 or R129 should make contact again, the pickup circuit for relay R133 is no longer effective. This will be so because the capacitor associated with relay R133 will be charged.

The circuit for the balance relay is similar: line 189 (Fig. 61), relay R132, wire 432 (Fig. 62), ordinate counter balance contact 409, wires 430, 431, and terminal 111.

The circuits for the abscissa counter are the same. Note that the micron counter has no balance contact 409 because it has no need for one.

During the time that the abscissa and ordinate counter detents are disengaged, programming relay R52 (Fig. 37) will be energized. This will bring about a circuit to pick up relay R18 (Fig. 35) as follows: line 160, relay R18 coil, 1K resistor, R52b, R16a, R19c (normally closed), R40c (Fig. 36) (normally closed), R50c (Fig. 34) (normally closed), R1c (normally closed) and line 159. Relay R18 will pick up after a short time delay and the R18a points will hold the relay up until relays R16 and R17 drop out.

A number of driving controls are exercised by relays R19–R22. When relay R18b points close (Fig. 35), there is a circuit to pick up relay R19 as follows: line 160 (Fig. 34), relay R19 pickup coil (Fig. 35), contacts R18b and R23c (normally closed), R40c (Fig. 36) (normally closed), R50c (Fig. 34) (normally closed), R1c (normally closed) and line 159.

The R19a hold points (Fig. 35) will hold relay R19 and pick up relays R20 and R21.

The R19c normally-closed points will open and drop out relays R16–R18.

The R19b points will light the signal lamp for the drive indication.

The R19d points (Fig. 36) will provide a circuit to continue the units-thousands comparing by shunting the R16d point before it opens as relay R16 drops.

The R20b and R20d points perform a similar function by shunting R17a and R17c points, respectively, as relay R17 drops out. Thus, comparison is maintained during operation of the drive motors so that the drive may start before the counters reach equality.

The R20f and R20c points (Fig. 57) close circuits to connect the electronic synchro control error voltage output terminals 152 and 153 (Fig. 56) to the abscissa measuring engine interlocks. The error voltage output is controlled by the angular displacement of the counter synchros (Fig. 49) in relation to the matching synchros (Fig. 71) geared to the measuring engine. As soon as the abscissa MM counter moves (Fig. 49), a change in the error voltage from its associated autosyns is interpreted by the electronic controls so that a compensating error voltage to drive the measuring engine into agreement with the counter appears on terminals 152 and 153. The program relay contacts connect both measuring engine drive motors for automatic operation as already noted hereinbefore with reference to Figs. 57 and 71.

The ordinate error voltage is displaced 90° from the abscissa so that it may be amplified directly and used to drive the vertical coordinate motor. The measuring device error voltage output that appears on the lines at the lower right of Fig. 57 is at a frequency of 60 c.p.s. The synchros operate on 500 c.p.s. and so will put an error voltage of that frequency.

The ordinate counter synchro error voltage is fed directly to the electronic controls for conversion to measuring device drive error voltage.

The abscissa MM counter synchro error voltage is fed to the electronic devices via a network controlled by relay points R21b and R21d (Fig. 34) that permits a "stick-off" voltage to be impressed on the synchro error voltage in such a way that the combined error voltages reach null before the measuring device is positioned at a point that corresponds to the value of the figure set up in the abscissa MM counter. This voltage is variable which allows the operator to adjust the amount of stick off. The maximum stick off is one millimeter.

The circuit from the counter error voltage output to the input is as follows: line 185, R21d (transferred), wire 433, section of 25 ohm potentiometer, slider, wire 434, R21b (transferred), and line 186. There is a current of about 110 m.a. flowing in the 25 ohm potentiometer so that the maximum stick-off voltage is about 2.75 volts.

The abscissa drive motor will bring the measuring devices up to the predetermined stick-off point from the true coordinate as read in the counter and stop there, but the ordinate drive motor will hunt about the point of true positioning as a signal that the point has been reached. It is desired that this action signal the program relays that the positioning of the measuring engine is completed. Relay R58 is used to interlock the electronic devices and the program relays. This relay is normally energized as follows: line 160 (Fig. 37), relay R58 coil, wire 435 through normally closed points R134d, etc., in parallel, wire 436 and line 159.

Figure 64:
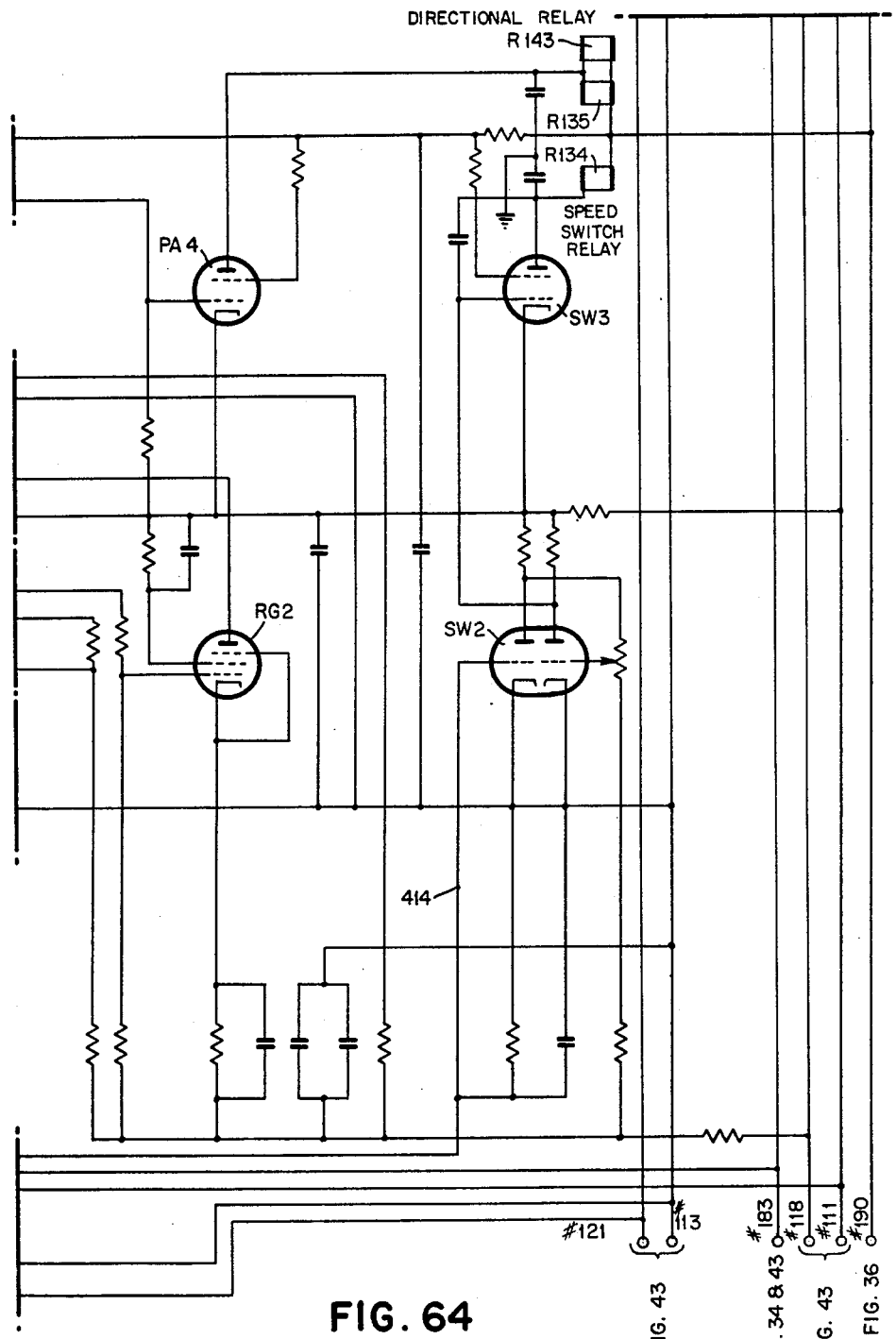
Figure 65:
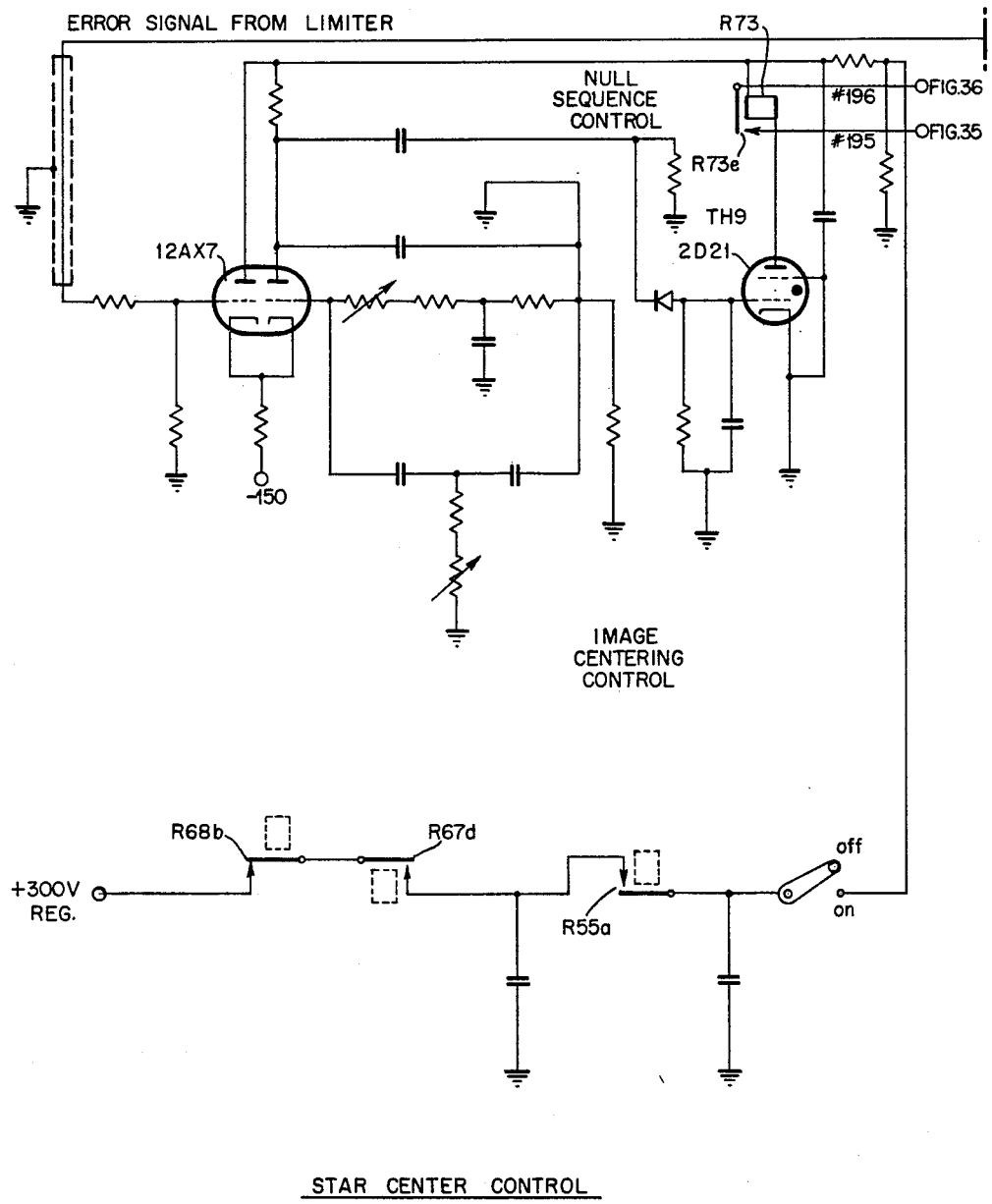

There will always be a connection from wire 435 to wire 436 of the electronic synchro control devices, except for brief instants when the abscissa drive is in agreement and stopped, and the ordinate drive is hunting by action of relay R135 (Fig. 64). Under these conditions, the circuit will be broken momentarily whenever the R135d points transfer (Fig. 37). This will cause relay R58 to drop out briefly and pick up again. After several such operations, relay R22 (Fig. 35) will be picked up as a result of the lowering of the charge on its associated time delay capacitor as follows: line 160, relay R22, + side of 50 mfd. capacitor, 270 ohm resistor, R52d (This point will be closed when both the ordinate and abscissa MM counters are detented.), R58d, R19a, R23c (normally closed), R40c (normally closed), R50c (normally closed), R1c (normally closed) and line 159.

A pair of stop control relays R23 and R24 are provided. When relay R22 picks up, the R22A points furnish a holding circuit until all the drive relays are dropped out.

The R22b points provide a circuit to pick up relay R23 as follows: line 160, relay R23 pickup coil, R22b, R44d (normally closed), R25c (normally closed), R1c (normally closed) and line 159.

The R23a points provide a hold for relay R23 and a pickup for relay R24.

The R23c contacts open and drop out drive relays R19–22.

The R23b points complete a circuit to the stop indication light.

The R23d points (Fig. 36) continue the circuit to apply +220 volts to the No. 187 terminal of the units-thousands comparing unit. This permits the micron counter to continue in operation if necessary to bring into agreement its thousands order with the units of abscissa storage. Note that the circuits to the other comparing units are broken at this time.

The R24a points will open the circuit to the "Program" signal light. Notice that when R58 relay dropped out briefly and picked up, the R58b points caused the Program light to "wink." This signaled the operator that the end of the drive was approaching.

The R24c points will provide a circuit to energize relay R25 of the following stage when the validation key (Fig. 36) is depressed as already noted.

The R24b points (Fig. 36) in conjunction with the R7d normally open points provide an interlock whereby the error relay R40 will be picked up if the read and stop stages of programming should be active simultaneously in error, as when power is first turned on.

The R24d points (Fig. 36) open the circuit from the +220 source to line 190 of the electronic controls thus dropping out any control relays that might be up so that the manual control may be effected.

When the operator pushes the validation key, a circuit is completed to pick up relay R25 as follows: line 160 (Fig. 35), relay R25 pickup coil, R24c, wire 438, validate key, wire 439, R27c (normally closed), R40c (normally closed), R50c (normally closed), R1c (normally closed) and line 159.

The R25a points close to shunt the validation key contacts and hold up relay R25 and pick up relay R26 through a similar network.

The R25c normally closed points drop out relays R23 and R24.

The R25b points light up the "Photo Control" signal. (Note that Program signal comes back on when R24a closes as relay R24 drops out.)

The R25d points provide a circuit from +220 to units-thousands line 187.

The R26a points (Fig. 24) complete a circuit that calls in the photo-control centering devices through interlocks contacts R26c and R26d (Fig. 57) as already noted.

When R55B points close (Fig. 35), a circuit is completed to relay R27 as follows: line 160, relay R27 pickup R55B, R45a (normally closed), R40c (normally closed), R50c (normally closed), R1c (normally closed), line 159. Relay R55 is picked up at the end of optical scanning when a count is perfected to call in the horizontal tachometer solenoid SD (Fig. 24).

The R27a points furnish a hold circuit for relay R27 and pick up relays R28 to R33.

The R27c normally closed points drop out relays R25, R26.

The R27b points complete a circuit to light the "Follow-Up" signal.

The transfer points of relays R28, R30 and R32 are used to change the motor control circuits of the abscissa, ordinate and micron counters (Figs. 48, 62 and 31) respectively from the comparing units to the electronic synchro control devices. Relay R29, R31 and R33 (Figs. 48, 62 and 31) provide points to interlock the counter contacts 295, 406 and 409 with the electronic relay controls. Relay R33d point (Fig. 36) is used to keep relay R38 energized while the micron counter idles, and relay R31d point (Fig. 31) shunts R51a points in the micron counter motor circuit.

From the foregoing it is evident that the electronic controls have control of the counters during "Follow-Up" operation.

Assuming that the original setting (by comparison with the storage unit) of the ordinate counter is sufficiently close so that when the electronic synchro control takes over control of the counter, it will not be necessary to position the counter further. The extreme sensitivity of the synchro control is such that the counter will hunt about the point of true null without moving far enough away from the point to require removal of the detent. The relay R134 (Fig. 64) will be energized, opening the point R134c (Fig. 62) which normally shunts the greater part of the counter motor field resistance. Relay R135 (Fig. 64) will oscillate from energized to the de-energized state at about 100 c.p.m. The frequency of hunting is determined by the field resistance and may be conveniently changed through a small range by adjusting the potentiometer. Relay R136 will not be energized inasmuch as the positioning is assumed to be of such accuracy that the oscillating arm contact 295 (Fig. 62) will not be closed. From the circuit as shown it can be seen that the detent relays do not pick up except by the contact 295.

The motor circuit when relay R135 is not energized is as follows: A.C. source (Fig. 38), contacts R61d, line 182 (Fig. 62), 35 ohm resistance, tapped down 100 ohm resistance, 50 ohm resistance, R135a (normally closed), R30c (transferred), R54c (transferred), R44b (normally closed), ordinate counter motor rotor M, 54b closed), R30b (transferred), the ordinate counter motor field, and to the ground.

This drives the motor forward, whereupon the counter synchro will pass through null and the phase of the error voltage delivered to the electronic controls will be reversed. This will cause relay R135 to pick up and operate its R135c contacts, reversing the motor direction.

Upon reversal, the counter synchro again passes through null, the phase changes, relay R135 drops and the motor again drives in a forward direction.

This idling or hunting action continues while the other counters follow the measuring carriage as it is positioned slightly in the forward direction because of the previously applied stick-off voltage. Note that there is no longer a connection to the stick-off voltage network, the circuit being as follows: abscissa MM counter line 185 (Fig. 34), R21d (normally closed, R21b (normally closed) and line 186.

Assuming that the abscissa will be changed by 0.5 mm., then the abscissa MM counter must move five counts in the units position. This will be an angular rotation for the fine synchro of 3.6 degrees, an appreciable amount. The distance of the coarse synchro from null will be one fiftieth of this or about 4 minutes of arc. This will be insufficient to create an error voltage of appreciable amplitude. The result will be that the speed relay R137 (Fig. 50) for the abscissa MM will be energized so that the abscissa MM counter will operate at slow speed. Since an error voltage from the fine synchro will be delivered to the electronic amplifiers by reason of the transferred points of the speed relay R137a (Fig. 49) and since the measuring device drive will move the carriage MM synchro slightly ahead, the voltage will be such that the reverse relay R138 will be de-energized. With relay R137 energized and relay R138 de-energized, the circuit will be as follows: the A.C. source (Fig. 38), contacts R61d, line 182 (Fig. 48), 35 ohm resistor (abscissa MM), 100 ohm resistor, 50 ohm resistor, R138a (normally closed), R28c (transferred), R53d (transferred), R44c (normally closed), MM counter motor rotor M, R53b (transferred), R36c (normally closed), R28a (transferred), R138c (normally closed), R28b (transferred), R36b (normally closed), the motor field, and the ground.

This will start the motor at slow speed in a forward direction. When the contact 295 closes, a circuit will be established to pick up relay R139.

The R139c points (Fig. 48) will energize the MM counter air valve solenoid 195 as follows: line 182, contacts R139c, R28d (transferred), R36d (normally closed), MM counter air valve solenoid 195, and ground.

The operation of the air valve will cause the counter detent to be removed. This will cause the contact 295 to open, but relay R139 is now holding through the motion contact 406 only. Therefore, the detent will remain out until the counter motor reverses direction.

When the abscissa MM counter has moved to a place where the error voltage from the fine synchro passes through null and undergoes a phase reversal, relay R138 will be energized and the counter motor will reverse, dropping out relay R139 and allowing the detent to position the counter emitters. The motor will continue to hunt about a point determined by the synchro null position. This in turn is determined by the synchro transmitter on the measuring carriage. If now the measuring carriage under control of the photoelectric centering device should move a tenth of a millimeter further, the contact 295 would close, the detent would be withdrawn as outlined, the counter would advance one point in the units position, the detent would be restored as the motor reversed and hunting would be resumed about this new point.

The abscissa MM and ordinate counters have now reached agreement with the measuring devices and are idling. The actual time to position these two counters as outlined would be about 3 seconds.

Meanwhile, the micron counter will be traveling at high speed to come into agreement, since it must travel about 5,000 counts to make up the 0.5 mm. difference assumed. This figure was selected to illustrate the functioning of the interlock time delay network associated with relay R140. It will be clear from the foregoing description that the speed range relays R134, R137 and R140 are de-energized for high-speed operations and energized for low-speed operations. It has been pointed out that the magnitude of the coarse error voltage is used to determine the speed range and also from which synchro (coarse or fine) the error voltage will be taken for phase discrimination. For purposes of coordinating the micron and MM counters, an even ration (10:1) was chosen for the variation between the fine and coarse synchros. Thus, the coarse micron synchro rotates 360° for each mm. of measuring carriage travel. Now the 0.5 mm. difference assumed above would be equal to 180° rotation of the coarse micron synchro. At 180° there is a "false null," where the error voltage reduces to zero. Also, with an even ratio such as 10:1, the fine synchro null will coincide with both the "true null" and the "false null." This means that if the micron counter were placed exactly 0.5 mm. from the true position, it would hunt around this "false null." If moved only a few microns from this place, the coarse error voltage would take control and the counter would seek the "true" null by the shortest path since the coarse error voltage would be determining the output of the phase discriminator. Therefore, the false null would be encountered only the once, i.e., at the start of "Follow-Up."

To avoid the condition above described, there is a delay of the pick up relay R140 by about ⅕ of a second. This means that the micron counter always starts out at high speed under coarse error voltage control, and ⅕ of a second is ample time necessary to move the short distance from the false null. At other times, the coarse error voltage prevents the pickup of relay R140 in any event. In only one case where the micron counter is actually on the "true null" will the above-mentioned time delay slow up operations. In this case it would cause "wide" hunting for perhaps a half second, which is expended for the assurance that the true null will always be reached.

The circuits to cause the micron counter to operate are as follows to energize the counter motor M (Fig. 31): (relay R140 (Fig. 33) is down until the 20 mfd. capacitor can be charged from the 220 v. line through the 10K resistor, and assume relay R141 to be up) line 182 (Fig. 31), R140c (normally closed), a tapped resistance, R141c (transferred), R32a (transferred), R37a (normally closed), micron counter motor rotor M, R37c (normally closed), R32c (transferred), R141a (transferred), R32b (transferred), R37b (normally closed), R31d (transferred), R45c (normally closed), the motor field and to ground.

As the motor starts to move, oscillating arm contact 295 closes and picks up relay R142 which is held through its R142a contacts.

R142c points close to actuate the air valve solenoid: line 182, R142c (transferred), R32d (transferred), R37d (normally closed), air valve solenoid 195, and ground.

Notice that R142d points (Fig. 37) in the synchro interlock circuits will prevent relay R58 from dropping until relay R142 is dropped out.

As the micron counter approaches the coarse "true" null, relay R140 will be energized (the time delay is no longer effective), as the counter motor M will reduce speed. As it passes null under control of the fine synchro, a phase reversal will take place and relay R141 will drop, causing the motor to reverse. As the motor reverses, the detent will drop in and the counter emitters will be locked in position. All three counters are now idling and relays R136, R139 and R142 are de-energized, so relay R58 will drop out whenever relay R138 is de-energized and the R135d points are transferring.

Since the detent relays R51 and R52 are now dropped out, there is a circuit to pick up relay R34 as soon as the associated time delay capacitor has been discharged sufficiently as follows: line 160 (Fig. 35), relay R34, coil, +side of 50 mfd. capacitor, 270 ohm resistor, R52a (normally closed), R47d (transferred), R51b (normally closed), R58A (normally closed), R27a, R35c (normally closed), R40c (normally closed), R50c (normally closed), R1c (normally closed), and line No. 159.

As soon as the relay R34A points close, a hold circuit is established to keep relay R34 up until relays R27–R33 drop out.

The picking up of relay R34 marks the end of the stage of programming known as follow-up and initiates the next stage with the "Correct" relays R35–R38 and R59.

When the R34B points close (Fig. 36), a circuit is completed to pick up relay R35 as follows: line 160, relay R35 pickup coil, R34B, R39c (normally closed), R40c (normally closed), R50c (normally closed), R1c (normally closed), and line 159.

The R35a points hold up relay R35 and provide a circuit through an RC network to pick up relay R36 after a slight delay, but they first pick up relays R37 and R59 as follows: line 160, relay coils R37 and R59 in parallel, R38A (has been held up by R33d points), R35a, R39c (normally closed), R40c (normally closed), R50c (normally closed), R1c (normally closed) and line 159.

The normally closed R35c points (Fig. 35) open to drop out relays R27—R34. The opening of the R33d points (Fig. 36) causes the capacitor to charge through relay coil R38 and the resistor in series. This will keep relay R38 up for about 3 seconds after which it will drop out, thus fixing a minimum time limit for the "Correct" stage of programming.

The R35b points light the "Correct" signal lamps.

The R35d points close a circuit from the +220 source to the line of the units-thousands comparing unit.

The relay points R37a, R37c and R37b transfer motor circuits from the micron counter to MM counter pending the picking up of relay R36.

The R37d (Fig. 31) (normally closed) contacts open the circuit to the micron counter air valve solenoid 195.

The R59a point (Fig. 37) provides a circuit to hold up relays R37 and R59 after relay R38 drops. This circuit will hold these relays energized until the check relays R11–R15 are energized on the following program cycle.

The R59c and R59b transfer points (Fig. 37) are used to switch the input terminals (No. 45 and No. 46) of the units-thousands comparing from the thousands order of the micron counter and the units order of abscissa storage, respectively, to the units order of the abscissa MM counter and the thousands order of the micron counter.

The R59d points (Fig. 36) are in the pickup circuit of the "Manual Stop" relay R41, so that the "Correct" stage marks the point beyond which manual controls are ineffective, assuring that, once a valid reading has been obtained, it will be punched out without interference.

After relays R37 and R59 are up and the necessary circuits have been established or broken as outlined above, relay R36 picks up and completes the motor circuits to bring about the desired synchronization of the units of the abscissa MM counter with the thousands of the micron counter.

Assuming that the abscissa MM counter stands at 234.9 (mm.) and that the micron counter at the end of "Follow-Up" stands at 000.2 (micron). This requires that the abscissa MM counter must be brought up to read 235.0 so that the total reading read from both abscissa counters will be 235.0002 (mm.) This indicates how a movement of only a few tenths of a micron by the measuring devices may be used to move the abscissa MM counter, for if the micron counter had read 999.8 microns, the setting of the MM counter as given above would be correct and the total reading without further correction would have been 234.9998 (mm.). Obviously, it is impossible for the MM counter to be positioned more accurately than 0.1 mm., which is one step of the units position. Nevertheless, by means of the synchronization of the units of the abscissa MM counter with the thousands of the micron counter, all the accuracy of positioning possible for the micron counter may be "passed on" to the MM counter. This synchronization must always proceed in the "shortest direction" and that makes the use of the units-thousands comparing devices necessary.

When the R35d points closed (Fig. 36) to bring in the units-thousands comparing, and the R59b and R59c points made the proper connections to the No. 45 and No. 46 terminals, circuits were set up to actuate the comparing relays R111 and R112. Relay R111 indicated that a "reverse" direction (from "9" back to "0") was indicated, but relay R112 picked up because the difference between the compared readings was greater than 5. The final direction is thus "forward," since relay R112 will always reverse the initial setup. This is the right direction to move the abscissa MM counter.

The motor circuits that are set up when relay R36 of programming picks up, relays R37 and R59 being already up, will determine the direction and speed of the MM counter in conjunction with units-thousands comparing relays R111 and R112 as follows:

To energize the MM counter air valve solenoid 195 (Fig. 48): line 115AC (Fig. 38), R61d, line 182 (Fig. 30), R113b (normally closed), R111a and R112a in parallel, wire 441, R36d (Fig. 48) (transferred), MM counter, air valve solenoid 195, and ground.

To energize the MM counter motor (Forward): line No. 182 (Fig. 30), R113b (normally closed), R111a and R112a, R112b (transferred), R111b (transferred), wire 420 (Fig. 31), R32c (normally closed), R37c (transferred), wire 442 (Fig. 48), R36a, R28b (normally closed), wire 425, comparing relay contacts R120a (normally closed), R122a (normally closed), a resistor, wire 423 and variable resistor R3 (Fig. 48), R28c (normally closed), R53d (transferred), R44c (normally closed), abscissa MM counter motor rotor M, R53b (transferred), R36c (transferred), R37a (Fig. 31) (transferred), R32a (normally closed), wire 443 (Fig. 30), R111d (transferred), R112d (transferred), a tapped resistor, wire 419, R32b (normally closed), R37b (transferred), wire 444 (Fig. 48), R36b (transferred), abscissa MM counter motor field.

It will be noted that the motor will operate in the forward direction because the circuit is downward through the rotor to R53b; also that it will operate at slow speed since there is the total resistance that usually is used with the MM counter for slow speed, plus the tapped resistance in the units-thousands comparing unit.

When the counter detent is disengaged by the energization of the air valve solenoid 195, relay R52 is energized as follows: line 111 (Fig. 37), relay R51—R54 common, relay R52 coil, abscissa MM detent contact 401, and to ground. The opening of the R52c normally closed points (Fig. 36) will prevent a pickup circuit to relay R39 (agree) if relay R38 drops out, closing the R38B points before the counter is fully positioned. The reason for the delay of relay R38 dropout is now evident, since a number of relays must be set up before R52c can be opened.

When the abscissa MM counter has been brought into agreement, the comparing relays R111 and R112 will drop out, the motor will stop and the detent will be allowed to engage and lock the counter emitters. This will cause relay R52 to drop out and when relay R38 drops out, if it has not already done so, a circuit will be completed to pick up "Agree" relay R39 (Fig. 36).

When the "Correct" stage of programming is completed, there is a circuit to pick up relay R39 as follows: line 160 and the relay coil common, relay R39 pickup coil, R38B (normally closed), R52c (normally closed), R11c (normally closed), and line 159.

Relay R39a points close to hold up relay R39 through the closed R4c points.

The R39c normally closed points open and drop out relays R35 and R36. This will open the motor circuits to all counters, but relays R37 and R59 will hold up until after punching.

The R39d points (Fig. 34) complete a circuit to pick up the "Reset" relays R1 and R2, thus initiating a new programming cycle of automatic operation.

The primary function of the "Error" relay R40 (Fig. 36) is to detect a failure in the storage relays, since the omission of a single position of stored data will render all comparison useless. This is also covered under "Check" relays. To clarify the operation of the circuit, assume that the units of ordinate has failed to read. Then, when the "Check" relays R12—R14 are energized, the following circuit will be effective: line No. 114 (Fig. 59), switch relay SR4, the No. 4 rotor, the "N" spot, line No. 179 (Fig. 34), contacts R14d, wire 418 (Fig. 36), relay R40, R50c (Fig. 34), R1c and line No. 159. 40 is held through its contact R40b and R50c.

Operation of the "Manual Reset" will drop out the error relay R40.

The R40a points transfer and open the circuit to the program signal light, while closing the circuit to the "Error" signal.

The R40c points open (Fig. 36) the circuit to any programming relays that are up. (R53 and R54 "Counter" relays are normally up.)

The R40d points (Fig. 36) close a circuit to pick up relays R44 and R45, thereby stopping the counter motors. This has a special purpose in limit control of the "Counter" relays. It also allows resetting without a manual stop.

Depression of the stop key (Fig. 36) will result in picking up the "Manual Stop" relays R41—R45. As already noted, if relay R59 is up, the stop key is temporarily rendered ineffective so that the counters must read out, once a valid setting has been achieved.

The circuit to pick up relay R41 is as follows: line 160 (Fig. 36), relay R41 pickup coil, R59d (normally closed), stop key contacts, and back to line 159. An alternate circuit from R59d through other stop key contacts may be used. Also note that there is a third stop key in parallel with these two. It is useful when testing or checking to have controls that are accessible from the rear of the cabinet.

The R41a points close a circuit to the hold coil of relay R41 and the coils of relays R42 and R43 in parallel and through all the start key contacts.

The R41c points (Fig. 35) open the circuit to the "Program" signal.

The R41d points close a circuit to "Manual Control" signal.

The R41d points (Fig. 37) keep relay R58 energized.

The R43a points (Fig. 35) open the circuit to the stop signal.

The R43c points (Fig. 36) are used to pick up relays R44 and R45.

The R43d points (Fig. 36) open the circuit from the +220 v. line 112 to line 190 of the electronic controls of Fig. 64.

The circuit to pick up relays R44 and R45 is through contacts R43c. The R44a points (Fig. 34) open the circuit to "Read" relay R3. The R44c points (Fig. 48) open the circuit to abscissa MM counter motor M when counter is within limits. The R44b points (Fig. 62) open the circuit to the ordinate counter motor M when counter is within limits. The R44d points (Fig. 35) open the circuit to relay R23 pickup coil and transfer the circuit to the control of R50a points.

The R45a points open the circuit to relay R27. The R45c points (Fig. 31) open the circuit to micron counter motor M. The R45b points close (Fig. 36) to complete the circuit to the manual control keys. The R45d points (Fig. 34) open the circuit to the pickup coil of "Reset" relay R1 for automatic resetting only.

The stop relays will stay energized until a start key is depressed, at which time relays R41—R43 will drop out. Relays R44 and R45 will drop out slightly later owing to the R.-C. time delay circuit. This keeps the motor control circuits open until the program relays and other automatic control relays are energized.

The manual controls are effective when a stop key has been depressed or the "Error" relay R40 energized, since either will cause the pickup of relay R45, which completes a circuit to the manual control interlock by means of the R45b points.

A relay R47 is provided to break connections from the photoelectric control to the drive motors when a null point is reached in the image centering operation.

The control relay R47 (Fig. 36) is called into operation after the photoelectric scanning controls have signified that the star image is centralized. This control is effected by the null sensing devices shown in Fig. 65. A circuit is made to energize a control relay R73 and advance the program control unit through energization of relay R47 when a null point is reached. The output from a 60-cycle pass filter is rectified and used to bias a thyratron TH9. When a null point is reached, no bias is obtained and the thyratron TH9 picks up the relay in the plate circuit. The RC network in the plate supply prevents firing of the tube before bias is developed.

When the contacts R73e close, a circuit is established between lines 195 and 196, the former having connections (Fig. 35) to the relay R27 for energizing "follow-up" control after photoelectric scanning. The second line 196 is connected at the top of Fig. 36 to a wire having connections to the relay contacts R47b and then through coil R47 and over to line 160.

When relay R47 is picked up, it is held through the transferred contact R47b and through line 197 (Fig. 34) which includes the normally closed contact R44a and R11c for establishing a connection to the opposite line 159.

Relay R47 has contacts R47c (Fig. 57) and R47a in series with the lines 153 and 155, respectively, of the PA output of the horizontal and vertical scanning control. When the null point is reached, and R47 is picked up, both drive motors HD and VD (Fig. 71) are cut out to preserve the centered position.

Relays R48 and R49 (Fig. 36) are picked up by the down key and up key through contacts R45b and line 159. Along with these relays there is a pickup of either relays R62 or R63 (Fig. 51) and they have contacts affecting the polarity of the vertical drive signal. The contacts of R48 and R49 are used to operate a buzzer (not shown) to loosen the vertical slide.

Note that a combination of key controls, such as: reverse-up, forward-down, reverse-down, or forward-up is possible and easily accomplished with the keyboard arrangement.

Manual control is usually at the slowest speed possible in order to get precision of adjustment. A high speed of vertical drive is obtained by depressing the high-speed key in conjunction with any of the afore-mentioned manual control keys. The high-speed key has the dual purpose of leading into manual control or selecting high speed if held down. This picks up relay R50 as follows: line 160, relay R50, the high-speed key contacts, R41a (closed when in manual stop condition), the start contacts and line 159. The high-speed button causes R72 to drop out and permit full power for the vertical output of line 2 (Fig. 51).

The R50a and R50c points are used to provide a useful function of the "Manual Control," wherein the operator may skip part of the programming operation by depressing the manual stop and the high speed key. In doing so, relay R50 will be picked up in conjunction with the manual stop relays R41–R45. A circuit will then be completed to pick up the stop stage of programming as follows: line 160 (Fig. 35), relay R23 hold coil and relay R24 coil, R50a, R44d (transferred), R25c (normally closed), R50c and R1c (normally closed), and line 159. Relays R23 and R24 will hold through the R23a hold point as has been previously outlined.

The R50c contact will open and drop out any relays that may be up in programming, including the "Error" relay R40.

The foregoing controls will enable the operator to come to the stop or mid-point stage of programming at will, at the same time dropping out all program relays and clearing any error signal. This enables blank cards to be fed into the punch and readings from the follow-up counters may be taken as follows: a blank card will result in a reading error of comparing following the "Check" stage. The error relay R40 picks up manual stop relays R44 and R45. The operator pushes the high-speed key. The error relay is dropped out by R50c. The stop relays R23 and R24 are picked up. The start key is now depressed, dropping out the manual stop relays and the validation key will initiate a follow-up and read out.

It is apparent that any high-speed operation places programming in the stop (for validation) stage. This is proper since such an operation should only take place at this time, and other programming is rendered void by such an operation. The operator may either go ahead by pressing the validate key or start a new cycle of programming by pressing the reset key (Fig. 36) to pick up relay R60 as follows: line 160 (Fig. 37), relay R60 pickup coil, wire 445 (Fig. 36), reset key, contacts, R45b, and line 159. Relay R60 holds through R60a as follows: line 160, relay R60 hold coil, R60a, R11c (Fig. 34), and line 159. The R60c points (Fig. 34) open the circuit to the "Punch" relays R5—R10. The R60b points pick up "Reset" relay R1.

The R60c points remain open till after punching, when relay R60 drops out as a result of the opening of the R11c relay points. Thus, a manual reset permits replacing of data by allowing new data to be read-in, while suppressing the punching out of old data which must have been in error as indicated by the manual reset.

The "counter" relays R51—R54 (Fig. 37) have been touched upon hereinbefore, but a recapitulation is made here. Relay R51 picks up under control of the micron counter detent 401 as follows: line 111, relay R51, micron counter detent contact 401 and the ground line. The closing of the detent contact 401 closes a circuit to discharge the condenser in the associated R-C circuit; so that the drop out of the relay may be delayed by the charging current of the condenser when the detent contact opens. Thus, a short interval opening of the contact will not drop out the relay.

Relay R52 picks up in a similar manner and is also prevented from dropping out on short interval breaking of the detent contacts 401. It will be observed that either the abscissa MM counter detent or ordinate counter detent will cause the pickup of relay R52 through the respective detent contacts. Both contacts must be open for a period of about 0.1 second in order to drop relay R52.

The R51a points close (Fig. 31) to complete a circuit to the micron counter motor. These points are shunted during "Follow-Up" so that the motor may idle or hunt with the detent engaged (contact open).

Figure 34:
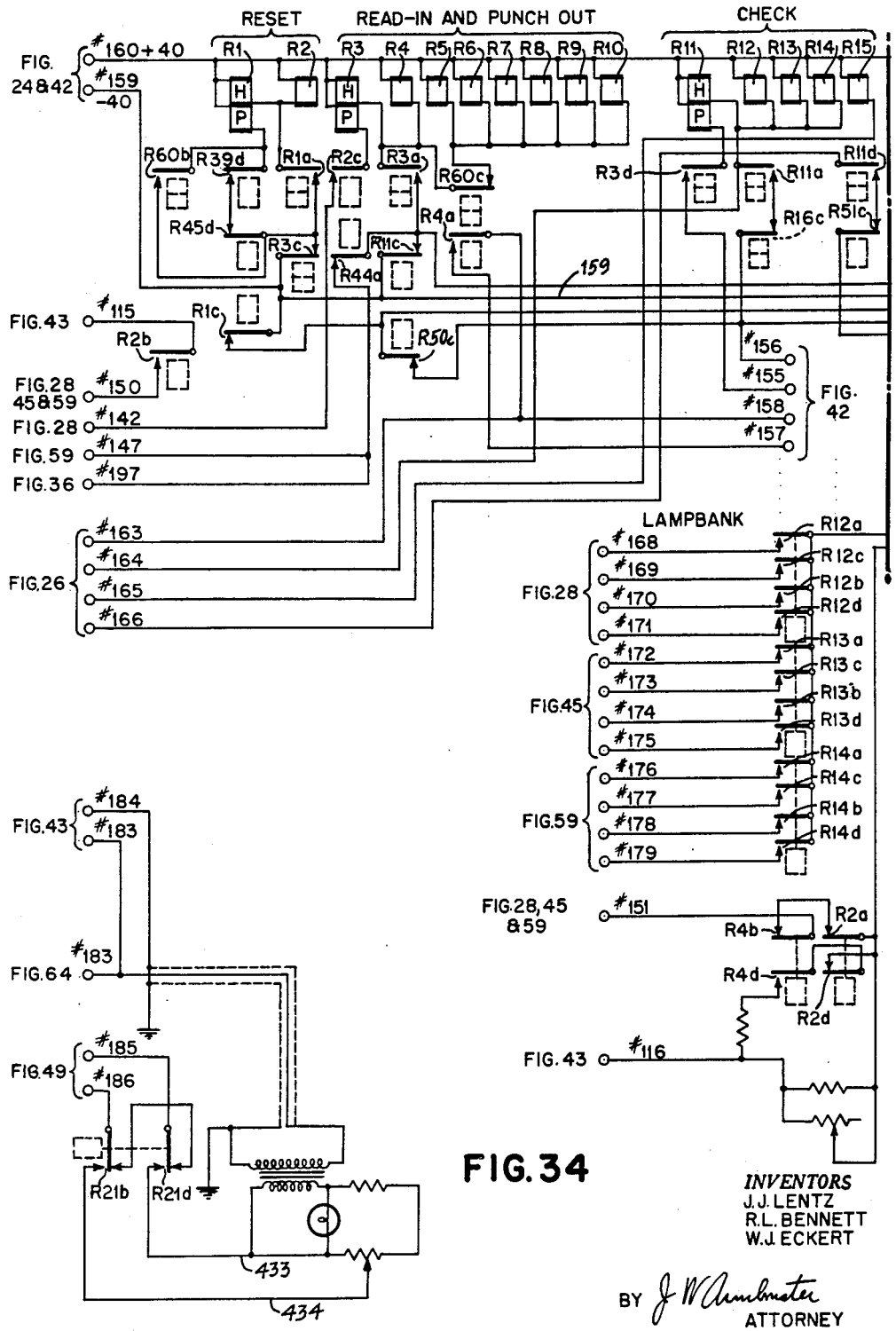
Figure 35:
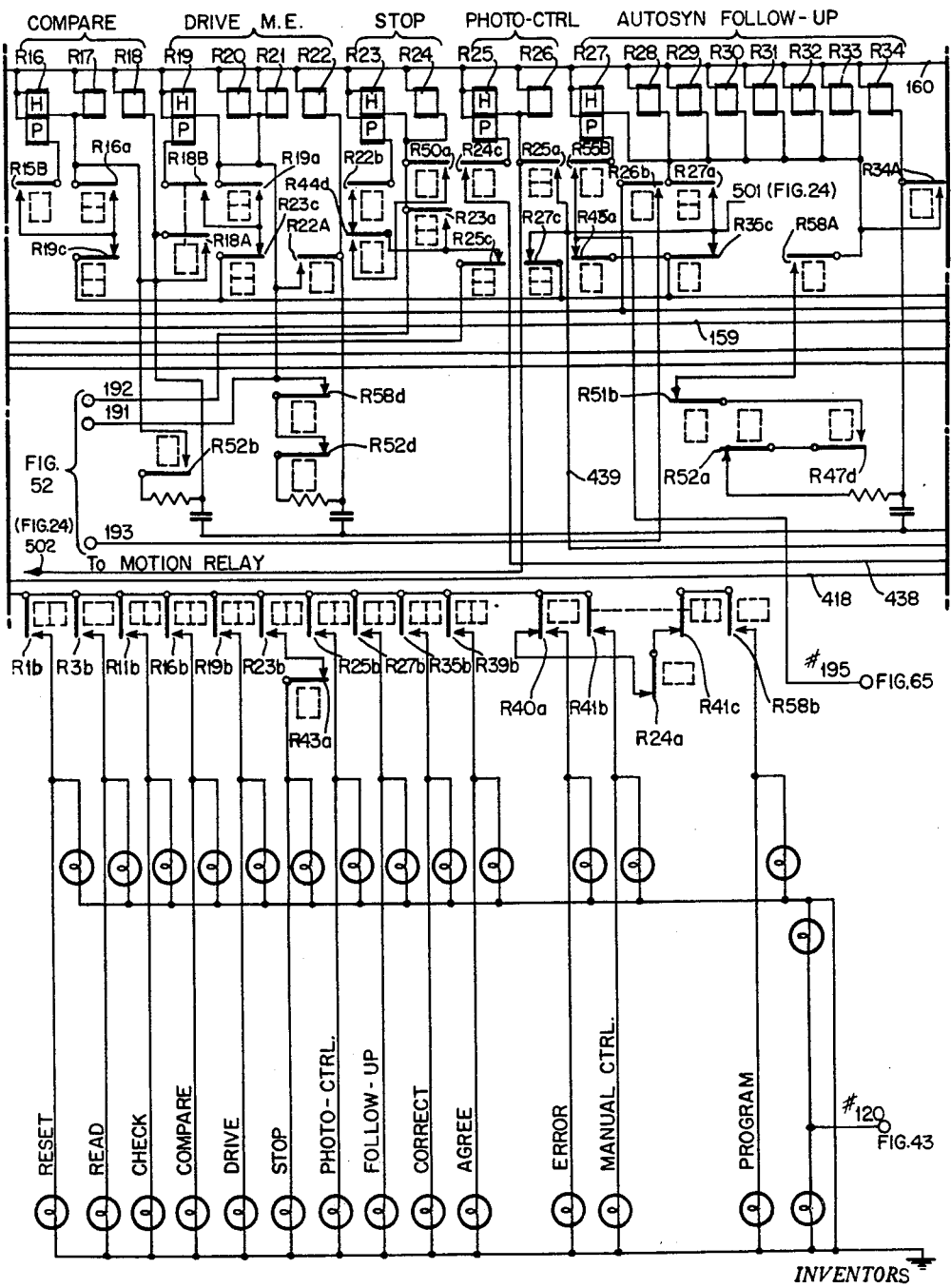

The R51c points complete a circuit to relay R15 (Fig. 34). Relay R51 should pick up when relays R37 and R59 drop out under control of R11c (Fig. 34) normally closed points. If the air supply is defective or shunt off; the air valve solenoid 195 will be inoperative, the detent will be left engaged, relay R51 will not pick up, and the R11 "Check" stage will not be completed. This will be a signal to the operator to check the air supply.

The R51b points (Fig. 35) open the pickup circuit of relay R34 so that "Follow-Up" cannot be terminated if the micron counter is still being positioned.

The R51d points (Fig. 36) keep relay R38 energized in conjunction with R33d points (Follow-Up). Thus, the drop out of relay R38 cannot be accomplished until after "Follow-Up."

The R52a points (Fig. 35) keep the pickup circuit for relay R34 open until both the abscissa MM and ordinate counters are detented.

The R52c points (Fig. 36) open the circuit to relay R39 until the MM counter has been corrected, if this should take longer than the 3 second minimum limit set by the drop-out time of relay R38.

The R52b points (Fig. 35) close a circuit to pick up relay R18 to start the measuring device drive. If the comparison of counters to storage should indicate that an equal condition existed (i.e. no counterdrive was required), then the programming would stop at this point and thus act as a signal for the operator to check. Programming could be resumed by the use of the manual stop and high speed keys.

The R52d points (Fig. 35) are open as long as either the abscissa MM or ordinate counters are not detented, thus preventing the picking up of relay R22 which would stop the measuring device drivers.

Relay R53 (Fig. 37) is picked up by the limit contacts TL and DL for the abscissa MM counter. These contacts are normally closed except when opened by the limit arm as the counter goes out of limits. Relay R53 is therefore normally energized as follows: line 111, relay R53, contacts TL, DL, and to ground.

Relay R54 is similarly picked up by the ordinate limit contacts and is energized as long as the ordinate counter is within limits.

The R53a contacts close (Fig. 36) to pick up "Error" relay R40 if the abscissa counter goes out of limits. This would normally drop out programming relays, but in this case, the R40c normally closed point (now opened) will be shunted by the R53c normally closed contact. The R53b and R53d points (Fig. 48) reverse the direction of the abscissa MM counter motor M and so drive it back into limits. The error relay R40 (Fig. 36) has meanwhile picked up stop relays R44 and R45 by means of the R40d points. This has no effect on the motor circuit of the abscissa MM counter until it is back in limits whereupon relay R53 will be picked up and the counter motor will stop. The ordinate and micron counter motors will stop at once, when the stop relays R44 and R45 are energized. Thus, there will be no clashing of detents when R53c opens (Fig. 36) to drop out programming. The error signal will give notice of the nature of the trouble and a manual reset is indicated.

The points of relay R54 will operate in the same way to bring the ordinate counter back into limits before stopping the counter motor.

A "Power" relay R60 (Fig. 37) is energized as follows: the 115 A.C. line (Fig. 38), wire 446 (Fig. 37), "Power On" Switch, wire 447, 330 ohm resistance, 100 ma. rectifier, relay R61, "Power Off" Switches (normally closed), and the ground.

The R61c points close (Fig. 38) to shunt the "Power On" Switch and keep relay R61 energized until one of the "Power Off" Switches is depressed or power fails. The three sets of R61 contacts (Fig. 38) provide circuits for lines 117, 167 and 182.

A number of auxiliary relays R62–R72 (Figs. 51 and 52) are provided to participate in the control of the program relays already mentioned and to be connected with them through the line connections M8—M14, 128—130, 160, 191, etc. Of these relays it will be noted that R67 and R68 have contacts (Fig. 65) for calling the image centering controls and null sequence control relay R73 into action and out of action at the proper times. Others of the relays R62, etc., have control contacts (Figs. 51 and 52) for programming the tachometer controls, the drive signals and hum balance. A series of relays R74–R81 (Fig. 26) are used to direct timing pulses into and out of the console storage unit so that the indicating sector therein may be set up to indicate the three numbers which are also set up in the storage switches (Figs. 27, 28, 44, 45, 58 and 59).

In Figs. 22 and 23 are shown the heat regulating controls and the air conditioning parts for governing the temperature range inside the cabinet which encloses all the measuring devices and photoelectric controls. The thermostatic controls vary the output of a gas tube TC (Fig. 22) and the TR2 filament transformer for TC and TR1 provides the grid control signal whereby the blowers and heaters are regulated.

The arc lamp 36 (Fig. 43) directs light through an optical system and around the image on the plate before it impinges upon the elements of the photomultiplier tube PH (Fig. 66).

The photoelectric tube PH (Fig. 66) has connections to a cathode follower CF1 and then through a series of electronic devices before reaching the two drive control motors HD and VD. The progression of devices between the photocell and the horizontal motor may be traced on the wiring diagram to include, in addition to the cathode follower, a preamplifier, rejection filters, another amplifier, a limiter, the resistance mixer, a second set of filters, another amplifier, a third filter, and a power amplifier connected to the horizontal drive motor HD. The circuit to the horizontal motor HD includes PH (Fig. 66), CF1 (Fig. 52), PRE, 300RF (Fig. 53), 180RF, 120RF (Fig. 54), AMP, wire 449 (Fig. 67), CF2, RM1, wire 450 (Fig. 53), 300RF, 180RF, AMP2, wire 453 (Fig. 55), power supply and L-C filter (Fig. 56), the horizontal PA. A somewhat similar circuit to the vertical motor VD branches off from the separating point in Fig. 67 and flows through wire 451, RM2, etc.

The foregoing sections of the description dealing with the wiring diagram point out the location of the various units and the manner in which they effect control. Now, it is proposed to trace a sample circuit through the entire diagram explaining what is involved when a nine digit is sensed in the lowest order of the horizontal measurement on a card and how such a "nine" is set up in storage and used to adjust a converter and used to adjust the machine and later corrected when photoelectric scanning shows it to be a crude measurement. A first circuit is from the card reading brush 403 (Fig. 25) to the storage control magnet SR4 (Fig. 45) at "9" time, and a "9" is stored on the switch commutator segment 452. This "9" is next compared with the voltage output of the corresponding converter commutator order (Fig. 38) in comparing device T12 (Fig. 47) and a directional error signal is applied to the converter motor M (Fig. 48), causing it to drive until the commutator (Fig. 38) is at "9". Next, an error signal in the synchro tie between synchro of the horizontal carriage and motor HD (Fig. 69) and the synchro (Fig. 49) of the MM converter causes circuits to be closed to drive the carriage to a position that agrees with the "9" of the converter. The image is now in the field of the viewing screen. By button control the operator may vary the carriage slightly from the 9 position in order to more closely center the image.

When control is returned to the program means, the optical scanning device causes the horizontal drive motor HD to position the carriage so that the optical axis of the scanner will pass through the center of gravity of the star image. The MMS and MIS synchros (Fig. 71) are adjusted with the carriage and error signals therefrom drive the corresponding converter synchros (Figs. 32 and 49) to set the converter counters to a more accurate setting. However, the highest order of MI may be at "0" and the lowest order (and corresponding denomination) of MM still at "9." Therefore, the comparing devices of Figs. 29 and 30 have connections to both MI and MM converter motors, and correct the latter to agree with the first. That is how the "9" is changed to a "0" in the units order of MM counter commutator (Fig. 38) at the units segment 456. Finally, the accurate digit "0" is read out of segment 456 and carried through line No. 92 to the punch magnet PM (Fig. 42) and perforated in the card as part of the new seven place figure.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device for measuring the spacing of images on a photographic plate, an optical scanning device, means for supporting said plate and device, adjustable carriages for varying the positions of such supporting means vertically and horizontally, means for entering numbers representative of the vertical and horizontal coordinates of the approximate position of one of said images, means under control of said entering means for storing said numbers, a pair of synchro devices on said adjustable carriages coupled with a similar pair of synchro devices on said number storing means, means for driving said synchro devices to detect a correspondence between the entered numbers and the positions of the vertical and horizontal carriages, means under control of said scanning device for bringing the image which has been brought within its range by the approximate entered number adjustment to a finer centralized adjustment, and means for effecting a reverse control from the synchro devices on the adjustable carriages to affect the synchro devices of the storing means, whereby numbers representing the accurate optically scanned position of the image may be read out.

2. The combination set forth in claim 1 including a card sensing and punching machine with devices for sensing on the card the coarse measurements of an image position to constitute the entered numbers, and the punching devices being controlled by the number storing means of the finely adjusted synchros cooperating with said storing means to perforate numbers representative of the actual image position.

3. The combination set forth in claim 2 including a keyboard with key controls for adjusting the horizontal and vertical carriages, an optical observing device for sighting the image after said plate has received a coarse adjustment, said key controls operating the carriages to move the plate and scanner to shift the image so that it is more truly centralized under visual inspection and within the scope of the automatic optical scanning device, said keyboard controls being operated intermediate, the first setting under card control and the final setting under automatic optical control.

4. The combination set forth in claim 1 and including converters and comparing devices, said converters comprising a first set of switches set under card control to represent the numbers of the image position, a second set of switches geared to the adjustable synchro devices of the converter to be representative digitally of the analog adjustment of the converter, and a comparing means between the two switch devices whereby the converter may be driven until an agreement is reached between the switches set by the card and the switches driven by the synchro devices which results in the coarse adjustment of the plate prior to optical scanning.

5. The combination set forth in claim 4 wherein said carriages include a horizontal adjusting carriage moved by a lead screw, said lead screw having connections to two synchro devices, the one having direct connections for adjustment in millimeters and the other one having a thousand-to-one ratio of connections for adjustment in microns, said synchro devices having driving connections to the synchro devices of the converter for setting digital representations of an accurately gauged horizontal image position.

6. In a device for measuring the position of an indicium on an object, means for entering a plurality of numbers representative of the general position of said indicium, means under control of said entering means for storing said numbers, a plurality of converters with number representing sections and connected synchro sections, a comparing means, means under control of said comparing means for operating said converter number sections to agree with the numbers of said storing means, means for measuring the position of said indicium, means for shifting said object relative to said measuring means, means under control of said converters for operating said measuring means and said shifting means to assume positions agreeing with entered numbers, means for scanning said indicium, means under control of said scanning means for operating said measuring means to detect the accurate position of said indicium, and means under control of said measuring means for manifesting new numbers representing the accurate position of said indicium.

7. In a device for measuring the spacing of a feature of an object more accurately than preliminary measurement figures represented by indicia on a record, means for sensing the indicia on the record, means for measuring including position gauging devices and means for moving said object relative to said gauging devices, means under control of said sensing means for operating said moving means to shift the object according to the preliminary figures to come within the scope of the gauging devices, means for automatically readjusting said gauging devices to measure accurately the feature of the object, and means under control of said gauging means when readjusted for recording the final accurate feature measurement figures on the record.

8. The combination set forth in claim 7 including a keyboard and means controlled by the keyboard for operating said measuring means to move the object relative to the gauging devices under manual control for more accurate feature measurement after movement of the object under record control and before automatic readjustment of the gauging devices.

9. The combination set forth in claim 8 including a program device for calling into operation and governing the sequence of operation of the several means, whereby the record is sensed, the object is shifted and gauged, the keyboard controls movement of the object more accurately, the automatic readjusting means gauges the object still more accurately, and the recording means is operated, all in the order mentioned under control of the program device.

10. In a machine for measuring an object, means for entering and storing numbers representing measurements of the object, means for holding the object, a gaging means cooperating therewith and movable relative to the object to gage its measurements, pairs of synchros, said pairs comprising one synchro which is adjusted to coincide with the setting of the numeral entering means and the other synchros of the pairs connected to both the object holding means and the gaging means, and means for governing the sequence of operation of said synchros whereby the first operate under control of the number entering means so that the synchros near the object are operated under control of the remote synchros of the numbering means, and secondly, the synchros of the gaging means and the object are controlling to effect the setting of the synchros of the number entering means.

11. A combination of the kind set forth in claim 10 wherein an automatic adjusting means is provided in cooperation with said object holding means and said gaging means for shifting them to secure more accurate measurements than those of the entered numbers, whereby when the control of the synchros is reversed, the numbers read out will differ from the numbers read in.

12. A combination such as set forth in claim 11 and wherein said automatic measuring means includes photoelectric scanning devices for sensing features of the object to be scanned for measurement, said photoelectric devices having electronic controls for governing the adjustment of said object holding means and said gaging means and accordingly influencing the corresponding synchros coupled therewith.

13. A combination of the kind set forth in claim 12 and wherein said photoelectric scanning devices include an optical system involving the projection of light around a feature of the object, said light being projected through a rotating disk with a semicircular opening whereby there is generated a modified form of A.C. current, the phase and amplitude of which are measures of the need for correction in the relative positions between the object holder and the gaging means, and means under control of said generated A.C. for shifting the object holding means and gaging means until a steady current is generated as an indicator of an accurately measured feature, said synchros following the final adjustments of the holding means and engaging means and thereby influencing the coupled synchros to be set to numbers accurately representative of the object feature measurements.

14. The combination set forth in claim 13 and further characterized by the provision of reversible connections between the number entering means and the associated synchros whereby at one time the number entering means controls the adjustment of the synchros and at other times the synchros control the adjustment of the number entering means so that it serves as a register.

15. The combination set forth in claim 14 and including record control, said record bearing indicia representative of the number to be entered as measurements, means for sensing said indicia, means under control of said sensing means for operating said number entering means, means for recording additional indicia on said record, and means under control of said number entering means after it has received final measurement figures for operating said indicia recording means to put a record of accurate measurements on said record.

16. In a device for measuring indicia on a record, means for supporting the record, a carriage movable relative to the record, means for projecting light on the record to single out an indicium, a light scanning means mounted on said carriage to detect the position of said indicium, means for moving said carriage to a position wherein said indicium image is centralized with respect to the scanning means, a synchro cooperating with said carriage to partake of its movement, a remote related synchro coupled with the first-mentioned synchro to have corresponding movement, and a register settable by the last-mentioned synchro to indicate digitally the position of the scanned indicium with respect to a reference point on the record.

17. The combination set forth in claim 16 and further characterized by the fact that the synchro coordinated with said carriage is of a dual nature comprising a pair of synchros, namely, a coarse synchro and a fine synchro, a corresponding pair of dual remote synchros driven by the first-mentioned pair, a pair of digit representing registers driven by the last-mentioned pair of synchros, digit representing means operated under control of said pair of registers and having combined effect, whereby the fine and coarse measurements derived from synchros are arranged to be represented as a single multidenominational number.

18. The combination set forth in claim 17 and further characterized by the fact that the orders of said pair of registers overlap so that the highest order of one is matched with the lowest order of the other so that the resulting full number is a product of the merging of the fine and coarse readings of the synchros, means for comparing the digits of the registers in the overlapping order, and means under control of the register of the fine setting for correcting one or more digit positions of the coarse setting to effect coincidence between the two registers.

19. The combination set forth in claim 16 with additional means for producing relative motion between the record and the carriage at right angles to the motion of the carriage, a vertical synchro for partaking of the motion of the record at right angles and a second vertical synchro remotely positioned but coupled with the first-mentioned vertical synchros to be coordinated therewith, and a vertical register operable by the remote synchro to represent digitally the vertical movement of the record whereby digital representation is given of the position of the scanned indicium in two coordinates.

20. The combination set forth in claim 19 and further characterized by the provision of a transparent sheet in the path of the indicium image picked up by the scanning means, a horizontal pivot on which said sheet is swung to assume different angular positions in the path of said image, means for operating said pivot to swing said sheet and cause defraction of the image in lieu of shifting said record vertically, whereby fine vertical adjustments may be made without shifting the record.

21. The combination set forth in claim 16 and wherein the scanning device includes the photocell and a scanning disk interposed between the image and the photocell, said disk being formed with a semicircular opening, means for rotating said disk to cause the indicium image to appear in and out of the projection of light through the opening and thereby generate alternating fluctuations of light on the photocell, an electronic means cooperating with the photocell for generating regulated A.C. current, driving motors for positioning the carriage and said record holder, and means for influencing said motors by said generated A.C. current for causing the motors to position the scanning device relative to the indicium to be centralized therewith.

22. The combination set forth in claim 21 and including a counter for limiting the number of hunting actions of the carriage in responding to the A.C. variations of the scanner, a normally disengaged tachometer, means for engaging said tachometer to be driven by the carriage drive motor and to moderate the effect of the A.C. fluctuations, means for stepping said counter under control of the carriage operating means upon changes in direction, and means under control of said counter at a selected number for operating said tachometer engaging means and ending the hunting actuations of the carriage so that the carriage is brought into a final accurate measuring position from one direction at all times.

23. In a record controlled machine for measuring images on film, means for supporting the film, a carriage and means for moving the carriage and supporting means relatively, means for projecting light on the film to single out an image, a light scanning means mounted on said carriage to detect the position of said image, means for sensing indicia on said record representing a coarse measurement of the image, means under control of said sensing means for moving said carriage to a position where the image is picked up, additional means for moving said carriage to a position wherein said image is centralized with respect to the scanning means, synchro devices cooperating with said carriage to partake of all its movements, related synchro devices coupled with the first-mentioned synchro devices to have corresponding movement, and a register settable by said synchro devices to represent digitally the position of the scanned image with respect to a reference point on the film.

24. The combination set forth in claim 23 including means for forming indicia on said record, and means under control of said register for operating said indicia forming means to represent on the record the accurate measurement of the scanned image.

25. The combination set forth in claim 24 and further characterized by the fact that said synchro devices cooperating with the carriage including a millimeter measuring synchro for coarse measurements and a micron measuring synchro for fine measurements, and further characterized in that said register includes two separate sets of number representing elements, one set of four under control of said coarse synchro and another set of four under control of said fine synchro, whereby said register has four denominational orders representing millimeters and tenths of millimeters and additional four denominational orders representing microns and tenths of microns, said indicia forming means being controlled by all denominational orders of both sets of elements of the register to represent the position of the scanned image in tenths of microns.

26. In a device for adjusting a machine according to digital indicia on a record, means for sensing said indicia, a switch set under control of said sensing means, a synchro with a digitally set commutator, means for driving said synchro to match its setting with the switch setting, means for comparing the settings of said switch and said commutator including a voltage divider and connection therefrom to said settable switch and commutator whereby the digital representing positions thereof are conductive of steps of voltage graduated digitally, a directional error indicating means cooperating with said comparing means and affected by variations in matched pairs of voltages, means under control of said error means for governing said driving means to operate said synchro until the setting of the commutator matches that of the switch, a driven synchro operated by the first-mentioned synchro to effect a control, and means for operating the driven synchro under control of the first-mentioned synchro.

27. A tachometer device comprising driving controls to a measuring carriage, means for operating said driving controls to approach a point to be measured and later oscillate about said point with hunting motions, a tachometer cooperating with said driving controls to regulate the speed thereof, and means for engaging said tachometer when the driving controls are operated with the final hunting motion.

28. In a device for measuring the coordinates of indicia on an object, a gaging means, means for mounting said object adjacent said gaging means, separate means for moving said gaging means and said mounting means relative to each other along X and Y axes to align an indicium of the object with the gaging means, a centering means on said gaging means to measure accurately the indicium position, a first pair of operating controls for said moving means for bringing the indicium and centering means into coarse alignment, a second pair of operating controls for said moving means for bringing the indicium and centering means into accurate alignment, and means under control of said operating controls and the moving means for indicating the values of the measured coordinates.

29. The combination set forth in claim 28 and wherein said first pair of operating controls include a set of cards with digit representations of the coordinate measurements of each indicium, and means under control of the cards for limiting the operation of said first operating controls.

30. The combination set forth in claim 28 in which said centering means includes a photoelectric scanning means, and a pair of synchro controls which are included in said second pair of operating controls and which are adjusted under control of said scanning means until the indicium is centered accurately.

31. In a measuring device with a frame and a lead screw mounted therein, and having in combination a measuring carriage with a threaded element engaging said lead screw, an auxiliary carriage mounted on said frame adjacent said measuring carriage and movable therewith, and counterbalancing means on said auxiliary carriage for lifting said measuring carriage to take its weight off the lead screw.

32. In a machine for measuring the spacing of indicia on an object, a carriage, an optical scanning means with a control aperture on said carriage, means for directing light against an indicium and towards said aperture for measurement, photoelectric means for sensing said light and determining when said indicium image is centralized in said aperture, an automatic means for operating said carriage including a drive motor and control circuits therefor, means under control of said photoelectric means for operating said automatic means to centralize the image, and means under control of said carriage for registering the spacing of the measured indicium.

33. In a comparing device, a pair of devices adjusted to represent values, means for sensing the magnitude of said values in terms of electric potential, a pair of complemental electric devices either of which is made effective under control of said sensing means, secondary paired electronic devices made selectively effective by the first-mentioned pair of electronic devices, a pair of relays controlled by the last-mentioned electronic devices, means for adjusting said value representing devices, and means under control of said relays for controlling said adjusting means to make said pair of devices agree as to represented values.

34. The combination set forth in claim 33 and wherein a plurality of pairs of said devices are provided for plural orders, said relays being provided in plural pairs with higher order relays having successive control over lower order electronic devices and relays, and contacts of the lowest order pair of relays controlling said adjusting means to determine the direction of adjustment to make said pair of devices agree.

35. The combination set forth in claim 34 with means under control of the denominational contacts for determining the magnitude of the difference of values in the devices, and means under control of said determining means for regulating the speed of the adjusting means according to the magnitude of the difference.

36. In a device for changing the reading of a counter under control of a value representing means, a counter containing a number, an electronic balancing device for comparing a digit of said number with a digit of said value, increase and decrease control devices operated under control of said balancing device, and means under control of a selected control device for operating said counter to make it conform with said value representing means.

37. The combination set forth in claim 36 with a means cooperating with said balancing device for determining whether the difference revealed by the comparision is greater than 5, and mean under control of said determining means for reversing the counter control from the increase device to the decrease device or vice versa, whereby the counter is operated to conform over the shortest distance.

38. In a device for locating images on a photographic plate, an optical device, means for supporting said plate and device, adjustable carriages for varying the relative positions of such supporting means vertically and horizontally, data representing means for entering selected data representative of the vertical and horizontal coordinates of the position of one of said images, a pair of synchro devices on said adjustable carriages coupled with a similar pair of synchro devices on said data representing means, means for driving said synchro devices to detect a correspondence between the entered data and the positions of the vertical and horizontal carriages, and means under control of said optical device for directing light through the image which has been brought within its range.

39. In a device for locating the position of an area on an object, means for entering a plurality of numbers representative of the position of said area, means for storing said numbers, a plurality of converters with number representing sections and connected synchro sections, comparing means, means under control of said comparing means for operating said converter number sections to agree with the numbers of said storing means, means for scanning the position of an object area, means for shifting said object and said scanning means relative to each other, and means under control of said converters for operating said shifting means to cause said object and scanning means to assume relative positions agreeing with said entered numbers, whereby a particular area may be scanned.

40. In a record controlled device for shifting a sheet of film with relation to an optical scanning device, said sheet of film having a plurality of distributed discrete portions subject to examination by said scanning device, a record bearing indicia in code representative of co-ordinate position values related to the position of a selected discrete portion of the film, a pair of storage registers for receiving coordinate values, means for sensing said record, means under control of said sensing means for operating said storage registers to contain the values of said coordinate positions, means for holding said film, an optical scanning device adjacent said film, means for shifting said film holding means and said scanning device relatively in two directions, a pair of servos for controlling the separate operations of said shifting means, separate commutator devices associated with each of said servos, and separate comparing means between each of said commutator devices and said coordinate registers for controlling said shifting means to position the film in acordance with the indicia sensed on said record, whereby a selected discrete portion of said film is presented to be scanned by said optical device.

References Cited in the file of this patent

UNITED STATES PATENTS

| | | |
|---|---|---|
| 1,450,051 | Sickles | Mar. 27, 1923 |
| 2,048,879 | Moran | July 28, 1936 |
| 2,195,168 | Foster | Mar. 26, 1940 |
| 2,286,641 | Padva | June 16, 1942 |
| 2,446,096 | Moore | July 27, 1948 |
| 2,460,841 | Morey et al. | Feb. 8, 1949 |
| 2,478,237 | Carson | Aug. 9, 1949 |
| 2,499,910 | Frommer | Mar. 7, 1950 |
| 2,513,367 | Scott | July 4, 1950 |
| 2,595,205 | Sees | Apr. 29, 1952 |
| 2,607,267 | Fultz et al. | Aug. 19, 1952 |
| 2,631,491 | Regan et al. | Mar. 17, 1953 |
| 2,656,757 | Stern | Oct. 27, 1953 |